（12） United States Patent
Li et al.

(10) Patent No.: US 11,974,287 B2
(45) Date of Patent: Apr. 30, 2024

(54) COMMUNICATION METHOD AND APPARATUS

(71) Applicant: Huawei Technologies Co., Ltd., Shenzhen (CN)

(72) Inventors: Yuan Li, Bonn (DE); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 298 days.

(21) Appl. No.: 17/487,908

(22) Filed: Sep. 28, 2021

(65) Prior Publication Data

US 2022/0015092 A1 Jan. 13, 2022

Related U.S. Application Data

(63) Continuation of application No. PCT/CN2020/081451, filed on Mar. 26, 2020.

(30) Foreign Application Priority Data

Mar. 29, 2019 (CN) .......................... 201910252614.1

(51) Int. Cl.
*H04W 72/21* (2023.01)
*H04L 1/1812* (2023.01)
(52) U.S. Cl.
CPC ........... *H04W 72/21* (2023.01); *H04L 1/1812* (2013.01)
(58) Field of Classification Search
None
See application file for complete search history.

(56) References Cited

U.S. PATENT DOCUMENTS

| 2017/0318575 | A1 | 11/2017 | Park et al. |
| 2018/0132264 | A1 | 5/2018 | Jung et al. |
| 2018/0199334 | A1* | 7/2018 | Ying ..................... H04W 48/12 |
| 2018/0367285 | A1 | 12/2018 | Yi et al. |

(Continued)

FOREIGN PATENT DOCUMENTS

| CN | 102170647 A | 8/2011 |
| CN | 107801250 A | 3/2018 |

(Continued)

OTHER PUBLICATIONS

Vivo, "Feature lead summary for Configured grant enhancement", 3GPP TSG RAN WG1#96, R1-1903409, Athens, Greece, Feb. 25-Mar. 1, 2019, 13 pages.

(Continued)

*Primary Examiner* — Christine T Duong
(74) *Attorney, Agent, or Firm* — Slater Matsil, LLP

(57) ABSTRACT

Embodiments of the present invention disclose a communication method and apparatus. The method includes: After receiving, from a network device, information about K uplink data channels for repeating a data packet for K times and information about a first time domain resource for transmitting first uplink control information UCI, in a case in which the first time domain resource overlaps a first uplink data channel of the K uplink data channels in time domain and the first uplink data channel is overloaded, a terminal device determines a physical resource for transmitting the first UCI, and then sends the first UCI to the network device by using the determined physical resource.

20 Claims, 13 Drawing Sheets

(56) References Cited

U.S. PATENT DOCUMENTS

| | | |
|---|---|---|
| 2019/0037585 A1 | 1/2019 | Li et al. |
| 2019/0053211 A1 | 2/2019 | Ying et al. |
| 2019/0068317 A1 | 2/2019 | Babaei et al. |
| 2019/0098657 A1 | 3/2019 | Golitschek Edler von Elbwart et al. |

FOREIGN PATENT DOCUMENTS

| | | |
|---|---|---|
| CN | 107872896 A | 4/2018 |
| CN | 108400834 A | 8/2018 |
| CN | 109152007 A | 1/2019 |
| CN | 109391388 A | 2/2019 |
| CN | 109392168 A | 2/2019 |
| CN | 109511169 A | 3/2019 |
| RU | 2518966 C1 | 6/2014 |
| WO | 2019005920 A1 | 1/2019 |
| WO | 2019024938 A1 | 2/2019 |
| WO | 2019031850 A1 | 2/2019 |
| WO | 2019052372 A1 | 3/2019 |

OTHER PUBLICATIONS

3GPP TS 38.212 V15.5.0 (Mar. 2019), 3rd Generation Partnership Project; Technical Specification Group Radio Access Network; NR; Multiplexing and channel coding(Release 15), 101 pages.

3GPP TS 38.214 V15.5.0 (Mar. 2019), 3rd Generation Partnership Project; Technical Specification Group Radio Access Network; NR; Physical layer procedures for data (Release 15), 103 pages.

3GPP TS 38.213 V15.5.0 (Mar. 2019), 3rd Generation Partnership Project; Technical Specification Group Radio Access Network; NR; Physical layer procedures for control (Release 15), 104 pages.

ETRI, "Potential enhancements to PUSCH", 3GPP TSG RAN WG1 #96, R1-1902443, Athens, Greece, Feb. 25-Mar. 1, 2019, 8 pages.

Huawei et al., "PUSCH enhancements for URLLC", 3GPP TSG RAN WG1 Meeting #96, R1-1901559, Athens, Greece, Feb. 25-Mar. 1, 2019, 13 pages.

3GPP TS 38.212, V15.5.0 (Mar. 2019), 3rd Generation Partnership Project; Technical Specification Group Radio Access Network; NR; Multiplexing and channel coding (Release 15), pp. 1-101.

Nokia, et al., Summary of Friday offline discussion on potential enhancements for PUSCH for NR URLLC (AI 7.2.6.1.3), 3GPP TSG-RAN WG1 Meeting #96, R1-1903797, Athens, Greece, Feb. 25-Mar. 1, 2019, 39 pages.

* cited by examiner

COMMUNICATION METHOD AND APPARATUS

CROSS-REFERENCE TO RELATED APPLICATIONS

This application is a continuation of International Application No. PCT/CN2020/081451, filed on Mar. 26, 2020, which claims priority to Chinese Patent Application No. 201910252614.1, filed on Mar. 29, 2019. The disclosures of the aforementioned applications are hereby incorporated by reference in their entireties.

TECHNICAL FIELD

Embodiments of the present invention relate to the field of communications technologies, and in particular, to a communication method and apparatus.

BACKGROUND

To enhance reliability of data transmission, a multi-repetition mechanism is introduced to 5G new radio (NR), that is, one data packet is repeated on K physical uplink shared channels (PUSCHs) for K times. Because the K PUSCHs are used to repeat the same data packet, a transport block size (TBS) needs to remain the same. When quantities of physical resources included in the K PUSCHs are the same, the TBS may be calculated based on a quantity of physical resources on a first PUSCH of the K PUSCHs. When uplink control information (UCI) needs to be transmitted on one of the K PUSCHs, and a quantity of physical resources on the PUSCH is relatively small, a physical resource to be occupied by the UCI and obtained through calculation by using the TBS is excessively large. Consequently, this PUSCH is overloaded, and reliability of information transmission is reduced.

SUMMARY

Embodiments of the present invention disclose a communication method and device, to improve reliability of information transmission.

According to a first aspect, a communication method is disclosed. The method may be performed by a terminal device or a module (for example, a chip) in a terminal device. In the following description, the method is performed by a terminal device. A terminal device receives first control information from a network device, receives second control information from the network device, determines a physical resource occupied by first UCI, and sends the first UCI to the network device by using the physical resource occupied by the first UCI. The first control information includes information about a first physical resource for transmitting a first data packet, the first physical resource corresponds to K uplink data channels, each of the K uplink data channels is used to transmit the first data packet once, and K is a positive integer. The second control information includes information about a first time domain resource for transmitting the first UCI, and the first time domain resource overlaps a first uplink data channel of the K uplink data channels in time domain. The first uplink data channel is different from an uplink data channel set for determining a first TBS, and the first TBS is a TBS of the first data packet, or a quantity of time domain symbols included in the first uplink data channel is less than (or not greater than) a first threshold, or a quantity of physical resources included in the first uplink data channel is less than (or not greater than) a second threshold, or a code rate for carrying the first UCI on the first uplink data channel is greater than (or not less than) a third threshold. Therefore, the first uplink data channel is overloaded. An appropriate physical resource occupied by the first UCI can be determined, so that reliability of information transmission can be improved.

In a possible implementation, a quantity of physical resources included in the uplink data channel set is greater than the quantity of physical resources included in the first uplink data channel.

In a possible implementation, a quantity of physical resources occupied by the first UCI may be determined based on an equivalent TBS, where the equivalent TBS is different from the first TBS. It can be learned that the quantity of physical resources occupied by the first UCI is not determined based on the first TBS, but determined based on the equivalent TBS, and the equivalent TBS is different from the first TBS. Therefore, a problem that an obtained physical resource occupied by UCI is excessively large can be resolved, and reliability of information transmission can be improved.

In a possible implementation, a quantity of physical resources occupied by the first UCI may be determined based on an equivalent TBS and the quantity of physical resources included in the first uplink data channel, where the equivalent TBS is a TBS determined based on the first uplink data channel. Because both the equivalent TBS and the quantity of physical resources included in the first uplink data channel match the physical resources included in the first uplink data channel, the determined quantity of physical resources occupied by the first UCI is moderate. Therefore, a problem that a TBS is excessively large or that a quantity of physical resources is excessively small is avoided, transmission reliability of the first UCI is ensured, and reliability of information transmission can be improved.

In a possible implementation, a quantity of physical resources occupied by the first UCI may be determined based on a quantity of equivalent physical resources, where the quantity of equivalent physical resources is different from the quantity of physical resources included in the first uplink data channel. It can be learned that the quantity of physical resources occupied by the first UCI is not determined based on the quantity of physical resources included in the first uplink data channel, but determined based on the quantity of equivalent physical resources, and the quantity of equivalent physical resources is different from the quantity of physical resources included in the first uplink data channel. Therefore, a problem that an obtained physical resource occupied by UCI is excessively large can be resolved, and reliability of information transmission can be improved.

In a possible implementation, a quantity of physical resources occupied by the first UCI may be determined based on a quantity of equivalent physical resources and the first TBS, where the quantity of equivalent physical resources is a quantity of physical resources included in the uplink data channel set. Because both the first TBS and the quantity of equivalent physical resources match the quantity of physical resources included in the uplink data channel set, the determined quantity of physical resources occupied by the first UCI is moderate. Therefore, a problem that a TBS is excessively large or that a quantity of physical resources is excessively small is avoided, transmission reliability of the first UCI is ensured, and reliability of information transmission can be improved.

In a possible implementation, a quantity of physical resources occupied by the first UCI is determined based on a quantity of physical resources included in a second uplink data channel, where the second uplink data channel is different from the first uplink data channel. It can be learned that the quantity of physical resources occupied by the first UCI is not determined based on the quantity of physical resources included in the first uplink data channel, but determined based on the quantity of physical resources included in the second uplink data channel, and the quantity of physical resources included in the second uplink data channel is different from the quantity of physical resources included in the first uplink data channel. Therefore, a problem that an obtained physical resource occupied by UCI is excessively large can be resolved, and reliability of information transmission can be improved.

In a possible implementation, a quantity of physical resources occupied by the first UCI may be determined based on a quantity of physical resources included in a second uplink data channel and the first TBS, where the quantity of physical resources included in the second uplink data channel is used to determine a quantity of physical resources occupied by UCI on any one of the K uplink data channels. For one piece of UCI, although the quantity of physical resources included in the second uplink data channel does not necessarily match the physical resources included in the first uplink data channel, regardless of which one of the K uplink data channels carries the UCI, it can be ensured that the UCI occupies a same quantity of physical resources. Therefore, transmission reliability of the UCI can still be ensured, and reliability of information transmission can be improved.

In a possible implementation, a quantity of physical resources occupied by the first UCI may be determined based on a first equalization parameter, where the first equalization parameter is different from a second equalization parameter; and the second equalization parameter is an equalization parameter used to determine a quantity of physical resources occupied by the first UCI in a first case, and the first case is a case in which the uplink data channel set is the same as the first uplink data channel, or a case in which the quantity of time domain symbols included in the first uplink data channel is not less than (or greater than) the first threshold, or a case in which the quantity of physical resources included in the first uplink data channel is not less than (or greater than) the second threshold, or a case in which the code rate for carrying the first UCI on the first uplink data channel is not greater than (or less than) the third threshold; or the second equalization parameter is an equalization parameter used to determine a quantity of physical resources occupied by second UCI on a third uplink data channel, the third uplink data channel is one of the K uplink data channels, and the third uplink data channel is unequal to the first uplink data channel. It can be learned that the quantity of physical resources occupied by the first UCI is not determined based on the second equalization parameter, but determined based on the first equalization parameter, and the first equalization parameter is different from the second equalization parameter. Therefore, a problem that an obtained physical resource occupied by UCI is excessively large can be resolved, and reliability of information transmission can be improved.

In a possible implementation, third control information is received from the network device, where the third control information includes a first field, and both the first equalization parameter and the second equalization parameter correspond to the first field, or both the first equalization parameter and the second equalization parameter correspond to a first index value notified by the first field. It can be learned that the first equalization parameter and the second equalization parameter are notified by the network device by using the same field in the same control information or the index value corresponding to the same field.

In a possible implementation, a quantity of physical resources occupied by the first UCI may be determined based on the quantity of physical resources included in the first uplink data channel, the first TBS, and a first equalization parameter. When the first TBS does not match the first uplink data channel, the equalization parameter may be adjusted to compensate for the quantity of physical resources occupied by the first UCI, and an appropriate quantity of physical resources occupied by the first UCI is determined by using the adjusted first equalization parameter. Therefore, transmission reliability of the first UCI is ensured, and reliability of information transmission can be improved.

In a possible implementation, the first equalization parameter is greater than the second equalization parameter. When the first TBS does not match the first uplink data channel, a larger first equalization parameter may be used to increase the quantity of physical resources occupied by the first UCI. Therefore, performance of the first UCI is ensured, and reliability of information transmission can be improved.

In a possible implementation, the physical resource occupied by the first UCI is a physical resource on the first uplink data channel.

In a possible implementation, the physical resource occupied by the first UCI is a physical resource on a fourth uplink data channel, the fourth uplink data channel is one of the K uplink data channels, and the fourth uplink data channel is unequal to the first uplink data channel. Because a channel for sending the first UCI is adjusted to another uplink data channel, transmission reliability of the UCI can be improved, and reliability of information transmission can be improved.

In a possible implementation, the fourth uplink data channel does not overlap the first time domain resource in time domain. Therefore, it can be ensured that the first UCI is carried on the fourth uplink data channel that is used to transmit the first UCI but not notified by the network device, and it is ensured that an appropriate uplink data channel is used to send the first UCI, to ensure reliability of information transmission.

In a possible implementation, a quantity of physical resources included in the fourth uplink data channel is greater than the quantity of physical resources included in the first uplink data channel, or a quantity of time domain symbols included in the fourth uplink data channel is greater than or equal to (or greater than) the first threshold, or a quantity of physical resources included in the fourth uplink data channel is greater than or equal to (or greater than) the second threshold, or a code rate for carrying the first UCI on the fourth uplink data channel is less than or equal to (or less than) the third threshold. Because a channel for sending the first UCI is adjusted to another uplink data channel having more physical resources, transmission reliability of the UCI can be improved, and reliability of information transmission can be improved.

In a possible implementation, the physical resource occupied by the first UCI is a physical resource on an uplink control channel corresponding to the first time domain resource. It can be learned that, because a channel for transmitting the first UCI may be adjusted to the uplink control channel, transmission reliability of the UCI can be improved, and reliability of information transmission can be improved.

In a possible implementation, the first uplink data channel may be dropped or sending information on the first uplink data channel may be stopped, so that the uplink data channel and the uplink control channel can be prevented from simultaneously sending information.

According to a second aspect, a communication method is disclosed. The method may be performed by a network device or a module (for example, a chip) in a network device. In the following description, the method is performed by a network device. A network device sends first control information to a terminal device, sends second control information to the terminal device, determines a physical resource occupied by first UCI, and receives the first UCI from the terminal device by using the physical resource occupied by the first UCI. The first control information includes information about a first physical resource for transmitting a first data packet, the first physical resource corresponds to K uplink data channels, each of the K uplink data channels is used to transmit the first data packet once, and K is a positive integer. The second control information includes information about a first time domain resource for transmitting the first uplink control information UCI, and the first time domain resource overlaps a first uplink data channel of the K uplink data channels in time domain. The first uplink data channel is different from an uplink data channel set for determining a first TBS, and the first TBS is a TBS of the first data packet, or a quantity of time domain symbols included in the first uplink data channel is less than (or not greater than) a first threshold, or a quantity of physical resources included in the first uplink data channel is less than (or not greater than) a second threshold, or a code rate for carrying the first UCI on the first uplink data channel is greater than (or not less than) a third threshold. Therefore, it is determined that the first uplink data channel is overloaded, and an appropriate physical resource occupied by the first UCI can be determined. Therefore, reliability of information transmission can be improved.

In a possible implementation, a quantity of physical resources included in the uplink data channel set is greater than the quantity of physical resources included in the first uplink data channel.

In a possible implementation, a quantity of physical resources occupied by the first UCI corresponds to an equivalent TBS, and the equivalent TBS is different from the first TBS. It can be learned that the quantity of physical resources occupied by the first UCI corresponds to the equivalent TBS instead of the first TBS, and the equivalent TBS is different from the first TBS. Therefore, a problem that an obtained physical resource occupied by UCI is excessively large can be resolved, and reliability of information transmission can be improved.

In a possible implementation, a quantity of physical resources occupied by the first UCI corresponds to an equivalent TBS and the quantity of physical resources included in the first uplink data channel, and the equivalent TBS is a TBS corresponding to the first uplink data channel. Because both the equivalent TBS and the quantity of physical resources included in the first uplink data channel match the physical resources included in the first uplink data channel, the determined quantity of physical resources occupied by the first UCI is moderate. Therefore, a problem that a TBS is excessively large or that a quantity of physical resources is excessively small is avoided, transmission reliability of the first UCI is ensured, and reliability of information transmission can be improved.

In a possible implementation, a quantity of physical resources occupied by the first UCI corresponds to a quantity of equivalent physical resources, and the quantity of equivalent physical resources is different from the quantity of physical resources included in the first uplink data channel. It can be learned that the quantity of physical resources occupied by the first UCI corresponds to the quantity of equivalent physical resources instead of the quantity of physical resources included in the first uplink data channel, and the quantity of equivalent physical resources is different from the quantity of physical resources included in the first uplink data channel. Therefore, a problem that an obtained physical resource occupied by UCI is excessively large can be resolved, and reliability of information transmission can be improved.

In a possible implementation, a quantity of physical resources occupied by the first UCI corresponds to a quantity of equivalent physical resources and the first TBS, and the quantity of equivalent physical resources is a quantity of physical resources included in the uplink data channel set. Because both the first TBS and the quantity of equivalent physical resources match the quantity of physical resources included in the uplink data channel set, the determined quantity of physical resources occupied by the first UCI is moderate. Therefore, a problem that a TBS is excessively large or that a quantity of physical resources is excessively small is avoided, transmission reliability of the first UCI is ensured, and reliability of information transmission can be improved.

In a possible implementation, a quantity of physical resources occupied by the first UCI corresponds to a quantity of physical resources included in a second uplink data channel, and the second uplink data channel is different from the first uplink data channel. It can be learned that the quantity of physical resources occupied by the first UCI corresponds to the quantity of physical resources included in the second uplink data channel instead of the quantity of physical resources included in the first uplink data channel, and the quantity of physical resources included in the second uplink data channel is different from the quantity of physical resources included in the first uplink data channel. Therefore, a problem that an obtained physical resource occupied by UCI is excessively large can be resolved, and reliability of information transmission can be improved.

In a possible implementation, a quantity of physical resources occupied by the first UCI corresponds to a quantity of physical resources included in a second uplink data channel and the first TBS, and the quantity of physical resources included in the second uplink data channel is used to determine a quantity of physical resources occupied by UCI on any one of the K uplink data channels. For one piece of UCI, although the quantity of physical resources included in the second uplink data channel does not necessarily match the physical resources included in the first uplink data channel, regardless of which one of the K uplink data channels carries the UCI, it can be ensured that the UCI occupies a same quantity of physical resources. Therefore, transmission reliability of the UCI can still be ensured, and reliability of information transmission can be improved.

In a possible implementation, a quantity of physical resources occupied by the first UCI corresponds to a first equalization parameter, and the first equalization parameter is different from a second equalization parameter; and the second equalization parameter is an equalization parameter used to determine a quantity of physical resources occupied by the first UCI in a first case, and the first case is a case in which the uplink data channel set is the same as the first uplink data channel, or a case in which the quantity of time domain symbols included in the first uplink data channel is not less than (or greater than) the first threshold, or a case in which the quantity of physical resources included in the first uplink data channel is not less than (or greater than) the second threshold, or a case in which the code rate for carrying the first UCI on the first uplink data channel is not greater than (or less than) the third threshold; or the second equalization parameter is an equalization parameter used to determine a quantity of physical resources occupied by second UCI on a third uplink data channel, the third uplink data channel is one of the K uplink data channels, and the third uplink data channel is unequal to the first uplink data channel. It can be learned that the quantity of physical resources occupied by the first UCI corresponds to the first equalization parameter instead of the second equalization parameter, and the first equalization parameter is different from the second equalization parameter. Therefore, a problem that an obtained physical resource occupied by UCI is excessively large can be resolved, and reliability of information transmission can be improved.

In a possible implementation, third control information may be sent to the terminal device, where the third control information includes a first field, and both the first equalization parameter and the second equalization parameter correspond to the first field, or both the first equalization parameter and the second equalization parameter correspond to a first index value notified by the first field. It can be learned that the first equalization parameter and the second equalization parameter are notified by the network device by using the same field in the same control information or the index value corresponding to the same field.

In a possible implementation, a quantity of physical resources occupied by the first UCI corresponds to the quantity of physical resources included in the first uplink data channel, the first TBS, and a first equalization parameter. When the first TBS does not match the first uplink data channel, the equalization parameter may be adjusted to compensate for the quantity of physical resources occupied by the first UCI, and an appropriate quantity of physical resources occupied by the first UCI is determined by using the adjusted first equalization parameter. Therefore, transmission reliability of the first UCI is ensured, and reliability of information transmission can be improved.

In a possible implementation, the first equalization parameter is greater than the second equalization parameter. When the first TBS does not match the first uplink data channel, a larger first equalization parameter may be used to increase the quantity of physical resources occupied by the first UCI. Therefore, performance of the first UCI is ensured, and reliability of information transmission can be improved.

In a possible implementation, the physical resource occupied by the first UCI is a physical resource on the first uplink data channel.

In a possible implementation, the physical resource occupied by the first UCI is a physical resource on a fourth uplink data channel, the fourth uplink data channel is one of the K uplink data channels, and the fourth uplink data channel is unequal to the first uplink data channel. Because a channel for sending the first UCI is adjusted to another uplink data channel, transmission reliability of the UCI can be improved, and reliability of information transmission can be improved.

In a possible implementation, the fourth uplink data channel does not overlap the first time domain resource in time domain. Therefore, it can be ensured that the first UCI is carried on the fourth uplink data channel that is used to transmit the first UCI but not notified by the network device, and it is ensured that an appropriate data channel is used to send the first UCI, to ensure reliability of information transmission.

In a possible implementation, a quantity of physical resources included in the fourth uplink data channel is greater than the quantity of physical resources included in the first uplink data channel, or a quantity of time domain symbols included in the fourth uplink data channel is greater than or equal to (or greater than) the first threshold, or a quantity of physical resources included in the fourth uplink data channel is greater than or equal to (or greater than) the second threshold, or a code rate for carrying the first UCI on the fourth uplink data channel is less than or equal to (or less than) the third threshold. Because a channel for sending the first UCI is adjusted to another uplink data channel having more physical resources, transmission reliability of the UCI can be improved, and reliability of information transmission can be improved.

In a possible implementation, the physical resource occupied by the first UCI is a physical resource on an uplink control channel corresponding to the first time domain resource. It can be learned that, because a channel for transmitting the first UCI may be adjusted to the uplink control channel, transmission reliability of the UCI can be improved, and reliability of information transmission can be improved.

In a possible implementation, an uplink data channel on which uplink information is received does not include the first uplink data channel, or a part of physical resources included in the first uplink data channel and overlapping the first time domain resource in time domain are not used to transmit uplink information. Therefore, the uplink data channel and the uplink control channel can be prevented from simultaneously sending information.

According to a third aspect, a communications apparatus is disclosed. The communications apparatus includes units configured to perform the communication method disclosed in any one of the first aspect or the possible implementations of the first aspect, or includes units configured to perform the communication method disclosed in any one of the second aspect or the possible implementations of the second aspect.

According to a fourth aspect, a communications apparatus is disclosed. The communications apparatus may be a terminal device or a module (for example, a chip) in a terminal device. The communications apparatus may include a processor, where the processor is coupled to a memory, the memory is configured to store a computer program or instruction, and the processor is configured to execute the computer program or instruction stored in the memory, so that the communications apparatus performs the communication method disclosed in any one of the first aspect or the possible implementations of the first aspect.

According to a fifth aspect, a communications apparatus is disclosed. The communications apparatus may be a network device or a module (for example, a chip) in a network device. The communications apparatus may include a processor, where the processor is coupled to a memory, the memory is configured to store a computer program or instruction, and the processor is configured to execute the computer program or instruction stored in the memory, so that the communications apparatus performs the communication method disclosed in any one of the second aspect or the possible implementations of the second aspect.

According to a sixth aspect, a readable storage medium is disclosed. The readable storage medium stores a program, and when the program runs, the communication method disclosed in any one of the first aspect or the possible implementations of the first aspect is implemented, or the communication method disclosed in any one of the second aspect or the possible implementations of the second aspect is implemented.

According to a seventh aspect, a communications system is disclosed. The communications system includes the communications apparatus in the fourth aspect and the communications apparatus in the fifth aspect.

DETAILED DESCRIPTION OF ILLUSTRATIVE EMBODIMENTS

Embodiments of the present invention disclose a communication method and device, to improve reliability of information transmission. The following separately describes the communication method and device in detail.

Figure 1:
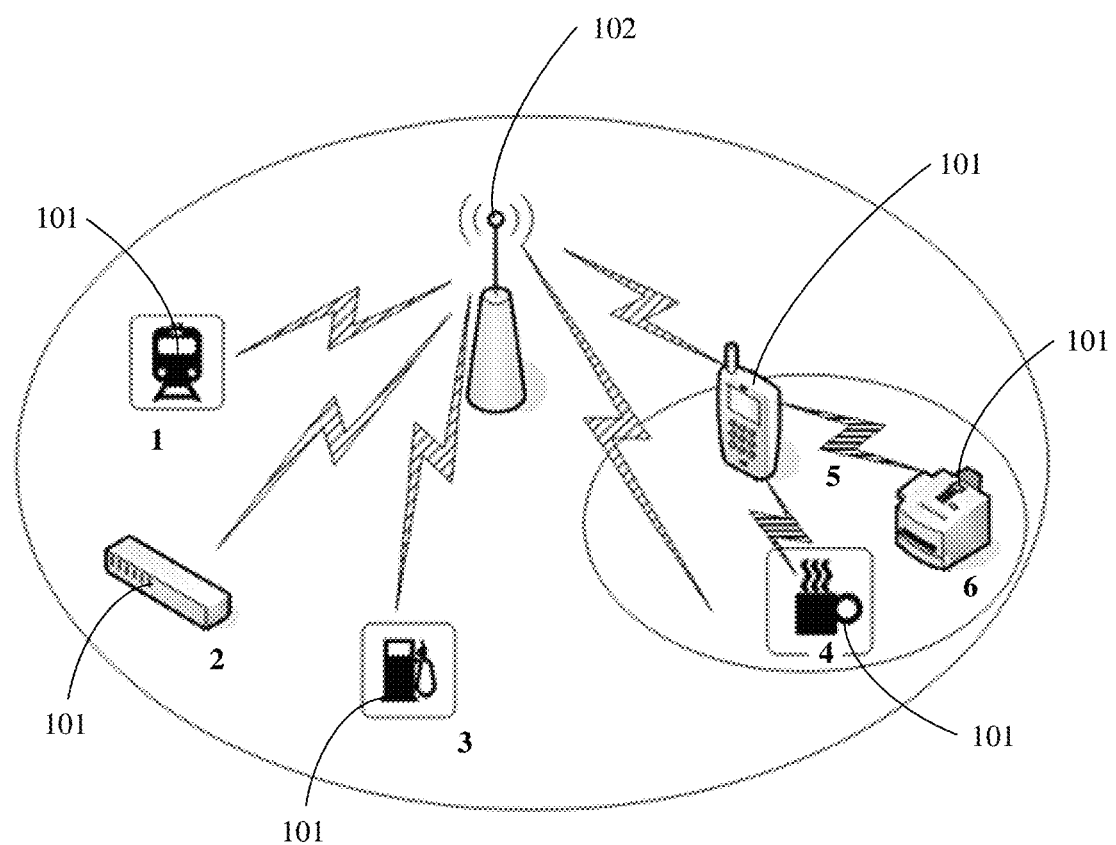
FIG. 1 is a schematic diagram of a network architecture according to an embodiment of the present invention.

For better understanding the communication method and device disclosed in the embodiments of the present invention, the following first describes a network architecture used in the embodiments of the present invention. FIG. 1 is a schematic diagram of a network architecture according to an embodiment of the present invention. As shown in FIG. 1, the network architecture may include one or more terminal devices 101 (six terminal devices are shown in FIG. 1) and a network device 102. The network device 102 and the six terminal devices 101 (namely, terminal devices 1 to 6) in FIG. 1 may form a communications system, and terminal devices 4 to 6 may also form a communications system.

Communication between the terminal device 101 and the network device 102 includes uplink (that is, from the terminal device 101 to the network device 102) communication and downlink (that is, from the network device 102 to the terminal device 101) communication. In uplink communication, the terminal device 101 is configured to send an uplink physical channel and an uplink signal to the network device 102. The network device 102 is configured to receive the uplink physical channel and the uplink signal from the terminal device 101.

The uplink physical channel may include a random access channel (RACH), a physical uplink control channel (PUCCH), a PUSCH, and the like. The PUSCH may carry data, namely, an uplink shared channel (UL-SCH), or may carry UCI, or may carry a UL-SCH and UCI. The PUCCH may carry UCI. The uplink physical channel may also include an uplink data channel and an uplink control channel. The uplink data channel is used to carry data, and may be a PUSCH. The uplink control channel is used to carry control information, and may be a PUCCH.

The uplink signal may include a sounding reference signal (SRS), a PUCCH demodulation reference signal (DMRS), a PUSCH DMRS, an uplink phase noise tracking reference signal (PTRS), and the like.

In downlink communication, the network device 102 is configured to send a downlink physical channel and a downlink signal to the terminal device 101. The terminal device 101 is configured to receive the downlink physical channel and the downlink signal from the network device 102.

The downlink physical channel may include a physical broadcast channel (PBCH), a physical downlink control channel (PDCCH), a physical downlink shared channel (PDSCH), and the like.

The downlink signal may include a primary synchronization signal (PSS), a secondary synchronization signal (SSS), a PDCCH DMRS, a PDSCH DMRS, a downlink PTRS, a channel state information reference signal (CSI-RS), a cell reference signal (cell CRS), a time domain or frequency domain tracking reference signal (TRS), a positioning reference signal (PRS), and the like.

The terminal device 101 may be referred to as a terminal, user equipment (UE), a mobile station (MS), a mobile terminal (MT), or the like. The terminal device may be a mobile phone, a tablet computer, a computer having radio transmitting and receiving functions, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. A specific technology and a specific device form used by the terminal device are not limited in the embodiments of this application.

The network device 102 is an access device for the terminal device to access the mobile communications system in a wireless manner, and may be a base station NodeB, an evolved NodeB (eNB), a transmission reception point (TRP), a next generation NodeB (gNB) in a 5G mobile communications system, a base station in a future mobile communications system, an access point in a Wi-Fi system, or the like. A specific technology and a specific device form used by a radio access network device are not limited in the embodiments of this application.

For better understanding the communication method and device disclosed in the embodiments of the present invention, the following first describes application scenarios of the embodiments of the present invention.

1. 5G NR Air Interface Resource

Air interface resources include time domain resources and frequency domain resources. The time domain resources are divided based on symbols, and the frequency domain resources are divided based on subcarriers. A resource element (RE) is a smallest resource unit used for data transmission, and one RE corresponds to one time domain symbol and one frequency domain subcarrier. A transmission time interval (TTI) is a time domain granularity for carrying data information or service information. A length of one TTI may be S time domain symbols, or may be less than S time domain symbols. S may be 12 or 14. One TTI may correspond to one slot. A TTI including S time domain symbols may be referred to as a slot or a full slot. A TTI including less than S time domain symbols may be referred to as a mini-slot or a non-slot. For a normal cyclic prefix (CP), S=14, and for an extended CP, S=12.

Figure 2:
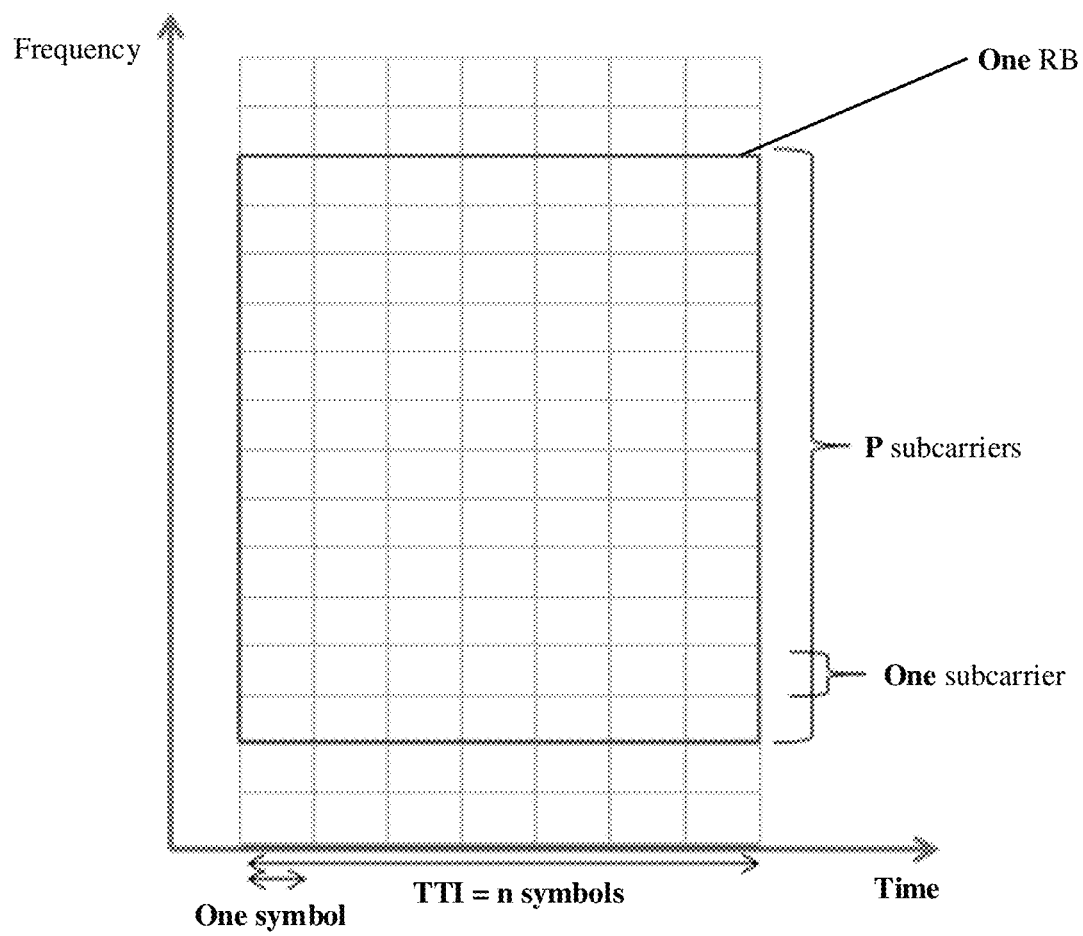
FIG. 2 is a schematic diagram of an air interface resource according to an embodiment of the present invention.

One TTI is also referred to as one transmission occasion (TO). For example, one data packet may be carried on a time-frequency resource including one TTI in time domain and at least one physical resource block (PRB) in frequency domain. A resource block (RB) is a basic unit used for resource scheduling. One RB corresponds to a plurality of subcarriers in one TTI, that is, one RB corresponds to a plurality of consecutive subcarriers in frequency domain. FIG. 2 is a schematic diagram of an air interface resource according to an embodiment of the present invention. As shown in FIG. 2, a horizontal axis represents time, a vertical axis represents frequency (Freq), one grid represents one RE, one TTI includes n time domain symbols, and one RB includes P subcarriers in one TTI, where n and P are positive integers. A time domain symbol may be an orthogonal frequency division multiplexing (OFDM) symbol, or may be a single carrier frequency division multiple access (SC-FDMA) symbol. For example, P=12.

2. Grant-Free Uplink Transmission

Uplink data transmission in a 5G NR system includes grant-based (grant-based, GB) data transmission and grant-free (grant-free, GF) data transmission.

In GB uplink data transmission, when a service arrives at a terminal device and the terminal device needs to send uplink data, the terminal device first needs to send a scheduling request (SR) on a PUCCH to a network device. After receiving the SR, the network device sends, to the terminal device, an uplink (UL) grant for scheduling a PUSCH. After receiving the uplink grant, the terminal device sends the uplink data on an uplink resource scheduled by the uplink grant. Although GB has advantages such as high reliability and high channel utilization, there is a latency in the process of sending the SR, waiting for the uplink grant, and sending the uplink data on the PUSCH scheduled by the uplink grant. Therefore, to reduce the latency, GF uplink transmission is introduced to the 5G NR system, and the network device may preconfigure and/or activate a GF resource used for GF uplink transmission. When a service arrives at the terminal device, the terminal device may not send an SR to the network device, but send uplink data information directly on the GF resource. GF may also be referred to as grant-less, configured grant (CG), or transmission without grant (TWG).

In GF transmission mode, the network device may allocate, to the terminal device in a semi-static manner, a resource used for GF transmission. The terminal device neither needs to send an SR to the network device, nor needs to receive, before sending the uplink data information, an uplink grant sent by the network device, but sends the uplink data directly on a PUSCH resource configured and/or activated by the network device. Information such as a time-frequency resource, a modulation and coding scheme, and pilot information used for GF transmission may be referred to as a GF parameter, and may be configured by the network device by using higher layer signaling, or may be indicated by the network device by using an uplink grant used to activate GF transmission, namely, a semi-static uplink grant, for example, indicated by an uplink grant scrambled by a configured scheduling radio network temporary identifier (CS-RNTI), or may be notified to the terminal device by using a combination of a higher layer signaling configuration and a semi-static uplink grant indication.

Notifying a time-frequency resource or a time unit used for GF transmission to the terminal device by the network device in the foregoing manner may be referred to as configuring the time-frequency resource used for GF transmission for the terminal device by the network device. When not scheduled by an uplink grant, the terminal device uses the GF parameter configured by the network device to send uplink information on a time-frequency resource that is configured by the network device and used for GF transmission. This is referred to as sending the uplink information in GF mode.

3. UCI Mapping on the PUSCH

The PUSCH may carry a UL-SCH but does not carry UCI, or may carry UCI but does not carry a UL-SCH, or may carry both a UL-SCH and UCI. The UCI is uplink control information fed back by the terminal device, and may include at least one of a hybrid automatic repeat request (HARQ)-acknowledgement (ACK), an SR, or channel state information (CSI).

Figure 3:
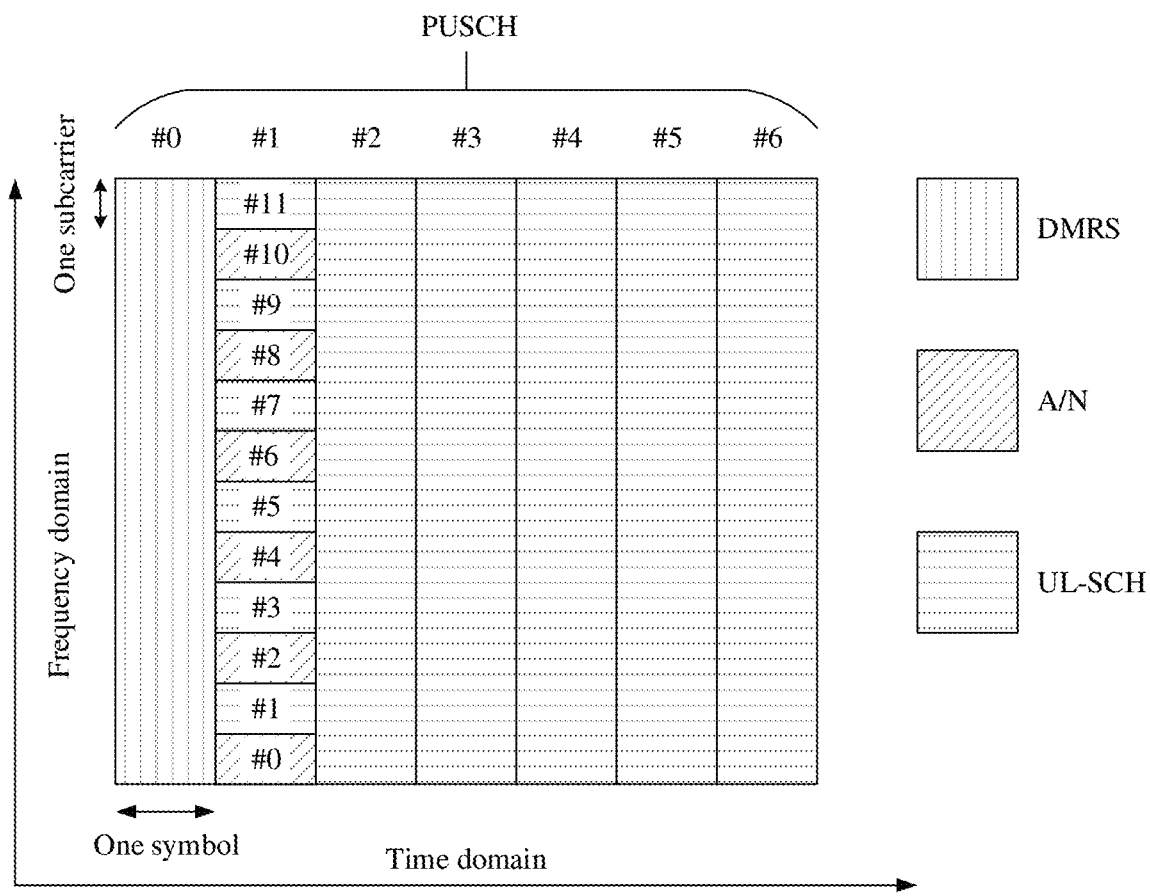
FIG. 3 is a schematic diagram of a PUSCH carrying uplink information according to an embodiment of the present invention.

When the PUSCH carries the UCI and the UL-SCH, the terminal device may multiplex the encoded UCI with the UL-SCH in a rate matching manner and map the encoded UCI to the PUSCH, or may map the encoded UCI to the PUSCH by puncturing the encoded UCI already mapped to the UL-SCH on the PUSCH, to implement multiplexing with the UL-SCH. When the PUSCH carries the UCI but does not carry the UL-SCH, the terminal device maps the encoded UCI to the PUSCH. FIG. 3 is a schematic diagram of a PUSCH carrying uplink information according to an embodiment of the present invention. As shown in FIG. 3, the uplink information includes UCI and a UL-SCH, and the UCI includes a DMRS and a HARQ-ACK. A first time domain symbol (symbol #0) of the PUSCH carries the DMRS, and the HARQ-ACK (namely, A/N) is mapped to a first time domain symbol (symbol #1) after the DMRS symbol. The UL-SCH is mapped to remaining time domain symbols on the PUSCH.

4. PUSCH Multi-Repetition Mechanism

To enhance transmission reliability, a multi-repetition mechanism for the PUSCH is further introduced to 5G NR. In other words, a same data packet is repeated on K time domain resources (or K PUSCHs corresponding to K time domain resources) for K times, that is, the same data packet is repeated for K times, that is, each of the K PUSCHs is used to carry the same data packet for transmission once, that is, each of the K time domain resources is used to carry the same data packet for transmission once. Any one of the K time domain resources or a resource used for any one of K repetitions is referred to as one TO.

For GB transmission, K time domain resources used for K repetitions are scheduled by the network device by using an uplink grant. For GF transmission, K time domain resources used for K repetitions are configured by the network device.

Figure 4:
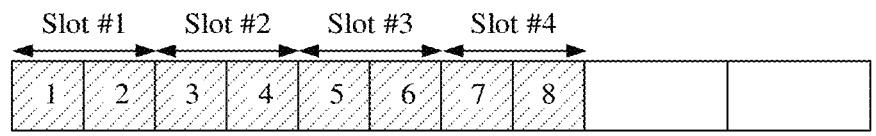
FIG. 4 is a schematic diagram of a time domain resource pattern for multiple repetitions according to an embodiment of the present invention.

In further evolution of 5G NR, a newly introduced repetition pattern is: Any one of the K repetitions is carried in a mini-slot, and at least two of the K repetitions are carried in one full slot. FIG. 4 is a schematic diagram of a time domain resource pattern for multiple repetitions according to an embodiment of the present invention. As shown in FIG. 4, K=8, the terminal device repeats same data for eight times by occupying slots n to n+3, and each repetition is carried in mini-slots (corresponding to symbols 0 to 6 or symbols 7 to 13) in corresponding slots n to n+3.

5. TBS Calculation for the UL-SCH on the PUSCH

In the 5G NR system, a TBS corresponding to the UL-SCH is obtained through calculation based on a quantity of physical resources on the PUSCH (for example, a total quantity of REs on the PUSCH), overheads on the PUSCH, and a modulation and coding scheme (MCS). The overheads on the PUSCH may include a quantity of REs occupied by the DMRS and a quantity of REs occupied by other overheads. In the PUSCH multi-repetition mechanism, because the K PUSCHs are used to repeat the same data packet, TBSs need to remain the same. When each of the K PUSCHs includes a same quantity of physical resources, TBSs calculated based on any PUSCH are all the same. Therefore, the TBS may be calculated based on a quantity of physical resources on a first PUSCH of the K PUSCHs.

For example, any one (referred to as a PUSCH #1) of the K PUSCHs is used as an example for description. The terminal device may first determine a quantity of valid REs included in each PRB on the PUSCH #1, then may determine, based on a quantity of PRBs included in the PUSCH #1, a quantity ($N_{RE}$) of valid REs included in the PUSCH #1, and then may determine, based on a modulation method ($Q_m$) corresponding to an MCS configured or indicated by the network device and a code rate (R), a quantity of systematic bits that can carry a data packet on the PUSCH #1, namely, a TBS corresponding to the data packet. For example, the TBS may be obtained based on $N_{RE} \cdot R \cdot Q_m$. The quantity of valid REs included in each PRB is a quantity of REs that is obtained by subtracting overheads (for example, the DMRS and other overheads) from a total quantity of REs included in each PRB.

When the UCI collides with one or more of PUSCHs in multiple repetitions of the UL-SCH, the terminal device adds the UCI to one of the one or more PUSCHs for sending. A quantity of physical resources (namely, a quantity of REs) used for transmitting the UCI on the PUSCH, namely, a quantity of physical resources occupied by the UCI, may be determined based on a size of the UCI, namely, a UCI payload size, a quantity of physical resources that can be used to carry the UCI on the PUSCH, the TBS corresponding to the UL-SCH on the PUSCH, and an equalization parameter.

When the UCI is a HARQ-ACK, a formula for calculating the quantity of physical resources occupied by the UCI may be expressed as a formula (1):

$$Q'_{ACK} = \min\left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil \right\} \quad (1)$$

where $Q'_{ACK}$ is the quantity of physical resources occupied by the UCI, $O_{ACK}$ is a quantity of bits of the HARQ-ACK (namely, a payload size of the HARQ-ACK), and $L_{ACK}$ is a quantity of cyclic redundancy check (CRC) bits of the HARQ-ACK. $\beta_{offset}^{PUSCH}$ is an equalization parameter, and may be considered as a ratio of a code rate of other information (such as the UL-SCH) on the PUSCH to a code rate of the UCI. $\beta_{offset}^{PUSCH}$ is notified by the network device, and is a number greater than 0.

$$\sum_{r=0}^{C_{UL-SCH}-1} K_r$$

is the TBS corresponding to the UL-SCH on the PUSCH, $C_{UL-SCI}$ is a quantity of code blocks included in the UL-SCH on the PUSCH, and $K_r$ is a quantity of bits of an $r^{th}$ code block in the UL-SCH on the PUSCH.

$$\sum_{l=0}^{N_{symb,all}^{PUSCH}-1} M_{sc}^{UCI}(l)$$

a quantity of physical resources that can be used to carry the UCI on the PUSCH, $M_{sc}^{UCI}(l)$ is a quantity of physical resources that can be used to carry the UCI on a time domain symbol l on the PUSCH, and $N_{symball}^{PUSCH}$ is a total quantity of time domain symbols on the PUSCH (including a quantity of symbols carrying the DMRS). When l is a time domain symbol that carries a DMRS, =0. When l is a time domain symbol that does not carry a DMRS, $M_{sc}^{UCI}(l) = M_{sc}^{PUSCH} - M_{sc}^{PT-RS}(l)$, where $M_{sc}^{PUSCH}$ is a total quantity of physical resources included in the symbol l (namely, a quantity of subcarriers) on the PUSCH, and $M_{sc}^{PT-RS}(l)$ is a quantity of physical resources occupied by a PTRS on the symbol l on the PUSCH. α is a resource scaling factor, and $l_0$ is a first time domain symbol that does not carry a DMRS after the first DMRS symbol on the PUSCH.

When the UCI is a CSI part 1, a formula for calculating the quantity of physical resources occupied by the UCI may be expressed as a formula (2):

$$Q'_{CSI-1} = \min\left\{ \left\lceil \frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK} \right\} \quad (2)$$

where $Q'_{CSI-1}$ is the quantity of physical resources occupied by the UCI, $O_{CSI-1}$ is a quantity of bits of the CSI part 1 (namely, a payload size of the CSI part 1), $L_{CSI-1}$ is a quantity of CRC bits of the CSI part 1, and $Q'_{ACK}$ is a Quantity of physical resources used to transmit the HARQ-ACK or potentially used to transmit the HARQ-ACK. The physical resources potentially used to transmit the HARQ-ACK are reserved resources reserved for HARQ-ACK transmission in some cases (for example, the quantity of bits of the HARQ-ACK does not exceed 2). The terminal device may actually occupy the reserved resource to transmit the HARQ-ACK, or may not occupy the reserved resource to transmit the HARQ-ACK (for example, the UL-SCH is mapped to the reserved resource).

When the UCI is a CSI part 2, a formula for calculating the quantity of physical resources occupied by the UCI may be expressed as a formula (3):

$$Q'_{CSI-2} = \min\left\{ \left\lceil \frac{(O_{CSI-2} + L_{CSI-2}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK} - Q'_{CSI-1} \right\} \quad (3)$$

where $Q'_{CSI-2}$ is the quantity of physical resources occupied by the UCI, $O_{CSI-2}$ is a quantity of bits of the CSI part 2 (namely, a payload size of the CSI part 2), $L_{CSI-2}$ is a quantity of CRC bits of the CSI part 2, $Q'_{ACK}$ is a quantity of physical resources used to transmit the HARQ-ACK or potentially used to transmit the HARQ-ACK, and $Q'_{CSI-1}$ is a quantity of physical resources occupied by the CSI part 1.

The terminal device may obtain, through calculation based on at least one of the formula (1), (2), or (3), the quantity of physical resources occupied by the UCI, and then performing encoding based on original information of the UCI before encoding (for example, a UCI sequence $a_0$, $a_1$, $a_2$, $a_3$, . . . , $a_{A-1}$) and the quantity of physical resources occupied by the UCI (namely, the quantity of physical resources carrying the UCI). For the same information of the UCI before encoding, when the quantity of physical resources occupied by the UCI is relatively large, a code rate of corresponding encoded information of the UCI is relatively low, and reliability of the UCI is relatively high. When the quantity of physical resources occupied by the UCI is relatively small, a code rate of corresponding encoded information of the UCI is relatively high, and reliability of the UCI is relatively low.

The terminal device may calculate, based on the quantity of physical resources used to carry the UCI on the current PUSCH and a TBS corresponding to the UL-SCH data packet on the current PUSCH, the quantity of physical resources occupied by the UCI. For multiple repetitions of PUSCHs, when quantities of physical resources used for data transmission and corresponding to PUSCHs in multiple repetitions are the same, an existing method for calculating a TBS of a UL-SCH data packet may be used, that is, the TBS is calculated based on the quantity of physical resources included in the first PUSCH of the K PUSCHs. In this way, an appropriate quantity of physical resources occupied by the UCI can be obtained.

However, in further evolution of 5G NR, overload occurs on one PUSCH in multiple repetitions of PUSCHs in some scenarios. To be specific, a TBS obtained through calculation for a data packet actually transmitted on the PUSCH is greater than a TBS suitable for transmission on the PUSCH (for example, a TBS supported by a channel condition); and consequently, determining of a quantity of physical resources occupied by UCI on the PUSCH is affected.

Scenario 1: K PUSCHs include one or more relatively large PUSCHs and one or more relatively small PUSCHs, and a quantity of physical resources used for data transmission that are included in the relatively large PUSCH is greater than a quantity of physical resources used for data transmission that are included in the relatively small PUSCH.

Figure 5A:
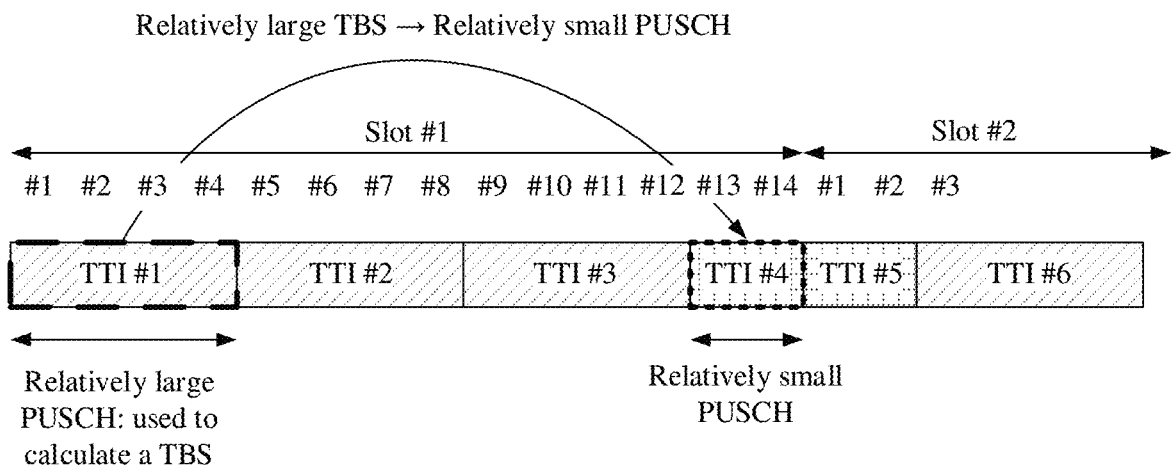
FIG. 5a is a schematic diagram of K PUSCHs according to an embodiment of the present invention.

Scenario 1-1: Generally, PUSCHs of equal lengths are used for K repetitions, and such a PUSCH is also referred to as a PUSCH of a normal length or a nominal PUSCH. However, considering that both a start point of the K repetitions and a length of a PUSCH are flexible, some orphan symbols may exist between an end point of a last PUSCH of a normal length in a slot and an end boundary of the slot, and a PUSCH of a normal length cannot be formed. Instead, a gap smaller than a normal time domain length of a PUSCH is formed. To use these orphan symbols as far as possible, the gap may be used to transmit a short PUSCH whose time domain length is less than that of another PUSCH of a normal length. In this case, a quantity of valid REs on the short PUSCH (namely, a relatively small PUSCH) is less than a quantity of valid REs on a PUSCH (namely, a relatively large PUSCH) of a normal length. FIG. 5a is a schematic diagram of K PUSCHs according to an embodiment of the present invention. As shown in FIG. 5a, K=6, a start symbol of the six PUSCHs is a symbol #1 of a slot #1, a time domain length of each nominal PUSCH notified by the network device is four symbols, and after the third nominal PUSCH ends, a two-symbol gap is left at a boundary of the slot #1. To properly use resources, an original resource of the fourth nominal PUSCH may be divided into two short PUSCHs that span the slot boundary, namely, the fourth PUSCH and the fifth PUSCH, which respectively occupy two symbols. Quantities of physical resources used for data transmission that are included in the fourth PUSCH and the fifth PUSCH are less than a quantity of physical resources used for data transmission that are included in another normal PUSCH.

Figure 5B:
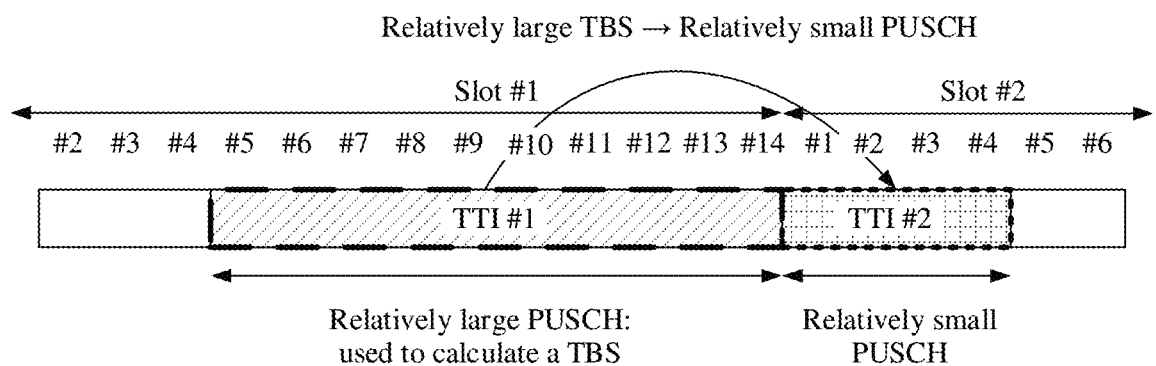
FIG. 5b is another schematic diagram of K PUSCHs according to an embodiment of the present invention.

Scenario 1-2: The terminal device may determine two or more PUSCH segments of unequal lengths based on a slot boundary or a symbol format, and each PUSCH segment carries a data packet for transmission once. The symbol format may be an uplink symbol, a downlink symbol, or a flexible symbol notified by the network device. For example, the network device may notify a long total time domain resource, and when the total time domain resource spans K−1 slot boundaries, K repetitions of PUSCHs are formed, and boundaries of any two adjacent PUSCHs are slot boundaries. When the total time domain resource spans K uplink area segments, K repetitions of PUSCHs are formed, and each PUSCH occupies an uplink area segment. An uplink area is a time domain resource including one or more consecutive time domain symbols that are notified by the network device as uplink symbols or non-downlink symbols. FIG. 5b is another schematic diagram of K PUSCHs according to an embodiment of the present invention. As shown in FIG. 5b, a total length of a time domain resource notified by the network device is 14 symbols, and a start symbol is a symbol #5 of a slot #1. The total length spans a boundary between the slot #1 and a slot #2, and therefore is divided by the slot boundary into K=2 PUSCHs of different lengths, where a length of a PUSCH before the slot boundary is 10 symbols, and a length of a PUSCH after the slot boundary is 4 symbols. A quantity of physical resources used for data transmission that are included in the second PUSCH (a relatively small PUSCH) is less than a quantity of physical resources used for data transmission that are included in the first PUSCH (a relatively large PUSCH).

Scenario 1-3: The network device notifies a time domain resource occupied by each of K PUSCHs, where the K PUSCHs include at least two PUSCHs of unequal lengths. For example, limited by factors such as a start point and an end point of a PUSCH, and a length of an uplink area, a start point of one of the K PUSCHs is relatively late, or an end point thereof is relatively early, or a time domain length included in an uplink area in which the PUSCH is located is relatively short. In this case, a time domain length of the PUSCH notified by the network device is relatively short (a relatively small PUSCH). A start point of a PUSCH is relatively early, or an end point thereof is relatively late, or a time domain length included in an uplink area in which the PUSCH is located is relatively long. In this case, a time domain length of the PUSCH notified by the network device is relatively long (a relatively large PUSCH). A quantity of physical resources used for data transmission that are included in the relatively large PUSCH is greater than a quantity of physical resources used for data transmission that are included in the relatively small PUSCH.

For the scenario 1-1, 1-2, or 1-3, when the terminal device calculates a TBS based on a relatively large PUSCH, a data packet corresponding to the TBS is carried on a relatively small PUSCH. As a result, a code rate corresponding to the relatively small PUSCH is excessively high (higher than a corresponding code rate for carrying the data packet on the relatively large PUSCH). In other words, the TBS obtained through calculation is greater than a TBS suitable for carrying the data packet on the relatively small PUSCH, that is, the TBS obtained through calculation is greater than a TBS suitable for a relatively small PUSCH resource. In this case, the relatively small PUSCH is referred to as an overloaded PUSCH, for example, the fourth PUSCH and the fifth PUSCH in FIG. 5a, and the second PUSCH in FIG. 5b.

Figure 5C:
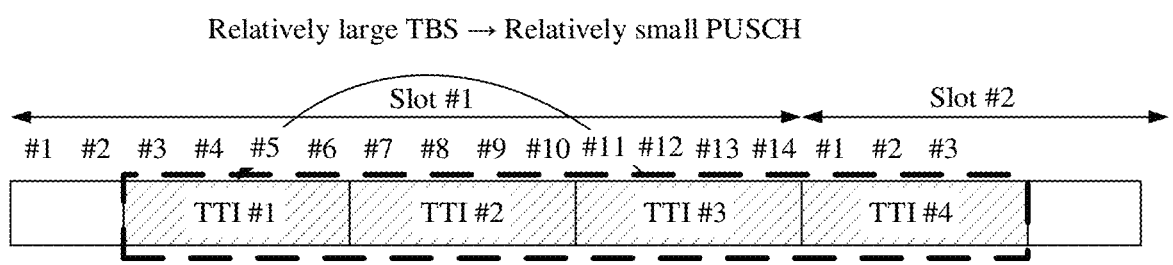
FIG. 5c is still another schematic diagram of K PUSCHs according to an embodiment of the present invention.

Scenario 2: To achieve better transmission reliability and scheduling flexibility, for K repetitions of PUSCHs, a TBS of a data packet may be calculated based on a total quantity of physical resources included in a plurality of PUSCHs (for example, M PUSCHs, where M is greater than 1 and less than or equal to K) in the K PUSCHs, and the data packet corresponding to the TBS is carried and repeated on each of the K PUSCHs. When quantities of physical resources included in the K PUSCHs are the same, a TBS obtained through calculation based on a total quantity of physical resources included in the K PUSCHs is K times a TBS obtained through calculation based on a quantity of physical resources included in one PUSCH. FIG. 5c is still another schematic diagram of K PUSCHs according to an embodiment of the present invention. As shown in FIG. 5c, K=4, and the terminal device may calculate a TBS of a data packet based on a total quantity of physical resources included in the four PUSCHs, and repeatedly add the data packet corresponding to the TBS to each of the four PUSCHs for transmission.

When the terminal device calculates a TBS of a UL-SCH based on a plurality of PUSCHs, the TBS obtained through calculation may be excessively large, resulting in an excessively high corresponding code rate for mapping the data packet to a single PUSCH. For example, a quantity of pieces of encoded information that can be carried by a physical resource included in a single PUSCH is 1000 bits, a TBS obtained through calculation based on the single PUSCH is 200 bits, and a corresponding code rate is 0.2; however, a TBS obtained through calculation based on four PUSCHs is 800 bits, and a corresponding code rate is 0.8. In other words, the TBS obtained through calculation is greater than a TBS suitable for carrying the encoded information on the single PUSCH, that is, the TBS obtained through calculation is greater than a TBS suitable for carrying the encoded information on a physical resource included in the single PUSCH. In this case, the single PUSCH is referred to as an overloaded PUSCH.

For the scenario 1 and the scenario 2, when one of the K PUSCHs is an overloaded PUSCH, on one hand, an actual code rate for transmitting the UL-SCH on the overloaded PUSCH is excessively high, and reliability is impaired. On the other hand, when the overloaded PUSCH needs to carry the UCI, it can be learned from formulas (1), (2), and (3) that the quantity of physical resources used to calculate the TBS of the UL-SCH is greater than a quantity of physical resources included in the overloaded PUSCH. Therefore, the TBS $$\sum_{r=0}^{C_{UL-SCH}-1} K_r$$

corresponding to the UL-SCH used to calculate the quantity of physical resources occupied by the UCI mismatches the quantity $$\sum_{l=0}^{N_{symb,all}^{PUSCH}-1} M_{sc}^{UCI}(l)$$

of physical resources of the overloaded PUSCH: The TBS corresponding to the UL-SCH is excessively large. As a result, the quantity of physical resources used to transmit the UCI, which is obtained through calculation, is excessively small. Consequently, the code rate of the UCI is excessively high and transmission reliability is reduced. In an extreme case, the UL-SCH or UCI mapped to the overloaded PUSCH may lose system bits due to an excessively high code rate (for example, the code rate exceeds a maximum code rate supported by the 5G NR system, for example, 772/1024, 948/1024, or 1).

Figure 5D:
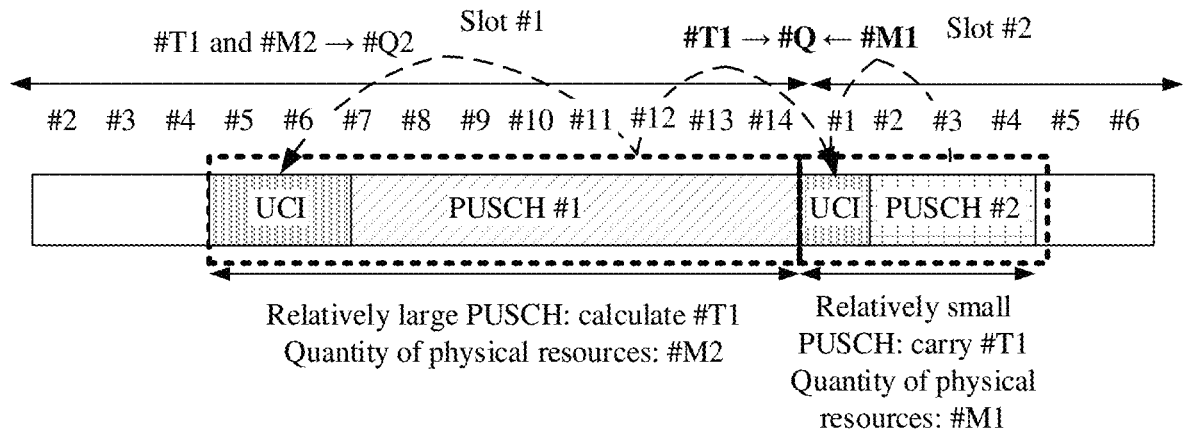
FIG. 5d is still another schematic diagram of K PUSCHs according to an embodiment of the present invention.

FIG. 5d is still another schematic diagram of K PUSCHs according to an embodiment of the present invention. As shown in FIG. 5d, K=2, quantities of physical resources included in the two PUSCHs are not equal, a quantity of physical resources of a long PUSCH is twice a quantity of physical resources of a short PUSCH, and a TBS of a data packet repeated on the two PUSCHs is obtained through calculation based on the quantity of physical resources of the long PUSCH. When a piece of UCI (UCI #1) needs to be carried on the long PUSCH, a quantity of physical resources occupied by the UCI is N REs, and a code rate (CR) is 0.4. Likewise, when a piece of UCI (UCI #2) with a same payload size needs to be carried on the short PUSCH, a quantity of physical resources occupied by the UCI is N/2 REs, and a CR is 0.8. Therefore, performance of the UCI carried on the short PUSCH is impaired.

Repeating the data packet on another PUSCH of the K PUSCHs may compensate for the performance impairment caused by the transmission of the UL-SCH on the overloaded PUSCH. In addition, because other PUSCHs in the K PUSCHs may use different redundancy versions (RVs), even if a system bit on the overloaded PUSCH is lost, the lost system bit may also be retransmitted by using a different RV version on another PUSCH.

However, when the overloaded PUSCH carries the UCI, the UCI may be transmitted only once on the overloaded PUSCH, or even if the UCI may be repeated for multiple times, the existing 5G NR system does not support use of a plurality of different RV versions by UCI in multiple repetitions. Therefore, it is difficult to compensate for a reliability loss of UCI caused by PUSCH overload. Therefore, in a case of PUSCH overloading, how to improve reliability of UCI transmission has become a technical problem to be urgently resolved.

For better understanding the communication method and device disclosed in the embodiments of the present invention, the following first describes some technical terms in the embodiments of the present invention.

1. Acronyms and Abbreviations and Descriptions

Uplink data channel (for example, any one of K uplink data channels, a first uplink data channel, any uplink data channel in an uplink data channel set, a second uplink data channel, a third uplink data channel, a fourth uplink data channel, a first equivalent uplink data channel, or a second equivalent uplink data channel): an uplink channel for carrying uplink data information. The uplink data channel may alternatively be used to carry UCI (for example, first UCI or second UCI). Specifically, the uplink data channel may be a PUSCH.

Uplink control channel: an uplink channel for carrying uplink control information. Specifically, the uplink control channel may be a PUCCH.

TBS of a first data packet: #T1, namely, a first TBS, corresponding to the uplink data channel set, or determined based on the uplink data channel set.

Equivalent TBS: #T2, corresponding to the first uplink data channel, or determined based on the first uplink data channel.

Total quantity of physical resources included in the first uplink data channel: #Z1, including all REs of the first uplink data channel. For example, $\#Z1 = N_{sc}^{RB} \cdot N_{symb}^{sh} \cdot n_{PRB}$, where $n_{PRB}$ represents a quantity of PRBs included in the first uplink data channel, $N_{sc}^{RB}$ represents a quantity of subcarriers included in a PRB in frequency domain, and $N_{symb}^{sh}$ represents a quantity of time domain symbols included in the first uplink data channel.

Total quantity of physical resources included in the uplink data channel set: #Z2, including all REs of all uplink data channels in the uplink data channel set. For example, $$\#Z2 = \sum_{j \in \Omega} N_{sc}^{RB} \cdot N_{symb}^{sh}(j) \cdot n_{PRB}(j),$$

where $\Omega$ is the uplink data channel set, $n_{PRB}(j)$ represents a quantity of PRBs included in a $j^{th}$ uplink data channel in the uplink data channel set, and $N_{symb}^{sh}(j)$ represents a quantity of time domain symbols included in the $j^{th}$ uplink data channel in the uplink data channel set.

Quantity of physical resources for determining the first TBS #T1: #P1, namely, a quantity of physical resources that are in the uplink data channel set and used to determine the first TBS #T1, where #P1 may be less than #Z2, or may be equal to #Z2.

Quantity of physical resources for determining the equivalent TBS #T2: #P2, namely, a quantity of physical resources that are on the first uplink data channel and used to determine the equivalent TBS #T2, where #P2 may be less than #Z1, or may be equal to #Z1.

Physical resource actually used to send the first UCI: #q, namely, a physical resource actually occupied by the first UCI.

Quantity of physical resources actually used to send the first UCI: #Q, namely, a quantity of physical resources occupied by the first UCI, and corresponding to #q.

Quantity of physical resources that are on the first uplink data channel and used to calculate the quantity #Q of physical resources occupied by the first UCI: #M1, also referred to as a quantity of physical resources that can be used to carry the UCI on the first uplink data channel, where #M1 may be less than #Z1, or may be equal to #Z1.

Quantity of equivalent physical resources used to calculate the quantity #Q of physical resources occupied by the first UCI: #M2. For example, #M2 is a quantity of physical resources that are in the uplink data channel set and used to calculate the quantity of equivalent physical resources, and is also referred to as a quantity of physical resources that can be used to carry the UCI in the uplink data channel set. #M2 may be less than #Z2, or may be equal to #Z2.

Quantity of physical resources that are on the second uplink data channel and used to calculate the quantity #Q of physical resources occupied by the first UCI: #M3, also referred to as a quantity of physical resources that can be used to carry the UCI on the second uplink data channel.

2. Data Packet

A data packet (for example, the first data packet) is a payload before modulation and coding, and may be referred to as a transport block (TB), a medium access control protocol data unit (MAC PDU), a UL-SCH, or a UL-SCH payload. One data packet may include one or more code blocks (CBs).

3. K Repetitions

K is a positive integer.
For example, K is 1.
For another example, K is an integer greater than or equal to 2.

It should be understood that all of the K uplink data channels are used to transmit a same data packet (for example, the first data packet) for K times. To be specific, the terminal device uses the K uplink data channels to repeat the data packet for K times, that is, each of the K uplink data channels is used to carry the data packet for transmission once. Specifically, payloads carried on different uplink data channels of the K uplink data channels are the same, that is, all data transmitted on different uplink data channels of the K uplink data channels is encoded data of (a payload of) the same data packet. In other words, information carried on different uplink data channels of the K uplink data channels corresponds to same information before encoding (for example, all information is the first data packet). For example, the terminal device encodes the data packet to generate a mother code, and information carried on different uplink data channels of the K uplink data channels may include all or a part of information in the mother code. Whether same encoded information is sent on different uplink data channels of the K uplink data channels is not limited. To be specific, the network device may indicate the terminal device to use same or different redundancy versions or use same or different DMRSs, or use same or different scrambling codes for scrambling when sending data packets on different uplink data channels of the K uplink data channels, that is, although the network device configures or indicates the terminal device to use different redundancy versions, use different DMRS sequences, or use different scrambling codes for scrambling when sending the data packets on different uplink data channels of the K uplink data channels, all the data packets carried on different uplink data channels of the K uplink data channels correspond to a same payload.

It should be understood that a repetition of the data packet may also be referred to as aggregation or slot aggregation of the data packet.

It should be understood that the K uplink data channels do not overlap each other in time domain.

Further, the K uplink data channels may be continuous or discontinuous in time domain. That the K uplink data channels are continuous in time domain means that there is no gap between any two adjacent uplink data channels of the K uplink data channels. That the K uplink data channels are discontinuous in time domain means that at least two adjacent uplink data channels of the K uplink data channels are discontinuous in time domain (that is, a gap exists).

It should be understood that the K uplink data channels are located on a same carrier or in a same bandwidth part (BWP).

In one case, time domain lengths of the K uplink data channels are all equal.

In another case, when K is greater than or equal to 2, the K uplink data channels include at least two uplink data channels with different time domain lengths.

A time domain resource A (for example, a first time domain resource) may completely or partially overlap a time domain resource B (for example, the first uplink data channel) in time domain. Complete overlapping means that the time domain resource A completely includes the time domain resource B, or that the time domain resource B completely includes the time domain resource A. Partial overlapping means that the time domain resource A includes a part of the time domain resource B but does not include another part of the time domain resource B, or that the time domain resource B includes a part of the time domain resource A but does not include another part of the time domain resource A.

In one case, that the first time domain resource overlaps the first uplink data channel in time domain includes: The first time domain resource overlaps the first uplink data channel of the K uplink data channels in time domain, but does not overlap another uplink data channel of the K uplink data channels.

In another case, that the first time domain resource overlaps the first uplink data channel in time domain includes: In addition to overlapping the first uplink data channel of the K uplink data channels in time domain, the first time domain resource overlaps at least another uplink data channel of the K uplink data channels different from the first uplink data channel in time domain. When the first time domain resource simultaneously overlaps a plurality of uplink data channels of the K uplink data channels in time domain, the first uplink data channel may be a first one (namely, an earliest uplink data channel) of the plurality of uplink data channels that overlap the first time domain resource in time domain, in the K uplink data channels.

4. Valid Information Size or TBS

The terminal device may determine, based on the TBS (namely, the first TBS) of the first data packet, the quantity #Q of physical resources corresponding to the physical resources on the first uplink data channel, that is, the terminal device may determine the quantity #Q of physical resources on the first uplink data channel based on a valid information size of the first data packet. The valid information size of the first data packet corresponds to the TBS of the first data packet, that is, the valid information size of the first data packet is determined by the TBS of the first data packet.

It should be understood that the valid information size of the first data packet is an information size or a quantity of bits before the first data packet is encoded. The valid information size of the first data packet may be a sum of code block sizes (CBSs) of all CBs included in the first data packet, namely, $$\sum_{r=0}^{C_{UL-SCH}-1} K_r$$

in the formula (1), formula (2), and formula (3). The valid information size of the first data packet may also be a payload size of the first data packet. The valid information size of the first data packet may also be a TBS of the first data packet.

It should be understood that valid information of the first data packet may be referred to as a payload of the first data packet.

It should be understood that a payload of the UL-SCH (for example, the UL-SCH corresponding to the first data packet) or a payload of the UCI (for example, first UCI or second UCI) is information before modulation and coding. The payload may be information bits, or may be systematic bits, or may be systematic bits and CRC bits. The payload of the UL-SCH may be information before code block segmentation (TB information) or information after code block segmentation (CB information). The systematic bits of the UCI may be referred to as a UCI bit sequence. The systematic bits of the UL-SCH may be referred to as transport block bits. A load sequence may be expressed as $a_0, a_1, a_2, a_3, \ldots, a_{A-1}$, $b_0, b_1, b_2, b_3, \ldots, b_{B-1}, c_{r0}, c_{r1}, c_{r2}, c_{r3}, \ldots, c_{r(K_r-1)}$, or $c_0, c_1, c_2, c_3, \ldots, c_{K-1}$. A quantity of bits of the payload is the payload size.

For example, the information bits of the first data packet form a plurality of code blocks after code block segmentation. Therefore, the first TBS may correspond to the sum $$\sum_{r=0}^{C_{UL-SCH}-1} K_r$$

of the CBSs of all the CBSs included in the first data packet, or $$\sum_{r=0}^{C_{UL-SCH}-1} K_r$$

corresponding to the first data packet is obtained based on the first TBS. Therefore, the quantity of physical resources occupied by the first UCI may be obtained based on the first TBS.

Similarly, the quantity #Q of physical resources corresponding to the physical resources on the first uplink data channel is determined based on the equivalent TBS, that is, the quantity #Q of physical resources on the first uplink data channel is determined based on the valid information size corresponding to the equivalent TBS. The valid information size corresponding to the equivalent TBS corresponds to the equivalent TBS, that is, the valid information size corresponding to the equivalent TBS is determined by the equivalent TBS. The valid information size $$\sum_{r=0}^{C_{UL-SCH}-1} K_r^{eff}$$

corresponding to the equivalent TBS is a payload size of a virtual data packet corresponding to the equivalent TBS or a size of information or a quantity of bits before a virtual data packet is encoded, and may be a sum of CBSs of at least one equivalent CB corresponding to the equivalent TBS (for example, a sum of CBSs of all equivalent CBs formed after code block segmentation is performed on the virtual data packet corresponding to the equivalent TBS). The valid information size corresponding to the equivalent TBS may also be the equivalent TBS.

5. Physical Resource

A physical resource is also referred to as a time-frequency resource.

A quantity of physical resources may be referred to as a quantity of REs, or may be referred to as a number of modulation symbols (the number of coded modulation symbols). A physical resource included in an uplink data channel (for example, any one of the K uplink data channels, the first uplink data channel, any uplink data channel in the uplink data channel set, the second uplink data channel, the third uplink data channel, the fourth uplink data channel, the first equivalent uplink data channel, or the second equivalent uplink data channel) is a time-frequency resource for mapping uplink information (for example, the UCI or UL-SCH) on the uplink data channel, and a quantity of physical resources is a number of modulation symbols corresponding to the uplink information after the uplink information is modulated.

The quantity of physical resources included in the uplink data channel or the uplink data channel set for determining the TBS may include the following cases.

Case 1-1: The TBS of the first data packet is determined based on the quantity of physical resources included in the uplink data channel set.

Further, the uplink data channel set is different from the first uplink data channel.

Optionally, the uplink data channel set is one uplink data channel (referred to as a reference uplink data channel). In other words, the TBS of the first data packet is determined based on a quantity of physical resources included in a reference uplink data channel of the K uplink data channels, and the reference uplink data channel is different from the first uplink data channel.

Optionally, the uplink data channel set is J uplink data channels, where J is an integer greater than 1 and less than or equal to K. In other words, the TBS of the first data packet is determined based on the J uplink data channels of the K uplink data channels, that is, the TBS of the first data packet is determined based on a sum of quantities of physical resources included in the J uplink data channels of the K uplink data channels. It should be understood that when J<K, the J uplink data channels may include the first uplink data channel or may not include the first uplink data channel. When J=K, the uplink data channel set is the K uplink data channels.

For example, the quantity of physical resources for determining the TBS of the first data packet is #P1. #P1 may also be referred to as a quantity of physical resources that are included in the uplink data channel set and used to determine the TBS of the data packet. When the uplink data channel set is a reference uplink data channel, #P1 is a quantity of physical resources that are on the reference uplink data channel and used to determine the TBS of the data packet. When the uplink data channel set includes J uplink data channels, #P1 is a sum of quantities of physical resources that are on all the uplink data channels in the uplink data channel set and used to determine the TBS of the data packet. J is an integer greater than 1 and less than or equal to K.

Case 1-2: The equivalent TBS is determined based on the quantity of physical resources included in the first uplink data channel, or is determined based on a quantity of physical resources included in the first equivalent uplink data channel.

With reference to the foregoing case 1-1 and case 1-2, for any uplink data channel (for example, any one of the K uplink data channels, the first uplink data channel, any uplink data channel in the uplink data channel set, the second uplink data channel, the third uplink data channel, the fourth uplink data channel, or the first equivalent uplink data channel), a physical resource included in the uplink data channel is referred to as a physical resource that is on the uplink data channel and used to determine the TBS of the data packet. The physical resource that is on the uplink data channel and used to determine the TBS of the data packet may be all physical resources included in the uplink data channel, or may be a part of physical resources included in the uplink data channel. Specifically, the part of physical resources are a quantity of physical resources that are on the uplink data channel and used to carry a modulation symbol. More specifically, the modulation symbol may be a modulation symbol used to carry data information (for example, the UL-SCH), or may be a modulation symbol used to carry data information and control information.

For example, the quantity of physical resources for determining the first TBS #T1 is #P1, matching the uplink data channel set. When #P1=#Z2, it indicates that the physical resources included in the uplink data channel set for determining the first TBS #T1 are all physical resources included in the uplink data channel set. When #P1<#Z2, it indicates that the physical resources that are in the uplink data channel set and used to determine the first TBS #T1 are a part of physical resources in the uplink data channel set.

Similarly, the quantity of physical resources for determining the equivalent TBS #T2 is #P2, matching the first uplink data channel. When #P2=#Z1, it indicates that the physical resources that are included in the first uplink data channel and used to determine the equivalent TBS #T2 are all physical resources included in the first uplink data channel. When #P2<#Z1, it indicates that the physical resources that are on the first uplink data channel and used to determine the equivalent TBS #T2 are a part of physical resources on the first uplink data channel. #P2 may also be referred to as a quantity of physical resources that are on the first uplink data channel and used to determine the TBS of the data packet.

Specifically, for any one of the foregoing uplink data channels, when physical resources that are included in the uplink data channel and used to determine the TBS of the data packet are a part of physical resources included in the uplink data channel, the part of physical resources do not include physical resources notified by the network device as overhead REs on the uplink data channel. The overhead RE may include an RE used to carry a DMRS, or may also include another overhead, for example, an overhead RE notified by higher layer signaling xOverhead. The overhead RE may further include an RE used to carry an SRS. In other words, the part of physical resources that are included in the uplink data channel and used to determine the TBS are physical resources obtained after overhead REs are subtracted from all physical resources on the uplink data channel.

More specifically, the quantity $N_{RE}$ of physical resources that are included in the uplink data channel and used to determine the TBS of the data packet may be min(156, $N'_{RE}$)·$n_{PRB}$, or may be $N'_{RE}$·$n_{PRB}$, or may be $N_{sc}^{RB}$·$N_{symb}^{sh}$·$n_{PRB}$. min(156, $N'_{RE}$)·$n_{PRB}$ and $N'_{RE}$·$n_{PRB}$ represent a part of physical resources on the uplink data channel, and $N_{sc}^{RB}$·$N_{symb}^{sh}$·$n_{PRB}$ represents all physical resources on the uplink data channel. $N'_{RE}$ indicates a quantity of valid REs included in one PRB on the uplink data channel, and $n_{PRB}$ indicates a quantity of PRBs included in the uplink data channel. $N'_{RE}$ may be $N_{sc}^{RB}$·$N_{symb}^{sh}$−$N_{DMRS}^{PRB}$−$N_{oh}^{PRB}$, where $N_{sc}^{RB}$ indicates a quantity of subcarriers of one PRB in frequency domain and may be specifically 12, $N_{symb}^{sh}$ indicates a quantity of symbols included in the uplink data channel, $N_{DMRS}^{PRB}$ indicates a quantity of REs occupied by a DMRS in one PRB of the uplink data channel (which may also be referred to as DMRS overheads), and $N_{ch}^{PRB}$ indicates a quantity of REs occupied by other overheads in one PRB of the uplink data channel and may be a quantity of REs occupied by overheads of each PRB configured by an xOverhead parameter in a higher layer parameter PUSCH-ServingCellConfig. $N_{RE}$ may also be referred to as a quantity of physical resources that are on the uplink data channel and used to determine the TBS of the data packet.

It should be understood that when J>1, and the uplink data channel set is used to determine the first TBS #T1, the foregoing $N_{RE}$ may be replaced with the sum of quantities of physical resources that are on all the uplink data channels in the uplink data channel set and used to determine the TBS of the data packet, or the foregoing $N_{RE}$ is replaced after calculation is performed based on the sum of quantities of physical resources that are on all the uplink data channels in the uplink data channel set and used to determine the TBS of the data packet (for example, the sum of quantities of physical resources is divided by the quantity of the uplink data channels in the uplink data channel set).

Determining the quantity of physical resources occupied by the UCI may include the following cases.

Case 2-1: The quantity is determined as the quantity #M1 of physical resources used to determine the quantity #Q of physical resources occupied by the first UCI on the first uplink data channel, also referred to as the quantity of physical resources that can be used to carry the UCI on the first uplink data channel (the number of resource elements that can be used for transmission of UCI), namely, $$\sum_{l=0}^{N_{symb,all}^{PUSCH}-1} M_{sc}^{UCI}(l).$$

Herein, $N_{symb,all}^{PUSCH}$ is the quantity of time domain symbols on the first uplink data channel; l is a sequence number of a time domain symbol on the first uplink data channel; and $M_{sc}^{UCI}(l)$ is a quantity of physical resources that can be used to carry the UCI on a time domain symbol l on the first uplink data channel.

Case 2-2: The quantity is determined as the quantity #M2 of physical resources that are in the uplink data channel set and used to determine the quantity #Q of physical resources occupied by the first UCI, also referred to as the quantity of physical resources that can be used to carry the UCI in the uplink data channel set, namely, a sum of quantities of physical resources that can be used to carry the UCI on all the uplink data channels in the uplink data channel set. #M2 may be $$\sum_{j\in\Omega}\sum_{l=0}^{N_{symb,all}^{PUSCH}(j)-1} M_{sc}^{UCI}(j,l),$$

where $\Omega$ is the uplink data channel set, j is the $j^{th}$ uplink data channel in the uplink data channel set, $N_{symb,all}^{PUSCH}(j)$ is the quantity of time domain symbols on the $j^{th}$ uplink data channel, l is a sequence number of a time domain symbol on the $j^{th}$ uplink data channel, and $M_{sc}^{UCI}(j,l)$ is a quantity of physical resources that can be used to carry the UCI on a time domain symbol l on the $j^{th}$ uplink data channel. When the uplink data channel set is one uplink data channel (namely, a reference uplink data channel, where in this case, |$\Omega$|=1), #M2 may also be expressed as $$\sum_{l=0}^{\overline{N}_{symb,all}^{PUSCH}-1} \overline{M}_{sc}^{UCI}(l),$$

where $\overline{N}_{symb,all}^{PUSCH}$ is a quantity of time domain symbols on the uplink data channel corresponding to the uplink data channel set, and $\overline{M}_{sc}^{UCI}(l)$ is a quantity of physical resources that can be used to carry the UCI on a symbol l on the uplink data channel corresponding to the uplink data channel set. #M1 and #M2 may be equal or unequal.

Case 2-3: The quantity is determined as the quantity #M3 of physical resources that are on the second uplink data channel and used to determine the quantity #Q of physical resources occupied by the first UCI, also referred to as the quantity of physical resources that can be used to carry the UCI on the second uplink data channel.

Case 2-4: The quantity is determined as a quantity of physical resources that are on the third uplink data channel and used to determine a quantity #Q" of physical resources occupied by the second UCI, also referred to as a quantity of physical resources that can be used to carry the UCI on the third uplink data channel.

It should be understood that for any uplink data channel (for example, any one of the K uplink data channels, the first uplink data channel, any uplink data channel in the uplink data channel set, the second uplink data channel, the third uplink data channel, the fourth uplink data channel, or the second equivalent uplink data channel), a quantity of physical resources (for example, #M1, #M2, or #M3) that can be used to carry the UCI on the uplink data channel may be equal to the quantity #Q of physical resources that actually carry the UCI on the uplink data channel, or may be unequal to the quantity #Q of physical resources that actually carry the UCI on the uplink data channel. For example, #M1 or #M2 or #M3 may be greater than or equal to #Q.

Determining, by the terminal device based on a quantity of physical resources included in any one of the foregoing uplink data channels or the uplink data channel set, the quantity of physical resources occupied by the UCI (for example, the first UCI or the second UCI), may be referred to as determining, based on the physical resources included in any uplink data channel or the uplink data channel set, the quantity of physical resources occupied by the UCI. The physical resource may include at least one of a time domain resource position, a frequency domain resource position, a code domain resource, or a quantity of physical resources corresponding to the physical resource.

With reference to the foregoing cases 2-1 to 2-4, for any one of the foregoing uplink data channels, a physical resource included in the uplink data channel is also referred to as a physical resource that can be used to carry the UCI on the uplink data channel. Specifically, the physical resource that is included in any uplink data channel and can be used to carry the UCI may be all physical resources included in the uplink data channel, or may be a part of physical resources included in the uplink data channel. Specifically, the part of physical resources may be a quantity of physical resources that are on the uplink data channel and used to carry a modulation symbol. More specifically, the modulation symbol may include a modulation symbol used to carry data information and control information.

For example, the quantity of physical resources that can be used to carry the UCI on the first uplink data channel is #M1, and the total quantity of physical resources of the first uplink data channel is #Z1. When #M1=#Z1, it indicates that the physical resources that can be used to carry the UCI on the first uplink data channel are all the physical resources included in the first uplink data channel. When #M1<#Z1, it indicates that the physical resources that can be used to carry the UCI on the first uplink data channel are a part of physical resources included in the first uplink data channel. For another example, the total quantity of physical resources that can be used to carry the UCI in the uplink data channel set is #M2, and the total quantity of physical resources in the uplink data channel set is #Z2. When #M2=#Z2, it indicates that total physical resources that can be used to carry the UCI in the uplink data channel set are all the physical resources included in the uplink data channel set. When #M2<#Z2, it indicates that total physical resources that can be used to carry the UCI in the uplink data channel set are a part of physical resources included in the uplink data channel set.

It should be understood that the quantity #M1 of physical resources that can be used to carry the UCI on the first uplink data channel may be equal to the quantity #P2 of physical resources that are on the first uplink data channel and used to determine the TBS of the data packet, or may be unequal to #P2.

Similarly, the quantity #M2 of physical resources that can be used to carry the UCI in the uplink data channel set may be equal to the quantity #P1 of physical resources that are in the uplink data channel set and used to determine the TBS of the data packet, or may be unequal to #P1.

Specifically, for any one of the foregoing uplink data channels, all or a part of physical resources included in the uplink data channel include physical resources between a first time domain symbol (inclusive) not carrying a DMRS after a first DMRS symbol on the uplink data channel and a last time domain symbol (inclusive) on the uplink data channel, that is, all or the part of physical resources do not include physical resources included in time domain symbols before the first DMRS symbol on the uplink data channel, that is, all or the part of physical resources include physical resources between the first time domain symbol (inclusive) on the uplink data channel and the last time domain symbol (inclusive) on the uplink data channel.

Further, the part of physical resources included in the uplink data channel may be in the following two cases.

In one case, the part of physical resources included in the uplink data channel do not include a physical resource occupied by a reference signal on the uplink data channel. For example, the part of physical resources do not include a time domain symbol or an RE occupied by a reference signal, where the reference signal may be at least one of a DMRS, an SRS, or a PTRS. Specifically, when the reference signal on the uplink data channel includes a DMRS, the part of physical resources do not include a physical resource included in a time domain symbol occupied by the DMRS. When the reference signal on the uplink data channel includes a PTRS, the part of physical resources do not include a physical resource occupied by the PTRS.

In another case, the part of physical resources included in the uplink data channel do not include a physical resource that is on the uplink data channel and used to transmit a HARQ-ACK or potentially used to transmit a HARQ-ACK. For example, when the UCI carried by the uplink data channel is CSI, or CSI and an SR, if the CSI is a CSI part 1, the part of physical resources do not include a physical resource that is on the uplink data channel and used to transmit the HARQ-ACK or potentially used to transmit the HARQ-ACK. If the CSI is a CSI part 2, the part of physical resources do not include a physical resource that is on the uplink data channel and used to transmit the HARQ-ACK or potentially used to transmit the HARQ-ACK, and do not include a physical resource that is on the uplink data channel and used to transmit the CSI part 1.

Further, a quantity of physical resources that can be used to carry the UCI on the uplink data channel is $$\sum_{l=0}^{N^{PUSCH}_{symb,all}-1} M^{UCI}_{sc}(l) \text{ or } \sum_{l=0}^{N^{PUSCH}_{symb,all}(j)-1} M^{UCI}_{sc}(j,l) \text{ or } \sum_{l=0}^{\overline{N}^{PUSCH}_{symb,all}-1} \overline{M}^{UCI}_{sc}(l).$$

For a time domain symbol l that is on the uplink data channel and carries a DMRS, $M_{sc}^{UCI}(j,l)$ or $M_{sc}^{UCI}(j)$ or $\overline{M}_{sc}^{UCI}(l)$ is 0. For a time domain symbol l that is on the uplink data channel and does not carry a DMRS, $M_{sc}^{UCI}(l)=M_{sc}^{PUSCH}-M_{sc}^{PT-RS}(l)$ or $M_{sc}^{UCI}(j,l)=M_{sc}^{PUSCH}(j)-M_{sc}^{PT-RS}(j,l)$ or $\overline{M}_{sc}^{UCI}(l)=\overline{M}_{sc}^{PUSCH}-\overline{M}_{sc}^{PT-RS}(l)$, where $M_{sc}^{PUSCH}$ or $M_{sc}^{PUSCH}(j)$ or $\overline{M}_{sc}^{PUSCH}$ is a total quantity of physical resources included in the symbol l on the uplink data channel, and $M_{sc}^{PT-RS}(l)$ or $M_{sc}^{PT-RS}(j,l)$ or $\overline{M}_{sc}^{PT-RS}(l)$ is a quantity of physical resources occupied by a PTRS on the symbol l on the uplink data channel.

Figure 6:
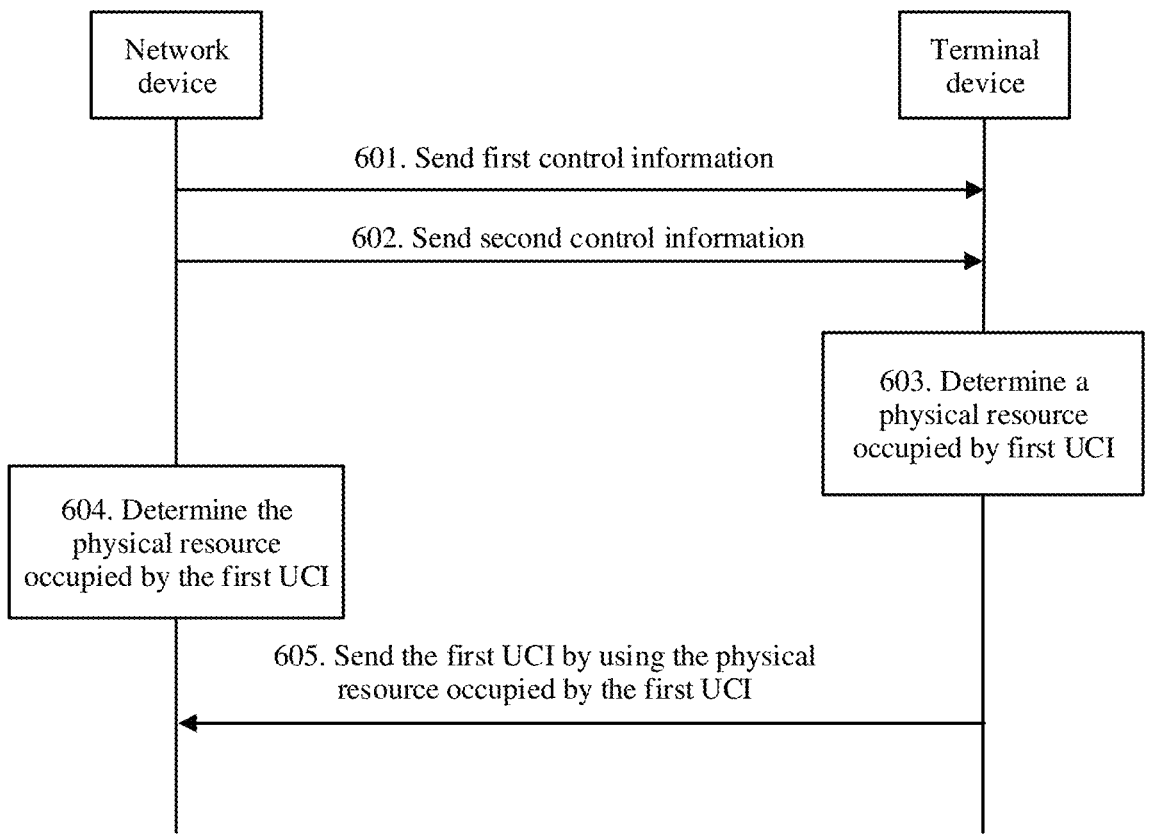
FIG. 6 is a schematic flowchart of a communication method according to an embodiment of the present invention.

Based on the network architecture shown in FIG. 1, an embodiment of the present invention discloses a communication method. FIG. 6 is a schematic flowchart of the communication method. The following describes steps of the communication method in detail. It may be understood that, in this application, a function performed by a network device may also be performed by a module (for example, a chip) in the network device, and a function performed by a terminal device may also be performed by a module (for example, a chip) in the terminal device.

601. A network device sends first control information to a terminal device.

The network device may send the first control information to the terminal device, where the first control information may include information about a first physical resource for transmitting a first data packet, the first physical resource corresponds to K uplink data channels, and each of the K uplink data channels is used to transmit the first data packet once. For example, the K uplink data channels may be K PUSCHs.

Correspondingly, the terminal device receives the first control information from the network device.

In an implementation, that the first control information is used to notify the information about the first physical resource for transmitting the first data packet may be: The first control information dynamically schedules the terminal device to repeat the first data packet on the K uplink data channels for K times. Correspondingly, the network device may send the first control information by using a dynamic uplink grant, or the first control information includes a dynamic uplink grant. The dynamic uplink grant may be an uplink grant scrambled by a specific radio network temporary identifier (RNTI), for example, an uplink grant scrambled by a cell radio network temporary identifier (C-RNTI) or a modulation and coding scheme cell radio network temporary identifier (MCS-C-RNTI).

In another implementation, that the first control information is used to notify the information about the first physical resource for transmitting the first data packet may be: The first control information is used to configure the terminal device to transmit the first data packet on the K uplink data channels for K times, that is, the first control information is used to configure the terminal device to transmit the first data packet on the K uplink data channels in GF mode for K times. Correspondingly, the network device may send the first control information by using higher layer signaling and/or a semi-static uplink grant, that is, the first control information may include the higher layer signaling and/or the semi-static uplink grant. The higher layer signaling may be radio resource control (RRC) signaling, and the semi-static uplink grant may be an uplink grant scrambled by the CS-RNTI.

In still another implementation, that the first control information is used to notify the information about the first physical resource for transmitting the first data packet may be: one part of the K uplink data channels may be an uplink data channel on which the network device dynamically schedules the terminal device to send the first data packet, and another part of the K uplink data channels may be an uplink data channel on which the network device configures the terminal device to send the first data packet in GF mode. Correspondingly, the first control information may include configuration information for configuring the terminal device to send the first data packet in GF mode, or may include scheduling information for scheduling the terminal device to send the first data packet.

It should be understood that the dynamic scheduling or the configuration may be referred to as scheduling.

Optionally, the K uplink data channels may be all or a part of uplink data channels on which the network device schedules, by using the first control information (for example, the UL grant), the terminal device to repeat the first data packet for multiple times.

Optionally, the K uplink data channels may be all or a part of uplink data channels on which the network device configures, by using the first control information, the terminal device to repeat the first data packet for multiple times.

It should be noted that the K uplink data channels are configured or indicated by the network device by using one piece of control information, namely, the first control information, and are not configured or indicated by the network device by using a plurality of pieces of control information. For example, when the first control information is an uplink grant (for example, a dynamic uplink grant or a semi-static uplink grant), the uplink grant is one uplink grant. To be specific, the K uplink data channels are scheduled or configured by using a same uplink grant, and are not separately scheduled or configured by using a plurality of different uplink grants. For another example, when the first control information is higher layer signaling, the K uplink data channels are configured by using a same piece of higher layer signaling, and are not separately configured by using a plurality of different pieces of higher layer signaling or configured by a same piece of higher layer signaling for multiple times.

It should be understood that the foregoing step 601 may also be replaced as follows:

601'. The network device may send first control information to the terminal device, where the first control information may include information about a first physical resource for transmitting a first data packet, and the first physical resource corresponds to K uplink data channels.

Further, the K uplink data channels are used to transmit the first data packet. The K uplink data channels may be jointly used to transmit the first data packet once, or the first data packet may be separately transmitted for K times.

602. The network device sends second control information to the terminal device.

The network device may send the second control information to the terminal device, where the second control information may include information about a first time domain resource for transmitting first UCI, and the first time domain resource overlaps a first uplink data channel of the K uplink data channels in time domain, that is, the first time domain resource overlaps a time domain resource on the first uplink data channel of the K uplink data channels. The first control information and the second control information may be the same control information, or may be different control information.

Correspondingly, the terminal device receives the second control information from the network device.

It should be understood that, that the first time domain resource overlaps the first uplink data channel of the K uplink data channels in time domain may also be expressed as: The first time domain resource corresponds to the first uplink data channel of the K uplink data channels.

It should be understood that the second control information may include information about a first time domain resource for transmitting first UCI, and that the first time domain resource overlaps a first uplink data channel of the K uplink data channels in time domain may also be expressed as: The second control information is used to indicate the terminal device to send the first UCI on the first uplink data channel. In other words, the second control information does not explicitly indicate the first time domain resource, but indicates to send the first UCI on the first uplink data channel of the K uplink data channels. For example, the second control information is equal to the first control information, the first control information is an uplink grant, a field in the uplink grant triggers the terminal device to send the first UCI on an uplink data channel scheduled by the uplink grant, and after receiving the uplink grant, the terminal device may determine that the network device indicates to send the first UCI on the first uplink data channel.

The second control information may indicate the terminal device to send the first UCI on the first time domain resource (namely, a first time unit), that is, the second control information is used to configure or trigger the terminal device to send the first UCI on the first time domain resource.

Further, the second control information is further used to notify information about a first frequency domain resource corresponding to the first UCI, and the first frequency domain resource corresponding to the first UCI and notified by the second control information may be located on a same carrier as the first uplink data channel or the K uplink data channels, or may be located on a carrier different from carriers on which the K uplink data channels are located. The first UCI may be located in a same BWP as the first uplink data channel or the K uplink data channels, or may be located in a BWP different from BWPs in which the K uplink data channels are located.

In an implementation, the second control information may include higher layer signaling for configuring the first UCI, or may include semi-static downlink control information (DCI) for configuring or triggering the terminal device to send the first UCI, for example, a downlink grant (DL grant) scrambled by the CS-RNTI or an uplink grant scrambled by the CS-RNTI. When the first UCI includes periodic CSI or an SR, the periodic CSI or the SR is information that higher layer signaling configures the terminal device to send, and a time unit (for example, a slot) used to send the CSI or the SR is periodic. Alternatively, the network device may configure downlink data information based on semi-persistent scheduling (SPS) (namely, an SPS PDSCH) for the terminal device by using the second control information, where the SPS PDSCH is periodic. In this case, a HARQ-ACK fed back by the terminal device for the periodic SPS PDSCH is also periodic. Therefore, when the first UCI includes the HARQ-ACK, it may be considered that the HARQ-ACK is sent by the terminal device configured by using the second control information.

In another implementation, the second control information may include control signaling that triggers or indicates the terminal device to send the first UCI. Specifically, the second control information may include physical layer DCI, for example, an uplink grant or a downlink grant. More specifically, the uplink grant or the downlink grant may be scrambled by an RNTI other than the CS-RNTI, for example, a C-RNTI or an MCS-C-RNTI. When the first UCI includes aperiodic CSI, the aperiodic CSI is sent by the terminal device triggered by a downlink grant or an uplink grant. Alternatively, the network device may schedule a PDSCH for the terminal device by using the second control information. After detecting the second control information, the terminal device feeds back a corresponding HARQ-ACK. Therefore, when the first UCI includes the HARQ-ACK, it may be considered that the HARQ-ACK is sent by the terminal device triggered by the second control information.

It should be understood that the UCI (for example, the first UCI or second UCI) includes uplink control information sent by the terminal device to the network device, and may be a HARQ-ACK, or may be a HARQ-ACK and an SR, or may be an SR, or may be CSI, or may be CSI and an SR, or may be a HARQ-ACK, CSI, and an SR. The CSI may be a CSI part 1, or may be a CSI part 2, or may be a CSI part 1 and a CSI part 2.

The CSI part 1 herein may be all CSI parts 1, or may be some CSI parts 1. Correspondingly, the CSI part 2 herein may be all CSI parts 2, or may be some CSI parts 2.

A condition for overloading of the first uplink data channel may include at least one of the following conditions:

Condition 1: The first uplink data channel may be different from (or unequal to) an uplink data channel set for determining a first TBS #T1. In other words, the first uplink data channel may be different from the uplink data channel set for determining the first TBS #T1; or a quantity #Z1 or #M1 of physical resources included in the first uplink data channel does not match (or is unequal to) a quantity #P1 of physical resources used to determine the first TBS #T1; or a quantity #P2 of physical resources included in the first uplink data channel is unequal to a quantity #P1 of physical resources used to determine the first TBS #T1.

It should be understood that the uplink data channel set may be one (namely, a reference uplink data channel) of the K uplink data channels, or may be J uplink data channels of the K uplink data channels, where J is an integer greater than 1.

For example, when the uplink data channel set is one reference uplink data channel of the K uplink data channels, the reference uplink data channel used to determine the first TBS is different from the first uplink data channel. When the uplink data channel set is J uplink data channels of the K uplink data channels, the uplink data channel set for determining the first TBS is naturally unequal to the first uplink data channel.

Specifically, the quantity #P1 of physical resources used to determine the first TBS is unequal to a quantity of physical resources that can be used to determine the TBS of the data packet on the first uplink data channel ($N_{RE}$ of the first uplink data channel). For example, when #P1 is less than #Z2, #P1 is unequal to #P2. Alternatively, #P1 is unequal to a total quantity #Z1 of physical resources included in the first uplink data channel. For example, when #P1 is equal to #Z2, #P1 is unequal to #Z1.

Further, the quantity #P1 of physical resources used to determine the first TBS may be greater than a quantity of physical resources included in the first uplink data channel, that is, a quantity of physical resources included in the uplink data channel set is greater than the quantity of physical resources included in the first uplink data channel. In other words, a quantity of time domain symbols included in the uplink data channel set is greater than a quantity of time domain symbols included in the first uplink data channel. The quantity of physical resources included in the first uplink data channel is the quantity of physical resources that are included in the first uplink data channel and used to determine the TBS. #P1 is a sum of quantities of physical resources that are on all uplink data channels in the uplink data channel set and used to determine the TBS. When the uplink data channel set is one reference uplink data channel, #P1 is a quantity of physical resources that are on the reference uplink data channel and used to determine the TBS. For a description of a quantity of physical resources that are on any uplink data channel in the uplink data channel set and used to determine the TBS, refer to the foregoing description.

When the first TBS #1 is determined based on one reference uplink data channel or J uplink data channels in the uplink data channel set, a quantity (for example, #P1) of physical resources used to determine the TBS of the data packet on the reference uplink data channel or the J uplink data channels is greater than a quantity (for example, #P2) of physical resources used to determine the TBS of the data packet on the first uplink data channel. In this case, because the TBS is excessively large, or the quantity #P1 of physical resources used to determine the TBS of the first data packet in the uplink data channel set is greater than the quantity #M1 of physical resources that are on the first uplink data channel and used to determine #Q (or is greater than #P2 or #Z1), and the two quantities do not match, #Q calculated based on the formula (1), (2), or (3) is excessively small. Therefore, to avoid a performance loss of the first UCI, in this case, a method in step 603 may be used to determine a physical resource occupied by the first UCI.

The uplink data channel set used to determine the first TBS is unequal to the first uplink data channel. As shown in FIG. 5a, the uplink data channel set is a first uplink data channel of six uplink data channels, and the first uplink data channel is a fourth uplink data channel of the six uplink data channels. A quantity of physical resources included in the fourth uplink data channel is less than a quantity of physical resources included in the first uplink data channel. As shown in FIG. 5b, the uplink data channel set is a first uplink data channel of two uplink data channels, and the first uplink data channel is a second uplink data channel of the two uplink data channels. A quantity of physical resources included in the second uplink data channel is less than a quantity of physical resources included in the first uplink data channel. When the uplink data channel set is a plurality of uplink data channels of the K uplink data channels, a total quantity of physical resources included in the plurality of uplink data channels is greater than the quantity of physical resources included in the first uplink data channel, that is, a total quantity of symbols included in the plurality of uplink data channels is greater than the quantity of time domain symbols included in the first uplink data channel. The plurality of uplink data channels may include or not include the first uplink data channel. As shown in FIG. 5c, the first uplink data channel is a first uplink data channel of four uplink data channels, the uplink data channel set is the four uplink data channels, and a total quantity of physical resources included in the four uplink data channels is greater than the quantity of physical resources included in the first uplink data channel.

Condition 2: A quantity of time domain symbols included in the first uplink data channel is less than (or not greater than) a first threshold.

When the quantity of time domain symbols included in the first uplink data channel is relatively small, the first TBS may be excessively large in comparison with the first uplink data channel. As shown in 5a, K=6, and the first uplink data channel is a fourth uplink data channel of six uplink data channels and includes a relatively small quantity of time domain symbols. Therefore, the TBS calculated based on another uplink data channel (for example, the first uplink data channel of the K uplink data channels) is excessively large in comparison with the first uplink data channel.

It should be understood that the first threshold may be predefined, may be configured by the network device, or may be indicated by the network device.

Alternatively, the condition 2 may be: The quantity of time domain symbols included in the first uplink data channel is less than (or not greater than) a quantity of time domain symbols included in a target uplink data channel of the K uplink data channels. The target uplink data channel is unequal to the first uplink data channel. The quantity of time domain symbols included in the first uplink data channel may be not only compared with the first threshold, but also compared with the quantity of time domain symbols included in the target uplink data channel. In this way, whether the quantity of time domain symbols included in the first uplink data channel is relatively small is determined.

For example, the target uplink data channel may be one of the K uplink data channels that includes a largest quantity of time domain symbols.

For another example, the first uplink data channel may be one of the K uplink data channels that includes a smallest quantity of time domain symbols.

Condition 3: A quantity of physical resources included in the first uplink data channel is less than (or not greater than) a second threshold.

Similarly, when the quantity of physical resources included in the first uplink data channel is relatively small, the first TBS may be excessively large in comparison with the first uplink data channel.

It should be understood that the second threshold may be predefined, may be configured by the network device, or may be indicated by the network device.

Similarly, the condition 3 may also be: The quantity of physical resources included in the first uplink data channel may be less than a quantity of physical resources included in a target uplink data channel of the K uplink data channels. The target uplink data channel is unequal to the first uplink data channel.

For example, the target uplink data channel may be one of the K uplink data channels that includes a largest quantity of time domain symbols.

For another example, the first uplink data channel may be one of the K uplink data channels that includes a smallest quantity of time domain symbols.

Condition 4: A code rate for carrying the first UCI on the first uplink data channel is greater than (or not less than) a third threshold.

When the TBS is excessively large but the quantity of physical resources of the first uplink data channel is excessively small, a case in which systematic bits of the UCI are lost when the first UCI is carried on the first uplink data channel may occur. In this case, only a part of systematic bits of the first UCI can be sent on the first uplink data channel. Even if the part of UCI can be successfully received by the network device completely, because another part of UCI is not sent, the network device cannot obtain a complete payload of the first UCI. As a result, transmission of the UCI fails.

The physical resource that is determined based on the first TBS and actually used for sending the first UCI is #q. The code rate herein is a code rate for mapping the first UCI to the physical resource #q. Specifically, the code rate may be a code rate for mapping the payload of the first UCI to the physical resource after the first UCI is encoded in a modulation order corresponding to the first uplink data channel. The modulation order corresponding to the first uplink data channel may be referred to as a modulation order corresponding to the first data packet, and is a modulation order notified by the network device for the first uplink data channel or the K uplink data channels. When a payload size of the first UCI is #A, and the quantity of physical resources is #Q, and the modulation order corresponding to the first uplink data channel is #B, the corresponding code rate for carrying the first UCI on the first uplink data channel is #A/(#Q*#B).

For example, when the payload size of the first UCI is 120 bits, and the quantity of physical resources is 48 REs, and a modulation scheme is QPSK (the modulation order is 2), the corresponding code rate for carrying the first UCI on the first uplink data channel is 120/48/2=1.25. When the third threshold is 1, the corresponding code rate for carrying the first UCI on the first uplink data channel may be greater than (or not less than) the third threshold.

It should be understood that the third threshold may be predefined, may be configured by the network device, or may be indicated by the network device.

Similarly, the condition 4 may also be: The corresponding code rate for carrying the first UCI on the first uplink data channel is greater than (or not less than) a corresponding code rate for carrying the first UCI on a target uplink data channel of the K uplink data channels.

For example, the target uplink data channel may be one of the K uplink data channels that has a corresponding lowest code rate for carrying UCI of a same payload size on an uplink data channel.

For another example, the first uplink data channel may also be one of the K uplink data channels that has a corresponding highest code rate for carrying UCI of a same payload size on an uplink data channel.

It should be understood that the target uplink data channel may be predefined, or may be an uplink data channel configured by the network device, or may be an uplink data channel indicated by the network device.

It should be understood that the target uplink data channel may be one or more of the K uplink data channels.

In another embodiment, the condition for overloading of the first uplink data channel may be removed. To be specific, when the first uplink data channel is not overloaded, the physical resource occupied by the first UCI may also be determined by using a method 1 to a method 3 in step 603, so that transmission reliability of the first UCI is improved.

Specifically, a condition for non-overloading of the first uplink data channel may specifically include at least one of the following conditions: The quantity of physical resources used to determine the TBS of the first data packet is less than (or not greater than) the quantity of physical resources included in the first uplink data channel; or the uplink data channel set is equal to the first uplink data channel; or the quantity of time domain symbols included in the first uplink data channel is greater than (or not less than) the first threshold; or the quantity of physical resources included in the first uplink data channel is greater than (or not less than) the second threshold; or the corresponding code rate for carrying the first UCI on the first uplink data channel is less than (or not greater than) the third threshold. Although the foregoing case does not necessarily affect the quantity of physical resources and transmission reliability of the first UCI, because #T1 (or #P1 used to calculate #T1) and #M1 (or #Z1) do not match, #Q calculated for the first UCI by using #T1 and #M1 based on the formula (1), (2), or (3) is excessively large. If the calculated quantity of physical resources occupied by the first UCI is excessively large, resource waste is caused on the first uplink data channel. To avoid this problem, the method 1 to the method 3 in step 603 may also be used to determine the physical resource occupied by the first UCI.

It should be understood that when the condition for overloading of the first uplink data channel is removed, the foregoing step 602 may be replaced as follows:

602'. The network device sends second control information to the terminal device, where the second control information includes information about a first time domain resource for transmitting first UCI, and the first time domain resource overlaps a first uplink data channel of the K uplink data channels in time domain.

Further, the TBS of the first data packet is determined based on the uplink data channel set. Still further, the uplink data channel set may be the same as the first uplink data channel, or may be different from the first uplink data channel.

603. The terminal device determines the physical resource occupied by the first UCI.

After receiving the first control information and the second control information from the network device, the terminal device may determine the physical resource occupied by the first UCI. When the first uplink data channel described in step 602 is overloaded or not overloaded, the physical resource #q occupied by the first UCI may be determined by using the following three methods.

Method 1: Correct the quantity #Q of physical resources occupied by the first UCI.

As can be learned from application scenarios, the terminal device may determine, by using #T1, #M1, and a second equalization parameter, the quantity #Q of physical resources occupied by the first UCI on the first uplink data channel. For example, the first uplink data channel is an uplink data channel (PUSCH) in the formula (1), (2), or (3); the first data packet is a UL-SCH on the uplink data channel in the formula (1), (2), or (3); #T1 is a TBS corresponding to $$\sum_{r=0}^{C_{UL-SCH}-1} K_r \text{ or } \sum_{r=0}^{C_{UL-SCH}-1} K_r$$

or in the formula (1), (2), or (3); #M1 of the first uplink data channel or #Z1 of the first uplink data channel is $$\sum_{l=0}^{N_{symb,all}^{PUSCH}-1} M_{sc}^{UCI}(l)$$

in the formula (1), (2), or (3); and the second equalization parameter is $\beta_{offset}^{PUSCH}$ in the formula (1), (2) or (3).

In the method 1, #Q obtained through calculation may be prevented from being excessively small by correcting any one of the three parameters.

In the method 1, further, the first UCI is carried on the first uplink data channel, that is, the physical resource #q is located on the first uplink data channel.

The method 1 may specifically include the following methods 1-1, 1-2, 1-3, and 1-4.

Method 1-1: Determine, based on an equivalent TBS #T2, the quantity #Q of physical resources occupied by the first UCI.

In one case, the quantity #Q of physical resources occupied by the first UCI may be determined based on the equivalent TBS #T2, that is, the quantity #Q of physical resources occupied by the first UCI is determined based on a valid information size corresponding to the equivalent TBS #T2. The equivalent TBS #T2 is different from the first TBS #T1.

It should be understood that, to prevent the determined quantity #Q of physical resources occupied by the first UCI from being excessively small, the terminal device may determine, by using the equivalent TBS #T2, the quantity #Q of physical resources occupied by the first UCI, where the equivalent TBS #T2 is different from the TBS of the first data packet, namely, the first TBS. In this way, an effect of adjusting #Q can be achieved, and a problem that transmission reliability of the first UCI is impaired is avoided.

Further, the equivalent TBS #T2 may be less than the first TBS #T1.

Specifically, the equivalent TBS #T2 may be notified by the network device, may be directly configured or indicated by the network device, or may be determined based on other information configured or indicated by the network device. The network device may configure or indicate information about an uplink data channel used to determine an equivalent TBS. For example, the network device configures or indicates a first equivalent uplink data channel used to calculate the equivalent TBS #T2, and the terminal device may determine the equivalent TBS based on the first equivalent uplink data channel, or determine the equivalent TBS based on a quantity of physical resources included in the first equivalent uplink data channel. The first equivalent uplink data channel may be one uplink data channel, or may be a plurality of uplink data channels. When the first equivalent uplink data channel is a plurality of uplink data channels, the quantity of physical resources included in the first equivalent uplink data channel is a sum of quantities of physical resources that are included in all the uplink data channels in the first equivalent uplink data channel and used to determine the TBS. The first equivalent uplink data channel may be one of the K uplink data channels, or may not be one of the K uplink data channels, or a part of the first equivalent uplink data channel may be one of the K uplink data channels, and another part is not one of the K uplink data channels. The first equivalent uplink data channel may also be determined based on a preset rule. The preset rule includes: The first equivalent uplink data channel may be a $k^{th}$ uplink data channel of the K uplink data channels, or may be one of the K uplink data channels that includes a largest quantity of physical resources or a largest quantity of time domain symbols, or may be one of the K uplink data channels that includes a smallest quantity of physical resources or a smallest quantity of time domain symbols, where k is an integer greater than or equal to 1 and less than or equal to K.

Further, the first equivalent uplink data channel is different from the uplink data channel set. In other words, the terminal device calculates the equivalent TBS by using the first equivalent uplink data channel different from the uplink data channel set, so that the equivalent TBS is unequal to the first TBS of the first data packet. Further, the terminal device determines, by using an equivalent TBS different from the first TBS, the quantity of physical resources occupied by the first UCI, thereby achieving an effect of adjusting #Q, and ensuring transmission reliability of the first UCI.

It should be understood that the equivalent TBS #T2 is determined based on the quantity of physical resources included in the first equivalent uplink data channel. Specifically, the equivalent TBS #T2 is determined based on the quantity of physical resources that are included in the first equivalent uplink data channel and used to determine the TBS.

Further, the quantity of physical resources included in the first equivalent uplink data channel is less than the quantity of physical resources included in the uplink data channel set. In this case, the equivalent TBS #T2 is less than the TBS #T1 corresponding to the first data packet.

In another case, the quantity #Q of physical resources occupied by the first UCI may be determined based on the equivalent TBS #T2, where the equivalent TBS #T2 is a TBS determined based on the first uplink data channel, that is, the quantity #P2 of physical resources for determining the equivalent TBS #T2 corresponds to the first uplink data channel. Specifically, the equivalent TBS #T2 is determined based on the quantity #P2 of physical resources included in the first uplink data channel, or the equivalent TBS #T2 is determined based on the quantity #P2 of physical resources that are included in the first uplink data channel and used to determine the TBS.

It should be understood that, because the uplink data channel used to determine the equivalent TBS #T2 is the first uplink data channel, the equivalent TBS matches #M1 used to determine the quantity #Q of physical resources occupied by the first UCI. Therefore, #Q determined by using the equivalent TBS and the quantity #M1 of physical resources included in the first uplink data channel is moderate, and a problem that #Q obtained through calculation based on the mismatched #T1 and #M1 is excessively large or excessively small is avoided.

It should be understood that the equivalent TBS #T2 is determined based on the quantity #P2 of physical resources included in the first uplink data channel, and not determined based on the quantity #P1 of physical resources included in the uplink data channel set, or not determined based on a physical resource other than a physical resource included in the first uplink data channel, in the physical resources included in the uplink data channel set.

It should be understood that in this case, #T2 may be equal to #T1, or may be unequal to #T1.

Further, the terminal device determines, by using the equivalent TBS #T2 and the quantity #M1 of physical resources included in the first uplink data channel, the quantity #Q of physical resources occupied by the first UCI.

Specifically, the quantity #M1 of physical resources included in the first uplink data channel is a quantity of physical resources that are on the first uplink data channel and can be used to carry the UCI. It should be understood that the equivalent TBS #T2 herein may be understood as a TBS size corresponding to a virtual data packet. The virtual data packet is used to calculate the equivalent TBS #T2, and is not used by the terminal device to generate an actual data packet or used in actual data transmission.

Further, the quantity of physical resources included in the first uplink data channel is less than the quantity of resources included in the uplink data channel set. For example, #P2 is less than #P1, and in this case, the equivalent TBS #T2 is less than the TBS #T1 corresponding to the first data packet.

Figure 7:
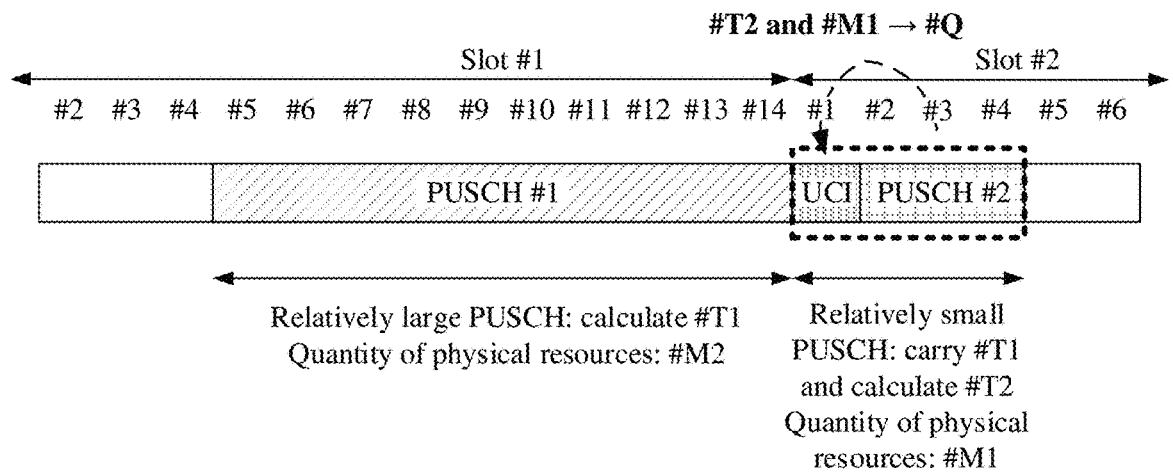
FIG. 7 is a schematic diagram of transmission of a UL-SCH and UCI according to an embodiment of the present invention.

FIG. 7 is a schematic diagram of transmission of a UL-SCH and UCI according to an embodiment of the present invention. As shown in FIG. 7, K=2, the first uplink data channel is a later uplink data channel of the K uplink data channels, and the uplink data channel set is an earlier uplink data channel of the K uplink data channels. The first TBS #T1 is obtained through calculation based on a quantity of physical resources included in the earlier uplink data channel, and the first time domain resource overlaps the later uplink data channel. Therefore, the first UCI is carried on the later first uplink data channel. However, the first TBS #T1 is not obtained through calculation based on the first uplink data channel, and does not match the quantity of physical resources of the first uplink data channel. Therefore, to obtain, through calculation, a moderate quantity #Q of physical resources occupied by the first UCI, the terminal device obtains, through calculation, an equivalent TBS #T2 (#T2<#T1) of the virtual data packet based on the physical resources included in the first uplink data channel, and determines #Q by using #T2 and the quantity #M1 of physical resources that are included in the first uplink data channel and can be used to carry the UCI.

Specifically, $$\sum_{r=0}^{C_{UL-SCH}-1} K_r^{eff}$$

corresponds to the equivalent TBS or is determined based on the equivalent TBS. For example, $$\sum_{r=0}^{C_{UL-SCH}-1} K_r^{eff}$$

is a valid information size corresponding to the equivalent TBS or a sum of CBSs of at least one equivalent CB corresponding to the equivalent TBS. In this case, #Q of the first UCI may be obtained through calculation based on, $$\sum_{r=0}^{C_{UL-SCH}-1} K_r^{eff},$$

and expressed by the following formula. For definitions of other parameters, refer to descriptions corresponding to the formulas (1), (2), and (3).

When the first UCI is a HARQ-ACK, a calculation formula for determining, based on the equivalent TBS #T2 and the quantity #M1 of physical resources included in the first uplink data channel, the quantity #Q of physical resources occupied by the first UCI may be expressed as follows, where #Q represents Q'$_{ACK}$, or #Q is obtained based on Q'$_{ACK}$:

$$Q'_{ACK} = \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r^{eff}}, \text{ or}$$

$$Q'_{ACK} = \min\left\{\left[\frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r^{eff}}\right], \left[\alpha \cdot \sum_{l=l_0}^{N_{symb,all}^{PUSCH}-1} M_{sc}^{UCI}(l)\right]\right\}.$$

When the first UCI is a CSI part 1, a calculation formula for determining, based on the equivalent TBS #T2 and the quantity #M1 of physical resources included in the first uplink data channel, the quantity #Q of physical resources occupied by the first UCI may be expressed as follows, where #Q represents Q'$_{CSI-1}$, or #Q is obtained based on Q'$_{CSI-1}$:

$$Q'_{CSI-1} = \frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r^{eff}}, \text{ or}$$

$$Q'_{CSI-1} = \min\left\{\left[\frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r^{eff}}\right], \left[\alpha \cdot \sum_{l=0}^{N_{symb,all}^{PUSCH}-1} M_{sc}^{UCI}(l)\right] - Q'_{ACK}\right\}.$$

When the first UCI is a CSI part 2, a calculation formula for determining, based on the equivalent TBS #T2 and the quantity #M1 of physical resources included in the first uplink data channel, the quantity #Q of physical resources occupied by the first UCI may be expressed as follows, where #Q represents Q'$_{CSI-2}$, or #Q is obtained based on Q'$_{CSI-2}$:

$$Q'_{CSI-2} = \frac{(O_{CSI-2} + L_{CSI-2}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r^{eff}}, \text{ or}$$

$$Q'_{CSI-2} = \min\left\{\left[\frac{(O_{CSI-2} + L_{CSI-2}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r^{eff}}\right], \left[\alpha \cdot \sum_{l=0}^{N_{symb,all}^{PUSCH}-1} M_{sc}^{UCI}(l)\right] - Q'_{ACK} - Q'_{CSI-1}\right\}.$$

Method 1-2: Determine, based on a quantity #M2 of equivalent physical resources, the quantity #Q of physical resources occupied by the first UCI.

In one case, the quantity #M2 of equivalent physical resources is different from the quantity of physical resources included in the first uplink data channel, that is, the quantity #M2 of equivalent physical resources is unequal to the quantity of physical resources included in the first uplink data channel.

In other words, #Q is not calculated based on the quantity #M1 of physical resources included in the first uplink data channel; instead, #Q is calculated by using the quantity #M2 of equivalent physical resources that is different from #M1. Because #M2 is different from #M1, #M2 is used to replace #M1 and substituted into the formula for calculating #Q. In this way, an effect of adjusting #Q can be achieved, and #Q obtained through calculation is prevented from being excessively large or excessively small.

Further, the quantity #M2 of equivalent physical resources may be greater than #M1.

Specifically, the quantity #M2 of equivalent physical resources may be a quantity of physical resources notified by the network device, or may be directly configured or indicated by the network device. For example, #M2 may be a numerical value of a quantity of physical resources directly configured or indicated by the network device. #M2 may also be determined based on other information configured or indicated by the network device. For example, the network device configures or indicates a second equivalent uplink data channel used to calculate the quantity #M2 of equivalent physical resources, and the terminal device may determine the quantity #M2 of equivalent physical resources based on a quantity of physical resources included in the second equivalent uplink data channel. The second equivalent uplink data channel may be one uplink data channel, or may be a plurality of uplink data channels. When the second equivalent uplink data channel is a plurality of uplink data channels, #M2 is a sum of quantities of physical resources that are included in all the uplink data channels in the second equivalent uplink data channel and used to carry the UCI. The second equivalent uplink data channel may be one of the K uplink data channels, or may not be one of the K uplink data channels, or a part of the second equivalent uplink data channel may be one of the K uplink data channels, and another part is not one of the K uplink data channels. The second equivalent uplink data channel may also be determined based on a preset rule. The preset rule includes: The second equivalent uplink data channel may be a $k^{th}$ uplink data channel of the K uplink data channels, or may be one of the K uplink data channels that includes a largest quantity of physical resources or a largest quantity of time domain symbols, or may be one of the K uplink data channels that includes a smallest quantity of physical resources or a smallest quantity of time domain symbols, where k is an integer greater than or equal to 1 and less than or equal to K.

It should be understood that the quantity of physical resources included in the second equivalent uplink data channel is a quantity of physical resources that are on the second equivalent uplink data channel and can be used to carry the UCI.

Further, the second equivalent uplink data channel is different from the first uplink data channel. In other words, the terminal device determines #Q by using the second equivalent uplink data channel different from the first uplink data channel, thereby achieving an effect of adjusting #Q, preventing #Q obtained through calculation from being excessively large or excessively small, and ensuring transmission reliability and validity of the first UCI.

In another case, the quantity #M2 of equivalent physical resources is the quantity of physical resources included in the uplink data channel set.

It should be understood that the uplink data channel set is different from the first uplink data channel.

It should be understood that in this case, #M2 may be equal to #M1, or may be unequal to #M1.

It should be understood that the quantity #M2 of equivalent physical resources is the quantity of physical resources included in the uplink data channel set. Specifically, the quantity #M2 of equivalent physical resources is a quantity of physical resources that are in the uplink data channel set and can be used to carry the UCI, or a sum of quantities of physical resources that are on all the uplink data channels in the uplink data channel set and can be used to carry the UCI.

Further, the terminal device determines, based on the quantity #M2 of equivalent physical resources and the first TBS #T1, the quantity #Q of physical resources occupied by the first UCI.

Specifically, the TBS of the first data packet is determined based on the quantity #P1 of physical resources that are included in the uplink data channel set and used to determine the TBS.

It should be understood that, to prevent the determined quantity #Q of physical resources occupied by the first UCI from being excessively large or excessively small, the terminal device may determine, by using the quantity #M2 of physical resources included in the uplink data channel set, the quantity #Q of physical resources occupied by the first UCI. Therefore, the first TBS #T1 matches #M2 used to determine the quantity #Q of physical resources occupied by the first UCI, #Q determined by using #T1 and #M2 is moderate, and a problem that #Q obtained through calculation based on the mismatched #T1 and #M1 is excessively large or excessively small is avoided.

Further, the quantity of physical resources included in the uplink data channel set is greater than the quantity of physical resources included in the first uplink data channel. For example, #M2 is greater than #M1.

Figure 8:
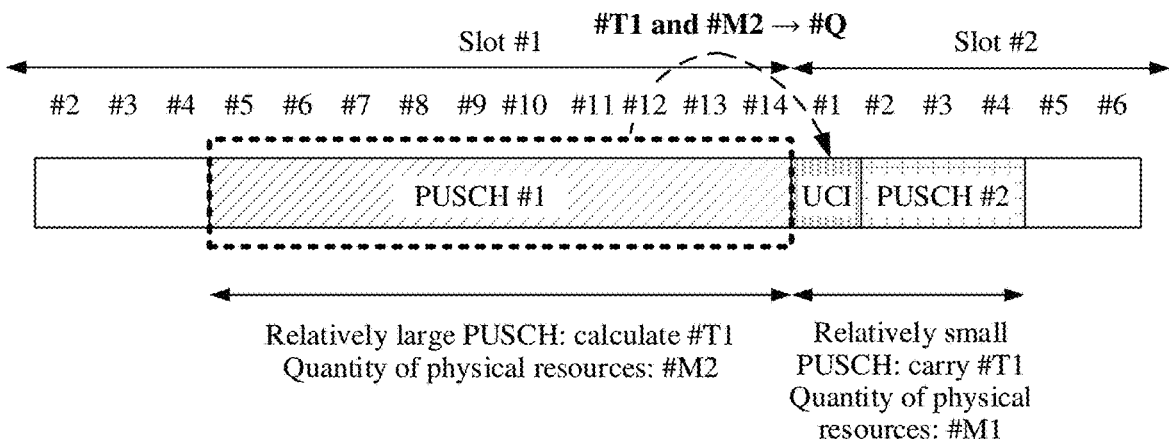
FIG. 8 is another schematic diagram of transmission of a UL-SCH and UCI according to an embodiment of the present invention.

FIG. 8 is another schematic diagram of transmission of a UL-SCH and UCI according to an embodiment of the present invention. As shown in FIG. 8, K=2, the first uplink data channel is a later uplink data channel of the K uplink data channels, and the uplink data channel set is an earlier uplink data channel of the K uplink data channels. The first TBS #T1 is obtained through calculation based on physical resources included in the earlier uplink data channel, and the first time domain resource overlaps the second uplink data channel. Therefore, the first UCI is carried on the later uplink data channel. However, the first TBS #T1 is not obtained through calculation based on the first uplink data channel, and does not match the quantity of physical resources of the first uplink data channel. Therefore, to obtain, through calculation, a moderate quantity #Q of physical resources occupied by the first UCI, the terminal device determines #Q based on #T1 and the quantity #M2 of physical resources that are included in the uplink data channel set and can be used to carry the UCI.

Specifically, $$\sum_{j \in \Omega} \sum_{l=0}^{N_{symb,all}^{PUSCH}-1} M_{sc}^{UCI}(j, l)$$

corresponds to the quantity #M2 of equivalent physical resources. In this case, #Q of the first UCI may be obtained through calculation based on $$\sum_{j \in \Omega} \sum_{l=0}^{N_{symb,all}^{PUSCH}-1} M_{sc}^{UCI}(j, l),$$

and expressed by the following formula, where n represents the uplink data channel set or the second equivalent uplink data channel, and $$\sum_{j\in\Omega}\sum_{l=0}^{N_{symb,all}^{PUSCH}-1}M_{sc}^{UCI}(j,l)$$

may also be replaced with $$\sum_{l=0}^{\overline{N}_{symb,all}^{PUSCH}-1}\overline{M}_{sc}^{UCI}(l).$$

For definitions of other parameters, refer to the corresponding descriptions of the formulas (1), (2) and (3).

When the first UCI is a HARQ-ACK, a calculation formula for determining, based on the quantity #M2 of equivalent physical resources and the first TBS #T1, the quantity #Q of physical resources occupied by the first UCI may be expressed as follows, where #Q represents $Q'_{ACK}$, or #Q is obtained based on $Q'_{ACK}$:

$$Q'_{ACK} = \frac{(O_{ACK}+L_{ACK})\cdot\beta_{offset}^{PUSCH}\cdot\sum_{j\in\Omega}\sum_{l=0}^{N_{symb,all}^{PUSCH}-1}M_{sc}^{UCI}(j,l)}{\sum_{r=0}^{C_{UL-SCH}-1}K_r}, \text{ or}$$

$$Q'_{ACK}=\min\left\{\begin{bmatrix}\frac{(O_{ACK}+L_{ACK})\cdot\beta_{offset}^{PUSCH}\cdot\sum_{j\in\Omega}\sum_{l=0}^{N_{symb,all}^{PUSCH}-1}M_{sc}^{UCI}(j,l)}{\sum_{r=0}^{C_{UL-SCH}-1}K_r}\end{bmatrix},\begin{bmatrix}\alpha\cdot\sum_{l=l_0}^{N_{symb,all}^{PUSCH}-1}M_{sc}^{UCI}(l)\end{bmatrix}\right\}.$$

When the first UCI is a CSI part 1, a calculation formula for determining, based on the quantity #M2 of equivalent physical resources and the first TBS #T1, the quantity #Q of physical resources occupied by the first UCI may be expressed as follows, where #Q represents $Q'_{CSI-1}$, or #Q is obtained based on $Q'_{CSI-1}$:

$$Q'_{CSI-1} = \frac{(O_{CSI-1}+L_{CSI-1})\cdot\beta_{offset}^{PUSCH}\cdot\sum_{j\in\Omega}\sum_{l=0}^{N_{symb,all}^{PUSCH}-1}M_{sc}^{UCI}(j,l)}{\sum_{r=0}^{C_{UL-SCH}-1}K_r}, \text{ or}$$

$$Q'_{CSI-1}=\min\left\{\begin{bmatrix}\frac{(O_{CSI-1}+L_{CSI-1})\cdot\beta_{offset}^{PUSCH}\cdot\sum_{j\in\Omega}\sum_{l=0}^{N_{symb,all}^{PUSCH}-1}M_{sc}^{UCI}(j,l)}{\sum_{r=0}^{C_{UL-SCH}-1}K_r}\end{bmatrix},\begin{bmatrix}\alpha\cdot\sum_{l=l_0}^{N_{symb,all}^{PUSCH}-1}M_{sc}^{UCI}(l)\end{bmatrix}-Q'_{ACK}\right\}.$$

When the first UCI is a CSI part 2, a calculation formula for determining, based on the quantity #M2 of equivalent physical resources and the first TBS #T1, the quantity #Q of physical resources occupied by the first UCI may be expressed as follows, where #Q represents $Q'_{CSI-2}$, or #Q is obtained based on $Q'_{CSI-2}$:

$$Q'_{CSI-2} = \frac{(O_{CSI-2}+L_{CSI-2})\cdot\beta_{offset}^{PUSCH}\cdot\sum_{j\in\Omega}\sum_{l=0}^{N_{symb,all}^{PUSCH}-1}M_{sc}^{UCI}(j,l)}{\sum_{r=0}^{C_{UL-SCH}-1}K_r}, \text{ or}$$

$$Q'_{CSI-2}=\min\left\{\begin{bmatrix}\frac{(O_{CSI-2}+L_{CSI-2})\cdot\beta_{offset}^{PUSCH}\cdot\sum_{j\in\Omega}\sum_{l=0}^{N_{symb,all}^{PUSCH}-1}M_{sc}^{UCI}(j,l)}{\sum_{r=0}^{C_{UL-SCH}-1}K_r}\end{bmatrix},\begin{bmatrix}\alpha\cdot\sum_{l=l_0}^{N_{symb,all}^{PUSCH}-1}M_{sc}^{UCI}(l)\end{bmatrix}-Q'_{ACK}-Q'_{CSI-1}\right\}.$$

Method 1-3: Determine, based on a quantity #M3 of physical resources included in a second uplink data channel, the quantity #Q of physical resources occupied by the first UCI, where the second uplink data channel is different from the first uplink data channel.

Specifically, for how to determine #Q based on #M3, refer to the formula (1), (2) or (3), where #Q represents ≈ or ≈ or ⌈⌉, or #Q is obtained based on or ≈ or ≈ or ≈. A difference lies in that the parameter ≈ in the formula (1), (2) or (3) is replaced with #M3.

In one case, #M3 may be configured or indicated by the network device to the terminal device. Herein, #M3 may be a quantity of physical resources directly configured or indicated by the network device, or may be a quantity of physical resources that is determined based on other information configured or indicated by the network device (for example, configured or indicated uplink data channel information).

In another case, #M3 is a quantity of physical resources included in the second uplink data channel of the K uplink data channels.

Further, the terminal device determines, based on the quantity #M3 of physical resources included in the second uplink data channel of the K uplink data channels and the first TBS #T1, the quantity #Q of physical resources corresponding to the physical resource #q. In other words, #Q is determined based on quantities #M3 and #T1 of physical resources that are included in the second uplink data channel and can be used to carry the UCI.

It should be understood that the uplink data channel set is unequal to the second uplink data channel.

It should be understood that the first uplink data channel is unequal to the second uplink data channel.

Specifically, the first TBS is determined based on the quantity #P1 of physical resources that are included in the uplink data channel set and used to determine the TBS.

It should be understood that the second uplink data channel may be an uplink data channel configured or indicated by the network device to the terminal device.

Specifically, the second uplink data channel may be one uplink data channel, or may include a plurality of uplink data channels. Further, the second uplink data channel may be one or more of the K uplink data channels. The second uplink data channel may also be an uplink data channel determined based on a preset rule. The preset rule includes: The second uplink data channel may be a $k^{th}$ uplink data channel of the K uplink data channels, or may be one of the K uplink data channels that includes a largest quantity of physical resources or a largest quantity of time domain symbols, or may be one of the K uplink data channels that includes a smallest quantity of physical resources or a smallest quantity of time domain symbols, where k is an integer greater than or equal to 1 and less than or equal to K.

For example, the second uplink data channel may be the foregoing second equivalent uplink data channel.

For another example, the second uplink data channel is the foregoing target uplink data channel.

Further, the quantity #M3 of physical resources included in the second uplink data channel is used to determine a quantity of physical resources occupied by the UCI on any one of the K uplink data channels. To be specific, the quantity #M3 of physical resources included in the second uplink data channel is used to determine the quantity of physical resources occupied by the UCI on any one of the K uplink data channels, that is, the same #M3 is applicable to any one of the K uplink data channels, regardless of whether the any one of the uplink data channels is the second uplink data channel.

The UCI may be the first UCI, or may be UCI other than the first UCI. For example, the other UCI overlaps another uplink data channel that is different from the first uplink data channel of the K uplink data channels, so that the other UCI is carried on the another uplink data channel for transmission. In this case, #M3 is used to determine a quantity #Q' of physical resources occupied by the other UCI on the another uplink data channel. In this way, it can be ensured that for any two of the K uplink data channels, if the two uplink data channels carry UCI of a same payload size, quantities of physical resources occupied by the two pieces of UCI are the same (both are determined based on #M3 and #T1). For example, both are equal to #Q. Therefore, an effect of ensuring transmission reliability and validity of the UCI is achieved.

Specifically, the quantity #M3 of physical resources included in the second uplink data channel is a quantity of physical resources that are on the second uplink data channel and can be used to carry the UCI.

It should be understood that when the second uplink data channel includes a plurality of uplink data channels, the quantity #M3 of physical resources included in the second uplink data channel is a sum of quantities of physical resources that are included in all of the plurality of uplink data channels and used to carry the UCI.

Further, the quantity of physical resources included in the second uplink data channel is greater than the quantity of physical resources included in the first uplink data channel. For example, #M3 is greater than #M1.

Method 1-4: Determine, based on a first equalization parameter, the quantity #Q of physical resources occupied by the first UCI, where the first equalization parameter is different from the second equalization parameter.

Still further, the first equalization parameter may be greater than the second equalization parameter.

In other words, in comparison with a case in which the TBS of the first data packet matches the physical resources included in the first uplink data channel, when #T1 and the first uplink data channel do not match, a larger first equalization parameter may be used to increase the quantity of physical resources occupied by the first UCI and ensure performance of the first UCI. Alternatively, in comparison with a case in which the TBS of the first data packet matches physical resources included in a third uplink data channel, when #T1 and the first uplink data channel do not match, a larger first equalization parameter may be used to increase the quantity of physical resources occupied by the first UCI and ensure performance of the first UCI.

As in the methods 1-1, 1-2, and 1-3, with respect to the quantity of physical resources for the first UCI on the first uplink data channel, the TBS may be corrected (for example, an equivalent TBS is used), or the quantity of physical resources may be corrected (for example, an uplink data channel or an uplink data channel set different from the first uplink data channel is used, or the quantity #M2 or #M3 of physical resources that is different from the quantity #M1 of physical resources is used). In addition, the equalization parameter may be corrected, that is, #Q is calculated by using the first equalization parameter different from the second equalization parameter. The equalization parameter (scaling factor) is also referred to as a scaling factor.

In an embodiment (referred to as a method 1-4A), the terminal device uses different equalization parameters in different cases to calculate the quantity #Q of physical resources occupied by the first UCI on the first uplink data channel. The different cases herein are whether the first uplink data channel is overloaded, or whether a quantity of physical resources used to determine #T1 matches the first uplink data channel, or whether the uplink data channel set is equal to the first uplink data channel.

In a first case, the terminal device may determine, based on the second equalization parameter, the quantity #Q of physical resources occupied by the first UCI, or the second equalization parameter may be an equalization parameter used to determine the quantity of physical resources occupied by the first UCI in the first case.

Further, in the first case, the terminal device determines #Q based on #T1, #M1, and the second equalization parameter.

The first case is: The uplink data channel set is the same as the first uplink data channel, or the quantity of physical resources included in the uplink data channel set is equal to the quantity of physical resources included in the first uplink data channel, or the quantity of time domain symbols included in the first uplink data channel is not less than (or greater than) the first threshold, or the quantity of time domain symbols included in the first uplink data channel is not less than (or greater than) the quantity of time domain symbols included in the target uplink data channel, or the quantity of physical resources included in the first uplink data channel is not less than (or greater than) the second threshold, or the quantity of physical resources included in the first uplink data channel is not less than (or greater than) the quantity of physical resources included in the target uplink data channel, or the code rate for carrying the first UCI on the first uplink data channel is not greater than (or less than) the third threshold, or the corresponding code rate for carrying the first UCI on the first uplink data channel is not greater than (or less than) the corresponding code rate for carrying the first UCI on the target uplink data channel. The first case may also be referred to as a case in which the first uplink data channel is not overloaded.

In a second case, the terminal device may determine, based on the first equalization parameter, the quantity #Q of physical resources occupied by the first UCI, or the first equalization parameter is an equalization parameter used to determine the quantity #Q of physical resources occupied by the first UCI in the second case.

Further, in the second case, the terminal device determines #Q based on #T1, #M1, and the first equalization parameter.

The second case is: The uplink data channel set is unequal to the first uplink data channel, or the quantity of time domain symbols included in the first uplink data channel is less than (or not greater than) the first threshold, or the quantity of time domain symbols included in the first uplink data channel is less than (or not greater than) the quantity of time domain symbols included in the target uplink data channel, or the quantity of time domain symbols included in the first uplink data channel is less than (or not greater than) the quantity of time domain symbols included in the target uplink data channel of the K uplink data channels, or the quantity of physical resources included in the first uplink data channel is less than (or not greater than) the second threshold, or the quantity of physical resources included in the first uplink data channel is less than (or not greater than) the quantity of physical resources included in the target uplink data channel, or the code rate for carrying the first UCI on the first uplink data channel is greater than (or not less than) the third threshold, or the corresponding code rate for carrying the first UCI on the first uplink data channel is greater than (or not less than) the corresponding code rate for carrying the first UCI on the target uplink data channel. The second case may also be referred to as a case in which the first uplink data channel is overloaded.

In other words, the first equalization parameter is an equalization parameter in a case in which the first uplink data channel is overloaded, and the second equalization parameter is an equalization parameter in a case in which the first uplink data channel is not overloaded.

In another embodiment (referred to as a method 1-4B), the terminal device uses different equalization parameters for different uplink data channels, to separately calculate quantities of physical resources occupied by corresponding UCI on different uplink data channels.

Specifically, the first equalization parameter is an equalization parameter used to determine the quantity of physical resources occupied by the first UCI on the first uplink data channel, and the second equalization parameter is an equalization parameter used to determine a quantity of physical resources occupied by the second UCI on the third uplink data channel.

For the first uplink data channel, the terminal device determines, based on the first equalization parameter, the quantity #Q of physical resources occupied by the first UCI. Further, the terminal device may determine, based on #T1, #M1, and the first equalization parameter, the quantity #Q of physical resources occupied by the first UCI.

For the third uplink data channel, the terminal device determines, based on the second equalization parameter, the quantity #Q" of physical resources occupied by the second UCI. Further, the terminal device may determine, based on #T1, a quantity of physical resources included in the third uplink data channel, and the second equalization parameter, the quantity #Q" of physical resources occupied by the second UCI.

It should be understood that the quantity of physical resources included in the third uplink data channel is a quantity of physical resources that are on the third uplink data channel and can be used to carry the UCI.

The first UCI is different from the second UCI, and the second UCI may be UCI that the second control information indicates the terminal device to send, or may be UCI that other downlink control information different from the second control information indicates the terminal device to send.

A method in which the second control information or the other downlink control information indicates the terminal device to send the second UCI is similar to a method in which the second control information indicates the terminal device to send the first UCI. For example, the network device may send the second control information or the other downlink control information to the terminal device, where the second control information or the other downlink control information includes information about a second time domain resource for transmitting the second UCI, and the second time domain resource overlaps the third uplink data channel of the K uplink data channels in time domain. That the second time domain resource overlaps the third uplink data channel of the K uplink data channels in time domain may also be expressed as: The second time domain resource corresponds to the third uplink data channel of the K uplink data channels.

Further, the third uplink data channel is one of the K uplink data channels.

It should be understood that the third uplink data channel is unequal to the first uplink data channel. In other words, the terminal device uses different equalization parameters on different uplink data channels to separately determine physical resources occupied by corresponding UCI.

Further, the third uplink data channel may be equal to the uplink data channel set (for example, when the uplink data channel set is one uplink data channel), or the quantity of physical resources included in the third uplink data channel is equal to the quantity of physical resources included in the uplink data channel set, or the quantity of physical resources included in the third uplink data channel is greater than (or not less than) the quantity of physical resources included in the first uplink data channel, or a quantity of time domain symbols included in the third uplink data channel is greater than (or not less than) the first threshold, or a quantity of time domain symbols included in the third uplink data channel is not less than (or greater than) the quantity of time domain symbols included in the target uplink data channel, or the quantity of physical resources included in the third uplink data channel is greater than (or not less than) the second threshold, or the quantity of physical resources included in the third uplink data channel is not less than (or greater than) the quantity of physical resources included in the target uplink data channel, or a code rate for carrying the first UCI on the third uplink data channel is less than (or not greater than) the third threshold, or a corresponding code rate for carrying the first UCI on the third uplink data channel is not greater than (or less than) the corresponding code rate for carrying the first UCI on the target uplink data channel.

Specifically, #Q of the first UCI or #Q" of the second UCI may be obtained through calculation based on the following formula, where $\beta_{offset,1}^{PUSCH}$ represents the first equalization parameter, and $\beta_{offset,2}^{PUSCH}$ represents the second equalization parameter. For definitions of other parameters, refer to descriptions corresponding to the formulas (1), (2), and (3). When the following formula is used to calculate #Q, the uplink data channel (namely, the PUSCH) in the formulas (1), (2), and (3) is the first uplink data channel, $$\sum_{l=0}^{N_{symb,all}^{PUSCH}-1} M_{sc}^{UCI}(l)$$

is the quantity #M1 of physical resources included in the first uplink data channel, $O_{ACK}$, $O_{CSI-1}$, or $O_{CSI-2}$ is the payload of the first UCI, and $L_{ACK}$, $L_{CSI-1}$, or $L_{CSI-2}$ is a CRC of the first UCI. When the following formula is used to calculate #Q", the uplink data channel (PUSCH) in the formulas (1), (2), and (3) is the third uplink data channel, $$\sum_{l=0}^{N_{symb,all}^{PUSCH}-1} M_{sc}^{UCI}(l)$$

is the quantity of physical resources included in the third uplink data channel, $O_{ACK}$, $O_{CSI-1}$, or $O_{CSI-2}$ is a payload of the second UCI, and $L_{ACK}$, $L_{CSI-1}$, or $L_{CSI-2}$ is a CRC of the second UCI.

When the first UCI or the second UCI is a HARQ-ACK:

The formula for calculating #Q in the first case may be expressed as follows, where #Q represents $Q'_{ACK}$, or #Q is obtained based on $Q'_{ACK}$ (method 1-4A). Alternatively, the formula for calculating #Q may be expressed as follows, where #Q represents $Q'_{ACK}$, or #Q is obtained based on $Q'_{ACK}$ (method 1-4B):

$$Q'_{ACK} = \frac{(O_{ACK} + L_{ACK}) \cdot \beta_{offset,2}^{PUSCH} \cdot \sum_{l=0}^{N_{symb,all}^{PUSCH}-1} M_{sc}^{UCI}(l)}{\sum_{r=0}^{C_{UL-SCH}-1} K_r}, \text{ or}$$

$$Q'_{ACK} = \min\left\{ \left\lceil \frac{(O_{ACK} + L_{ACK}) \cdot \beta_{offset,2}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil \right\},$$

where $\beta_{offset,2}^{PUSCH}$ represents the second equalization parameter.

The formula for calculating #Q in the second case may be expressed as follows, where #Q represents $Q'_{ACK}$, or #Q is obtained based on $Q'_{ACK}$ (method 1-4A). Alternatively, the formula for calculating #Q" may be expressed as follows, where #Q" represents $Q'_{ACK}$, or #Q" is obtained based on $Q'_{ACK}$ (method 1-4B):

$$Q'_{ACK} = \frac{(O_{ACK} + L_{ACK}) \cdot \beta_{offset,1}^{PUSCH} \cdot \sum_{l=0}^{N_{symb,all}^{PUSCH}-1} M_{sc}^{UCI}(l)}{\sum_{r=0}^{C_{UL-SCH}-1} K_r}, \text{ or}$$

$$Q'_{ACK} = \min\left\{ \left\lceil \frac{(O_{ACK} + L_{ACK}) \cdot \beta_{offset,1}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil \right\},$$

where βoffset,1$^{PUSCH}$ represents the first equalization parameter.

When the first UCI or the second UCI is a CSI part 1:

The formula for calculating #Q in the first case may be expressed as follows, where #Q represents $Q'_{CSI-1}$, or #Q is obtained based on $Q'_{CSI-1}$ (method 1-4A). Alternatively, the formula for calculating #Q may be expressed as follows, where #Q represents $Q'_{CSI-1}$, or #Q is obtained based on $Q'_{CSI-1}$ (method 1-4B):

$$Q'_{CSI-1} = \frac{(O_{CSI-1} + L_{CSI-1}) \cdot \beta_{offset,2}^{PUSCH} \cdot \sum_{l=0}^{N_{symb,all}^{PUSCH}-1} M_{sc}^{UCI}(l)}{\sum_{r=0}^{C_{UL-SCH}-1} K_r}, \text{ or}$$

$$Q'_{CSI-1} = \min\left\{ \left\lceil \frac{(O_{CSI-1} + L_{CSI-1}) \cdot \beta_{offset,2}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK} \right\}.$$

The formula for calculating #Q in the second case may be expressed as follows, where #Q represents $Q'_{CSI-1}$, or #Q is obtained based on $Q'_{CSI-1}$ (method 1-4A). Alternatively, the formula for calculating #Q" may be expressed as follows, where #Q" represents $Q'_{CSI-1}$, or #Q" is obtained based on $Q'_{CSI-1}$ (method 1-4B):

$$Q'_{CSI-1} = \frac{(O_{CSI-1} + L_{CSI-1}) \cdot \beta_{offset,1}^{PUSCH} \cdot \sum_{l=0}^{N_{symb,all}^{PUSCH}-1} M_{sc}^{UCI}(l)}{\sum_{r=0}^{C_{UL-SCH}-1} K_r}, \text{ or}$$

$$Q'_{CSI-1} = \min\left\{ \left\lceil \frac{(O_{CSI-1} + L_{CSI-1}) \cdot \beta_{offset,1}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=0}^{N_{symb,all}^{PUSCH}-1} M_{sc}^{UCI}(l) \right\rceil - Q'_{ACK} \right\}.$$

When the first UCI or the second UCI is a CSI part 2:

The formula for calculating #Q in the first case may be expressed as follows, where #Q represents $Q'_{CSI-2}$, or #Q is obtained based on $Q'_{CSI-2}$ (method 1-4A). Alternatively, the formula for calculating #Q may be expressed as follows, where #Q represents $Q'_{CSI-2}$, or #Q is obtained based on $Q'_{CSI-2}$ (method 1-4B):

$$Q'_{CSI-2} = \frac{(O_{CSI-2} + L_{CSI-2}) \cdot \beta_{offset,2}^{PUSCH} \cdot \sum_{l=0}^{N_{symb,all}^{PUSCH}-1} M_{sc}^{UCI}(l)}{\sum_{r=0}^{C_{UL-SCH}-1} K_r}, \text{ or}$$

-continued $$Q'_{CSI-2} = \min\left\{\left[\frac{\left(O_{CSI-2} + L_{CSI-2}\right) \cdot \beta^{PUSCH}_{offset,2} \cdot \sum_{l=0}^{N^{PUSCH}_{symb,all}-1} M^{UCI}_{sc}(l)}{\sum_{r=0}^{C_{UL-SCH}-1} K_r}\right], \left[\alpha \cdot \sum_{l=0}^{N^{PUSCH}_{symb,all}-1} M^{UCI}_{sc}(l)\right] - Q'_{ACK} - Q'_{CSI-1}\right\}.$$

The formula for calculating #Q in the second case may be expressed as follows, where #Q represents $Q'_{CSI-2}$, or #Q is obtained based on $Q'_{CSI-2}$ (method 1-4A). Alternatively, the formula for calculating #Q" may be expressed as follows, where #Q" represents $Q'_{CSI-2}$, or #Q" is obtained based on $Q'_{CSI-2}$ (method 1-4B):

$$Q'_{CSI-2} = \frac{\left(O_{CSI-2} + L_{CSI-2}\right) \cdot \beta^{PUSCH}_{offset,1} \cdot \sum_{l=0}^{N^{PUSCH}_{symb,all}-1} M^{UCI}_{sc}(l)}{\sum_{r=0}^{C_{UL-SCH}-1} K_r}, \text{ or}$$

$$Q'_{CSI-2} = \min\left\{\left[\frac{\left(O_{CSI-2} + L_{CSI-2}\right) \cdot \beta^{PUSCH}_{offset,1} \cdot \sum_{l=0}^{N^{PUSCH}_{symb,all}-1} M^{UCI}_{sc}(l)}{\sum_{r=0}^{C_{UL-SCH}-1} K_r}\right], \left[\alpha \cdot \sum_{l=0}^{N^{PUSCH}_{symb,all}-1} M^{UCI}_{sc}(l)\right] - Q'_{ACK} - Q'_{CSI-1}\right\}.$$

It should be understood that the first equalization parameter and the second equalization parameter are equalization parameters notified by the network device. For example, they may be equalization parameters configured or indicated by the network device.

Specifically, the terminal device may further receive third control information from the network device, where the third control information may include a first field, and both the first equalization parameter and the second equalization parameter correspond to the first field or a first index value notified by the first field, that is, the first equalization parameter and the second equalization parameter are indicated or indexed by the network device by using the same field of the same control information.

Correspondingly, the network device may send the third control information to the terminal device.

In other words, the third control information or the first field notifies the two equalization parameters, and the two equalization parameters are respectively used to calculate #Q in the first case and the second case, or respectively used to calculate the quantity #Q of physical resources occupied by the first UCI on the first uplink data channel and the quantity #Q''' of physical resources occupied by the second UCI on the third uplink data channel.

More specifically, the third control information may be higher layer signaling, or may be physical layer downlink control information, for example, DCI information. For example, the first field may be a betaOffsetACK field or a betaOffsetCSI field in higher layer signaling, or may be a beta_offset indicator field in physical layer downlink control information.

When both the first equalization parameter and the second equalization parameter correspond to the first field or the first index value notified by the first field, for example, when the first index value corresponds to values of the two equalization parameters: the first equalization parameter and the second equalization parameter, the two equalization parameters respectively take effect in different cases described above or take effect for different uplink data channels.

It should be understood that the third control information may be the second control information, or may be other control information different from the second control information.

It should be understood that the third control information may be the first control information, or may be other control information different from the first control information.

Therefore, when #T1 (or #P1 corresponding to #T1) and the first uplink data channel (or #M1) do not match, the equalization parameter may be adjusted to compensate for the quantity #Q of physical resources occupied by the first UCI, and an appropriate #Q is determined by using #T1, #M1, and the adjusted first equalization parameter. In this way, the determined #Q is prevented from being excessively large or excessively small, and transmission reliability and validity of the first UCI are ensured.

Figure 9:
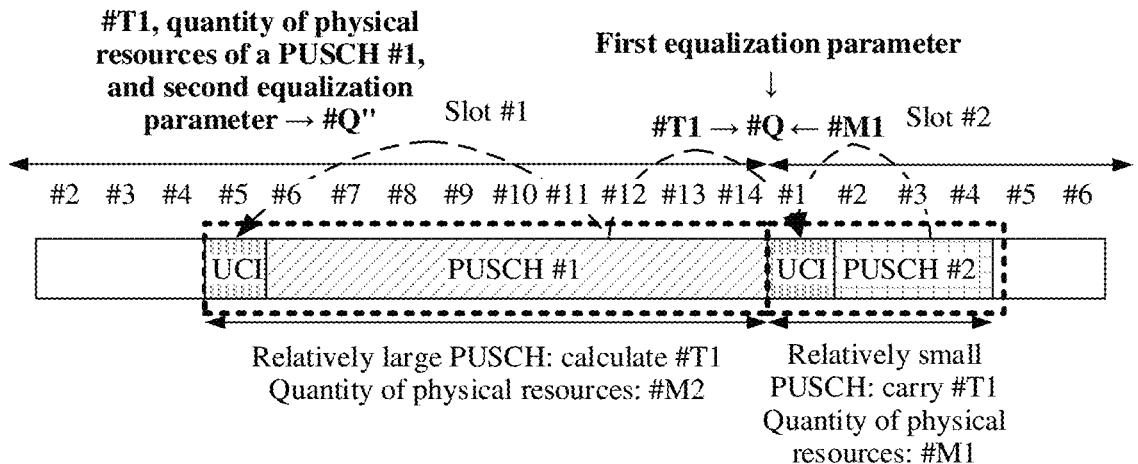
FIG. 9 is still another schematic diagram of transmission of a UL-SCH and UCI according to an embodiment of the present invention.

FIG. 9 is still another schematic diagram of transmission of a UL-SCH and UCI according to an embodiment of the present invention. As shown in FIG. 9, K=2, the first uplink data channel is a later uplink data channel of the K uplink data channels, and the uplink data channel set, namely, the third uplink data channel, is an earlier uplink data channel of the K uplink data channels. The first TBS #T1 is obtained through calculation based on physical resources included in the earlier uplink data channel, and the first time domain resource overlaps the second uplink data channel. Therefore, the first UCI is carried on the later uplink data channel. However, the first TBS #T1 is not obtained through calculation based on the first uplink data channel, and does not match the quantity of physical resources of the first uplink data channel. To obtain a moderate quantity #Q of physical resources for the first UCI through calculation, the terminal device determines #Q based on #T1, the quantity #M1 of physical resources that are included in the first uplink data channel and can be used to carry the UCI, and a relatively large first equalization parameter. In comparison, for the second UCI carried on the third uplink data channel, #T1 matches the quantity #M2 of physical resources included in the third uplink data channel, and the quantity #Q" of physical resources occupied by the UCI on the third uplink data channel is calculated by using #T1, #M2, and a relatively small second equalization parameter.

Method 2: Drop a part of the UCI in the first UCI.

When the first uplink data channel is overloaded, and the physical resource occupied by the first UCI is determined, the quantity #Q of physical resources occupied by the first UCI may be calculated by using the first TBS #T1 and the quantity #M1 of physical resources included in the first uplink data channel. In this way, #Q obtained through calculation is relatively small. Therefore, a problem that the first uplink data channel is overloaded can be resolved by dropping some information in the first UCI.

Specifically, when the first UCI includes a plurality of pieces of information in a HARQ-ACK, a CSI part 1, a CSI part 2, and an SR, a part of information in the first UCI may be dropped, and the remaining part of information is sent on the first uplink data channel. It can be learned that, although the quantity #Q of physical resources carrying the first UCI does not increase, an effect of reducing the code rate is also achieved by reducing the payload size of the UCI, and reliability of the UCI actually sent on the first uplink data channel is ensured.

More specifically, when information in the first UCI is dropped, the information may be dropped based on a priority. Because information with a higher priority is more important, information with a lower priority may be dropped, and information with a higher priority is sent.

For example, information with a high priority may include an SR, or may include a HARQ-ACK, or may include a HARQ-ACK and an SR, and information with a low priority may include CSI. The CSI herein may include a CSI part 1, or may include a CSI part 2, or may include a CSI part 1 and a CSI part 2.

For another example, information with a high priority may include a HARQ-ACK and a part of CSI, or may include an SR and a part of CSI, or may include a HARQ-ACK, an SR, and a part of CSI, and information with a low priority may include another part of CSI.

It should be understood that information belonging to a same type of UCI may also be prioritized. For example, a priority of a part of CSI is high, and a priority of another part of CSI is low. Therefore, when some CSI is dropped, CSI with a lower priority may be dropped, and CSI with a higher priority may be sent. For example, a priority of the CSI part 1 is higher than a priority of the CSI part 2. For another example, for any type of the foregoing CSI information (such as CSI information or the CSI part 1 or the CSI part 2), in the CSI information, a priority value of CSI information with a higher priority value is higher than a priority value of CSI information with a lower priority value.

Method 3: Adjust a transmission occasion or a transmission resource for the first UCI.

Method 3-1: Use another uplink data channel of the K uplink data channels to send the first UCI. In other words, that the terminal device determines the physical resource #q occupied by the first UCI includes: The physical resource #q occupied by the first UCI and determined by the terminal device is located on a fourth uplink data channel, or the physical resource #q occupied by the first UCI and determined by the terminal device is a physical resource on a fourth uplink data channel.

It should be understood that the fourth uplink data channel is an uplink data channel different from the first uplink data channel among the K uplink data channels.

In one case, the quantity #Q of physical resources occupied by the first UCI may continue to be determined based on the quantity #M1 of physical resources included in the first uplink data channel and the first TBS #T1.

In another case, the quantity #Q of physical resources occupied by the first UCI may be determined based on a quantity of physical resources included in the fourth uplink data channel and the first TBS #T1.

It should be understood that the quantity of physical resources included in the fourth uplink data channel is a quantity of physical resources that are on the fourth uplink data channel and can be used to carry the UCI.

However, the physical resource occupied by the first UCI is a physical resource on the fourth uplink data channel. The fourth uplink data channel may be equal to the uplink data channel set (for example, when the uplink data channel set is one uplink data channel), or the quantity of physical resources included in the fourth uplink data channel may be equal to the quantity of physical resources included in the uplink data channel set, or the quantity of physical resources included in the fourth uplink data channel is greater than (or not less than) the quantity of physical resources included in the first uplink data channel, or a quantity of time domain symbols included in the fourth uplink data channel is greater than (or not less than) the first threshold or the quantity of time domain symbols included in the target uplink data channel, or the quantity of physical resources included in the fourth uplink data channel is greater than (or not less than) the second threshold or the quantity of physical resources included in the target uplink data channel, or a code rate for carrying the first UCI on the fourth uplink data channel is less than (or not greater than) the third threshold or the code rate for carrying the first UCI on the target uplink data channel.

In this way, a channel for sending the first UCI is adjusted to another fourth uplink data channel with a larger quantity of physical resources. Because the corresponding $$\sum_{l=0}^{N_{symb,all}^{PUSCH}-1} M_{sc}^{UCI}(l)$$

the formula (1), (2), or (3) is greater, #Q obtained through calculation is also greater than a quantity of physical resources occupied by the UCI that is obtained through calculation based on the quantity #M1 of physical resources included in the first uplink data channel. Therefore, transmission reliability of the UCI is improved.

Specifically, the quantity of physical resources included in the fourth uplink data channel is the quantity of physical resources that are on the fourth uplink data channel and can be used to carry the UCI.

Generally, the fourth uplink data channel may be later than the first uplink data channel in time domain, or may be earlier than the first uplink data channel.

Further, the fourth uplink data channel does not overlap the first uplink data channel in time domain.

For example, when the first time domain resource overlaps at least one uplink data channel including the first uplink data channel and the fourth uplink data channel in time domain, the fourth uplink data channel may be an uplink data channel later than the first uplink data channel. To be specific, the terminal device postpones sending the first UCI on a later uplink data channel of the at least one uplink data channel instead of sending the first UCI on the earliest first uplink data channel of the at least one uplink data channel.

Further, the fourth uplink data channel does not overlap the first time domain resource in time domain. Even if the first time domain resource and the fourth uplink data channel do not overlap each other in time domain, the first UCI may be carried on the fourth uplink data channel for sending.

Figure 10:
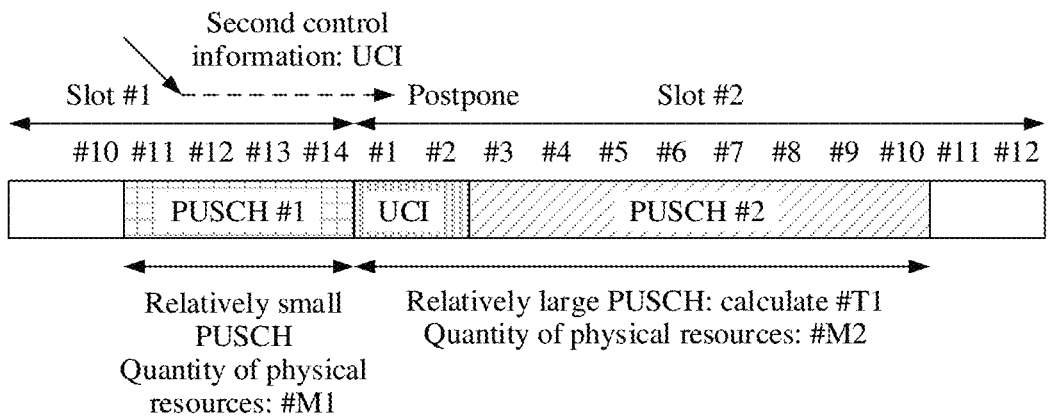
FIG. 10 is still another schematic diagram of transmission of a UL-SCH and UCI according to an embodiment of the present invention.

FIG. 10 is still another schematic diagram of transmission of a UL-SCH and UCI according to an embodiment of the present invention. As shown in FIG. 10, K=2, the first uplink data channel is an earlier uplink data channel of the K uplink data channels, and the fourth uplink data channel is a later uplink data channel of the K uplink data channels. The first TBS #T1 is obtained through calculation based on physical resources included in the later uplink data channel, and the first time domain resource overlaps the first uplink data channel. However, because the first TBS #T1 is not obtained through calculation based on the first uplink data channel, and does not match the quantity of physical resources of the first uplink data channel, to ensure transmission performance of the first UCI, sending of the first UCI is postponed on the fourth uplink data channel, where the first TBS #T1 matches the quantity of physical resources included in the fourth uplink data channel.

Method 3-2: Use an uplink control channel to send the first UCI. In other words, that the terminal device determines the physical resource #q occupied by the first UCI includes: The physical resource #q occupied by the first UCI and determined by the terminal device is located on a first uplink control channel of the first time domain resource, or the physical resource #q occupied by the first UCI and determined by the terminal device is a physical resource on an uplink control channel corresponding to the first time domain resource.

Generally, when the time domain resource corresponding to the UCI overlaps the uplink data channel in time domain, to send the UCI and data information simultaneously, the terminal device adds the UCI to the uplink data channel for sending, but does not send the UCI on the uplink control channel. However, when the uplink data channel used to send the UCI is overloaded, directly placing the UCI on the uplink data channel for sending affects reliability of the UCI. Therefore, the resource for sending the UCI may be adjusted, so that the UCI is not sent on the uplink data channel but is sent on the uplink control channel. In other words, although the first time domain resource overlaps the first uplink data channel in time domain, the terminal device does not add the first UCI to the first uplink data channel for sending, but still sends the first UCI on the uplink control channel, thereby ensuring transmission reliability of the first UCI. The uplink control channel may be a PUCCH.

Specifically, a physical resource on which the uplink control channel is located is a physical resource notified by the second control information, where the physical resource is on the uplink control channel and corresponds to the first UCI, that is, the uplink control channel corresponding to the first time domain resource overlaps the first time domain resource in time domain. More specifically, a time-frequency resource on which the uplink control channel is located corresponds to a time domain resource notified by at least one field of the second control information. The at least one field may be a 'PUCCH resource indicator' field, or may be a 'PDSCH-to-HARQ_feedback timing indicator' field, or may be a 'PUCCH resource indicator' field and a 'PDSCH-to-HARQ_feedback timing indicator' field.

Further, the terminal device may drop the first uplink data channel or stop sending information on the first uplink data channel. Because the terminal device does not support simultaneous sending of the uplink control channel and the uplink data channel, when sending the uplink control channel, the terminal device drops the first uplink data channel or stops sending information on the first uplink data channel.

It should be understood that dropping may specifically refer to not sending the first data packet on the first uplink data channel, or not sending information on the first uplink data channel, for example, not sending any information on a time-frequency resource corresponding to the first uplink data channel.

It should be understood that drop may also be referred to as omit or cancel.

It should be understood that stopping sending information on the first uplink data channel means that the information is not sent on the first uplink data channel on the time domain resource on which the uplink control channel overlaps the first uplink data channel. For example, the information may start to be sent at a start point of the first uplink data channel, but before the information is sent on the uplink control channel, sending of the information on the first uplink data channel is stopped. In addition, after sending of the information on the uplink control channel is complete, the information may continue to be sent on the first uplink data channel, or the information may not continue to be sent on the first uplink data channel.

Still further, the uplink control channel and the first uplink data channel are located on a same carrier or in a same BWP.

Figure 11:
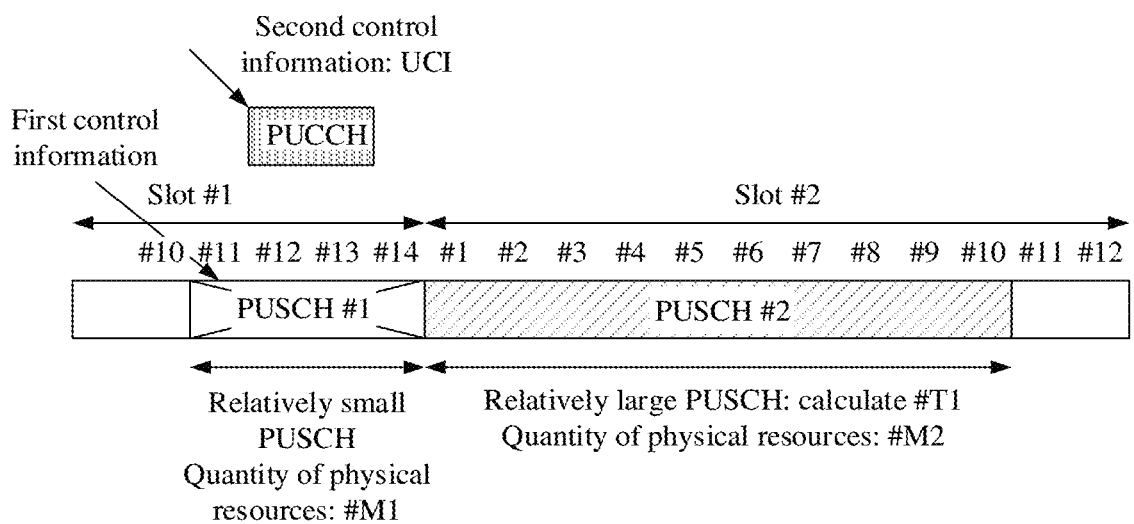
FIG. 11 is still another schematic diagram of transmission of a UL-SCH and UCI according to an embodiment of the present invention.

FIG. 11 is still another schematic diagram of transmission of a UL-SCH and UCI according to an embodiment of the present invention. As shown in FIG. 11, K=2, the first uplink data channel is an earlier uplink data channel of the two uplink data channels, and the uplink data channel set is a later uplink data channel of the two uplink data channels. The first TBS #T1 is obtained through calculation based on physical resources included in the later uplink data channel, and the first time domain resource overlaps the first uplink data channel. Because the first TBS #T1 is not obtained through calculation based on the first uplink data channel, and does not match the quantity of physical resources of the first uplink data channel, to ensure transmission performance of the first UCI, the terminal device sends the first UCI on the physical resource of the uplink control channel notified by the network device. In addition, the first uplink data channel is dropped.

604. The network device determines the physical resource occupied by the first UCI.

The network device may determine the physical resource occupied by the first UCI, so that the network device can determine where to receive the first UCI sent by the terminal device.

It should be understood that after the network device sends the first control information and/or the second control information to the terminal device, or before the network device sends the first control information and/or the second control information to the terminal device, or when the network device sends the first control information and/or the second control information to the terminal device, the network device may determine the physical resource occupied by the first UCI. This is not limited.

The network device may determine, by using a method corresponding to the terminal device, the physical resource occupied by the first UCI.

Corresponding to the method 1-1: In one case, the quantity of physical resources occupied by the first UCI, which is determined by the network device, corresponds to the equivalent TBS #T2, and this equivalent TBS is different from the first TBS. Specifically, the network device may determine, based on the equivalent TBS #T2, the quantity #Q of physical resources occupied by the first UCI.

In another case, the quantity of physical resources occupied by the first UCI, which is determined by the network device, corresponds to the equivalent TBS #T2, and the equivalent TBS #T2 is a TBS corresponding to the first uplink data channel.

In other words, the network device may determine, based on the equivalent TBS #T2, the quantity #Q of physical resources occupied by the first UCI.

Further, the quantity of physical resources occupied by the first UCI, which is determined by the network device, corresponds to the equivalent TBS #T2 and the quantity (for example, #M1) of physical resources included in the first uplink data channel. Specifically, the quantity of physical resources occupied by the first UCI, which is determined by the network device, may correspond to a combination of the equivalent TBS #T2 and the quantity of physical resources included in the first uplink data channel (for example, #M1). Alternatively, the network device may determine, based on the equivalent TBS #T2 and the quantity (for example, #M1) of physical resources included in the first uplink data channel, the quantity #Q of physical resources occupied by the first UCI.

Corresponding to the method 1-2: In one case, the quantity of physical resources occupied by the first UCI, which is determined by the network device, corresponds to the quantity #M2 of equivalent physical resources, and the quantity #M2 of equivalent physical resources is different from the quantity of physical resources included in the first uplink data channel. Specifically, the network device may determine, based on the quantity #M2 of equivalent physical resources, the quantity #Q of physical resources occupied by the first UCI.

In another case, the quantity of physical resources occupied by the first UCI, which is determined by the network device, corresponds to the quantity #M2 of equivalent physical resources, and the quantity #M2 of equivalent physical resources is the quantity of physical resources included in the uplink data channel set.

In other words, the network device may determine, based on the quantity #M2 of equivalent physical resources, the quantity #Q of physical resources occupied by the first UCI.

Further, the quantity of physical resources occupied by the first UCI, which is determined by the network device, corresponds to the quantity #M2 of equivalent physical resources and the first TBS #T1. Specifically, the quantity of physical resources occupied by the first UCI, which is determined by the network device, may correspond to a combination of the quantity #M2 of equivalent physical resources and the first TBS #T1. Alternatively, the network device may determine, based on the quantity #M2 of equivalent physical resources and the first TBS #T1, the quantity #Q of physical resources occupied by the first UCI.

Corresponding to the method 1-3: The quantity of physical resources occupied by the first UCI, which is determined by the network device, corresponds to the quantity #M3 of physical resources included in the second uplink data channel, and the second uplink data channel is different from the first uplink data channel. Specifically, the network device may determine, based on the quantity #M3 of physical resources included in the second uplink data channel, the quantity #Q of physical resources occupied by the first UCI.

Further, the quantity of physical resources occupied by the first UCI, which is determined by the network device, corresponds to the quantity #M3 of physical resources included in the second uplink data channel and the first TBS #T1. Specifically, the quantity of physical resources occupied by the first UCI, which is determined by the network device, may correspond to a combination of the quantity #M3 of physical resources included in the second uplink data channel and the first TBS #T1. Alternatively, the network device may determine, based on the quantity #M3 of physical resources included in the second uplink data channel and the first TBS #T1, the quantity #Q of physical resources occupied by the first UCI.

Still further, the quantity of physical resources included in the second uplink data channel is used to determine the quantity of physical resources occupied by the UCI on any one of the K uplink data channels.

Corresponding to the method 1-4: The quantity of physical resources occupied by the first UCI, which is determined by the network device, corresponds to the first equalization parameter. Specifically, the network device may determine, based on the first equalization parameter, the quantity #Q of physical resources occupied by the first UCI. The first equalization parameter is different from the second equalization parameter.

Optionally, in the first case, the quantity of physical resources occupied by the first UCI, which is determined by the network device, corresponds to the second equalization parameter. In the second case, the quantity of physical resources occupied by the first UCI, which is determined by the network device, corresponds to the first equalization parameter.

Optionally, for the first uplink data channel, the quantity of physical resources occupied by the first UCI, which is determined by the network device, corresponds to the first equalization parameter. For the third uplink data channel, the quantity of physical resources occupied by the second UCI, which is determined by the network device, corresponds to the second equalization parameter.

Further, that the quantity of physical resources occupied by the first UCI, which is determined by the network device, corresponds to the first equalization parameter includes: The quantity of physical resources occupied by the first UCI, which is determined by the network device, corresponds to #T1, #M1, and the first equalization parameter. Specifically, the quantity of physical resources occupied by the first UCI, which is determined by the network device, corresponds to a combination of #T1, #M1, and the first equalization parameter. Alternatively, the network device may determine, based on #T1, #M1, and the first equalization parameter, the quantity #Q of physical resources occupied by the first UCI.

Similarly, that the quantity of physical resources occupied by the first UCI, which is determined by the network device, corresponds to the second equalization parameter includes: The quantity of physical resources occupied by the first UCI, which is determined by the network device, corresponds to #T1, #M1, and the second equalization parameter. Specifically, the quantity of physical resources occupied by the first UCI, which is determined by the network device, corresponds to a combination of #T1, #M1, and the second equalization parameter. Alternatively, the network device may determine, based on #T1, #M1, and the second equalization parameter, the quantity #Q of physical resources occupied by the first UCI.

Similarly, that the quantity of physical resources occupied by the second UCI, which is determined by the network device, corresponds to the second equalization parameter includes: The quantity of physical resources occupied by the second UCI, which is determined by the network device, corresponds to #T1, #M1, and the second equalization parameter. Specifically, the quantity of physical resources occupied by the second UCI, which is determined by the network device, corresponds to a combination of #T1, #M1, and the second equalization parameter. Alternatively, the network device may determine, based on #T1, #M1, and the second equalization parameter, the quantity #Q of physical resources occupied by the second UCI.

Corresponding to the method 2: The UCI sent by the terminal device and received by the network device does not include a part of the first UCI. To be specific, the UCI sent by the terminal device and received by the network device includes a part of the first UCI, but does not include another part of the first UCI.

The physical resource occupied by the first UCI and determined by the network device is a resource on the first uplink data channel.

Further, the physical resource occupied by the first UCI is determined based on the first TBS #T1 and the quantity of physical resources included in the first uplink data channel.

Corresponding to the method 3-1: The physical resource occupied by the first UCI and determined by the network device is a physical resource on the fourth uplink data channel, the fourth uplink data channel is one of the K uplink data channels, and the fourth uplink data channel is unequal to the first uplink data channel.

Corresponding to the method 3-2: The physical resource occupied by the first UCI and determined by the network device is a physical resource on the uplink control channel corresponding to the first time domain resource.

Further, an uplink data channel on which the network device receives uplink information does not include the first uplink data channel, or a part of physical resources included in the first uplink data channel and overlapping the first time domain resource in time domain are not used to transmit uplink information.

For detailed descriptions of the foregoing corresponding methods, refer to step 603. Details are not described herein again.

605. The terminal device sends the first UCI to the network device by using the physical resource occupied by the first UCI.

After determining the physical resource occupied by the first UCI, the terminal device may send the first UCI to the network device by using the physical resource occupied by the first UCI.

Correspondingly, the network device may receive the first UCI from the terminal device by using the physical resource occupied by the first UCI.

Figure 12:
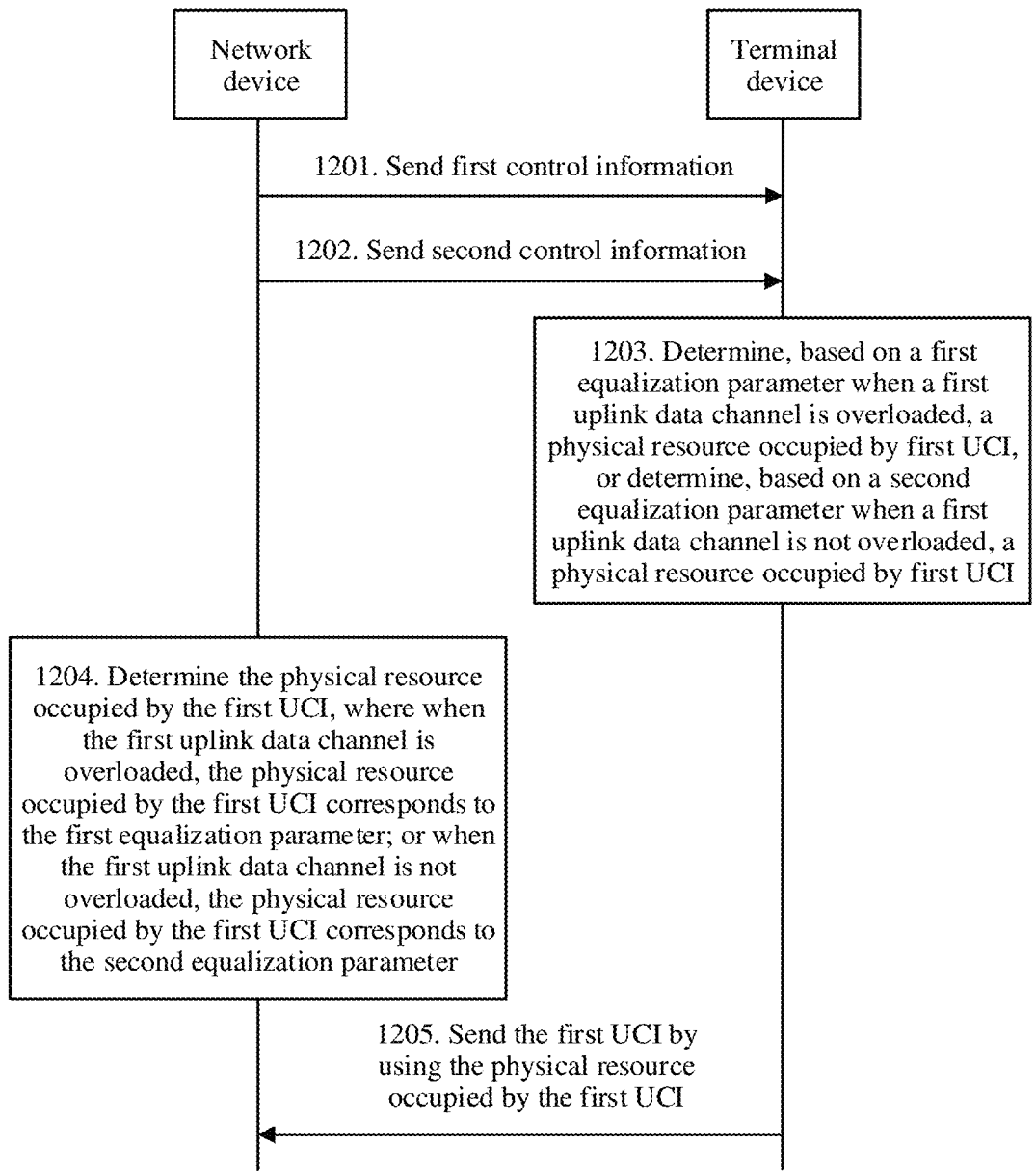
FIG. 12 is a schematic flowchart of another communication method according to an embodiment of the present invention.

Based on the network architecture shown in FIG. 1, an embodiment of the present invention discloses another communication method. FIG. 12 is a schematic flowchart of the communication method. The following describes steps of the communication method in detail. It may be understood that, in this application, a function performed by a network device may also be performed by a module (for example, a chip) in the network device, and a function performed by a terminal device may also be performed by a module (for example, a chip) in the terminal device.

1201. A network device sends first control information to a terminal device.

Step 1201 is the same as step 601. For detailed descriptions, refer to step 601. Details are not described herein again.

1202. The network device sends second control information to the terminal device.

Step 1202 is the same as step 602. For detailed descriptions, refer to step 602. Details are not described herein again.

1203. The terminal device determines, based on a first equalization parameter when a first uplink data channel is overloaded, a physical resource occupied by first UCI, or determines, based on a second equalization parameter when a first uplink data channel is not overloaded, a physical resource occupied by first UCI.

For detailed descriptions of the condition for overloading of the first uplink data channel, the method for determining, based on the first equalization parameter, the physical resource occupied by the first UCI, the condition for non-overloading of the first uplink data channel, and the method for determining, based on the second equalization parameter, the physical resource occupied by the first UCI, refer to step 602 and step 603. Details are not described herein again.

1204. The network device determines the physical resource occupied by the first UCI, where when the first uplink data channel is overloaded, the physical resource occupied by the first UCI corresponds to the first equalization parameter, or when the first uplink data channel is not overloaded, the physical resource occupied by the first UCI corresponds to the second equalization parameter.

Step 1204 is the same as step 604. For detailed descriptions, refer to step 604. Details are not described herein again.

1205. The terminal device sends the first UCI to the network device by using the physical resource occupied by the first UCI.

Step 1205 is the same as step 605. For detailed descriptions, refer to step 605. Details are not described herein again.

Figure 13:
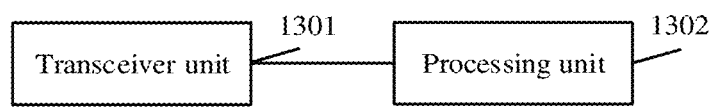
FIG. 13 is a schematic structural diagram of a communications apparatus according to an embodiment of the present invention.

Based on the network architecture shown in FIG. 1 and a same concept of the communication method in the foregoing embodiments, an embodiment of the present invention discloses a communications apparatus. FIG. 13 is a schematic structural diagram of the communications apparatus. The communications apparatus may be applied to the communication method shown in FIG. 6 or FIG. 12. The communications apparatus may be a terminal device or a module (for example, a chip) in a terminal device. As shown in FIG. 13, the communications apparatus may include a transceiver unit 1301 and a processing unit 1302.

The transceiver unit 1301 is configured to receive first control information from a network device, where the first control information includes information about a first physical resource for transmitting a first data packet, the first physical resource corresponds to K uplink data channels, each of the K uplink data channels is used to transmit the first data packet once, and K is a positive integer.

The transceiver unit 1301 is further configured to receive second control information from the network device, where the second control information includes information about a first time domain resource for transmitting first UCI, and the first time domain resource overlaps a first uplink data channel of the K uplink data channels in time domain, where the first uplink data channel is different from an uplink data channel set for determining a first TBS, and the first TBS is a TBS of the first data packet, or a quantity of time domain symbols included in the first uplink data channel is less than (or not greater than) a first threshold, or a quantity of physical resources included in the first uplink data channel is less than (or not greater than) a second threshold, or a code rate for carrying the first UCI on the first uplink data channel is greater than (or not less than) a third threshold.

The processing unit 1302 is configured to determine a physical resource occupied by the first UCI.

The transceiver unit 1301 is further configured to send the first UCI to the network device by using the physical resource occupied by the first UCI.

In an embodiment, a quantity of physical resources included in the uplink data channel set is greater than the quantity of physical resources included in the first uplink data channel.

In an embodiment, the processing unit 1302 is specifically configured to determine, based on an equivalent TBS, a quantity of physical resources occupied by the first UCI, where the equivalent TBS is different from the first TBS.

In an embodiment, the processing unit 1302 is specifically configured to determine, based on an equivalent TBS and the quantity of physical resources included in the first uplink data channel, a quantity of physical resources occupied by the first UCI, where the equivalent TBS is a TBS determined based on the first uplink data channel.

In an embodiment, the processing unit 1302 is specifically configured to determine, based on a quantity of equivalent physical resources, a quantity of physical resources occupied by the first UCI, where the quantity of equivalent physical resources is different from the quantity of physical resources included in the first uplink data channel.

In an embodiment, the processing unit 1302 is specifically configured to determine, based on a quantity of equivalent physical resources and the first TBS, a quantity of physical resources occupied by the first UCI, where the quantity of equivalent physical resources is a quantity of physical resources included in the uplink data channel set.

In an embodiment, the processing unit 1302 is specifically configured to determine, based on a quantity of physical resources included in a second uplink data channel and the first TBS, a quantity of physical resources occupied by the first UCI, where the second uplink data channel is different from the first uplink data channel.

In an embodiment, the processing unit 1302 is specifically configured to determine, based on a quantity of physical resources included in a second uplink data channel and the first TBS, a quantity of physical resources occupied by the first UCI, where the quantity of physical resources included in the second uplink data channel is used to determine a quantity of physical resources occupied by UCI on any one of the K uplink data channels.

In an embodiment, the processing unit 1302 is specifically configured to determine, based on a first equalization parameter, a quantity of physical resources occupied by the first UCI, where the first equalization parameter is different from a second equalization parameter; and the second equalization parameter is an equalization parameter used to determine a quantity of physical resources occupied by the first UCI in a first case, and the first case is a case in which the uplink data channel set is the same as the first uplink data channel, or a case in which the quantity of time domain symbols included in the first uplink data channel is not less than the first threshold, or a case in which the quantity of physical resources included in the first uplink data channel is not less than the second threshold, or a case in which the code rate for carrying the first UCI on the first uplink data channel is not greater than (or less than) the third threshold; or the second equalization parameter is an equalization parameter used to determine a quantity of physical resources occupied by second UCI on a third uplink data channel, the third uplink data channel is one of the K uplink data channels, and the third uplink data channel is unequal to the first uplink data channel.

In an embodiment, the transceiver unit 1301 is further configured to receive third control information from the network device, where the third control information includes a first field, and both the first equalization parameter and the second equalization parameter correspond to the first field, or both the first equalization parameter and the second equalization parameter correspond to a first index value notified by the first field.

In an embodiment, the processing unit 1302 is specifically configured to determine, based on the quantity of physical resources included in the first uplink data channel, the first TBS, and the first equalization parameter, a quantity of physical resources occupied by the first UCI.

In an embodiment, the first equalization parameter is greater than the second equalization parameter.

In an embodiment, the physical resource occupied by the first UCI is a physical resource on the first uplink data channel.

In an embodiment, the physical resource occupied by the first UCI is a physical resource on a fourth uplink data channel, the fourth uplink data channel is one of the K uplink data channels, and the fourth uplink data channel is unequal to the first uplink data channel.

In an embodiment, the fourth uplink data channel does not overlap the first time domain resource in time domain.

In an embodiment, a quantity of physical resources included in the fourth uplink data channel is greater than the quantity of physical resources included in the first uplink data channel, or a quantity of time domain symbols included in the fourth uplink data channel is greater than or equal to (or greater than) the first threshold, or a quantity of physical resources included in the fourth uplink data channel is greater than or equal to (or greater than) the second threshold, or a code rate for carrying the first UCI on the fourth uplink data channel is less than or equal to (or less than) the third threshold.

In an embodiment, the physical resource occupied by the first UCI is a physical resource on an uplink control channel corresponding to the first time domain resource.

In an embodiment, the processing unit 1302 is further configured to drop the first uplink data channel or stop sending information on the first uplink data channel.

For more detailed descriptions of the transceiver unit 1301 and the processing unit 1302, directly refer to related descriptions of the terminal device in the method embodiment shown in FIG. 6. Details are not described herein.

Figure 14:
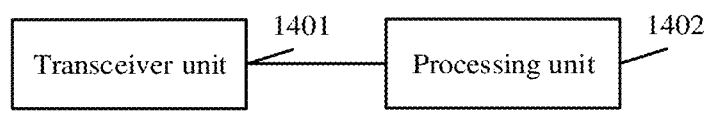
FIG. 14 is a schematic structural diagram of another communications apparatus according to an embodiment of the present invention.

Based on the network architecture shown in FIG. 1 and a same concept of the communication method in the foregoing embodiments, an embodiment of the present invention discloses another communications apparatus. FIG. 14 is a schematic structural diagram of the communications apparatus. The communications apparatus may be applied to the communication method shown in FIG. 6 or FIG. 12. The communications apparatus may be a network device or a module (for example, a chip) in a network device. As shown in FIG. 14, the communications apparatus may include a transceiver unit 1401 and a processing unit 1402.

The transceiver unit 1401 is configured to send first control information to a terminal device, where the first control information includes information about a first physical resource for transmitting a first data packet, the first physical resource corresponds to K uplink data channels, each of the K uplink data channels is used to transmit the first data packet once, and K is a positive integer.

The transceiver unit 1401 is further configured to send second control information to the terminal device, where the second control information includes information about a first time domain resource for transmitting first UCI, and the first time domain resource overlaps a first uplink data channel of the K uplink data channels in time domain, where the first uplink data channel is different from an uplink data channel set for determining a first TBS, and the first TBS is a TBS of the first data packet, or a quantity of time domain symbols included in the first uplink data channel is less than (or not greater than) a first threshold, or a quantity of physical resources included in the first uplink data channel is less than (or not greater than) a second threshold, or a code rate for carrying the first UCI on the first uplink data channel is greater than (or not less than) a third threshold.

The processing unit 1402 is configured to determine a physical resource occupied by the first UCI.

The transceiver unit 1401 is further configured to receive the first UCI from the terminal device by using the physical resource occupied by the first UCI.

In an embodiment, a quantity of physical resources included in the uplink data channel set is greater than the quantity of physical resources included in the first uplink data channel.

In an embodiment, a quantity of physical resources occupied by the first UCI corresponds to an equivalent TBS, and the equivalent TBS is different from the first TBS.

In an embodiment, a quantity of physical resources occupied by the first UCI corresponds to an equivalent TBS and the quantity of physical resources included in the first uplink data channel, and the equivalent TBS is a TBS corresponding to the first uplink data channel.

In an embodiment, a quantity of physical resources occupied by the first UCI corresponds to a quantity of equivalent physical resources, and the quantity of equivalent physical resources is different from the quantity of physical resources included in the first uplink data channel.

In an embodiment, a quantity of physical resources occupied by the first UCI corresponds to a quantity of equivalent physical resources and the first TBS, and the quantity of equivalent physical resources is a quantity of physical resources included in the uplink data channel set.

In an embodiment, a quantity of physical resources occupied by the first UCI corresponds to a quantity of physical resources included in a second uplink data channel, and the second uplink data channel is different from the first uplink data channel.

In an embodiment, a quantity of physical resources occupied by the first UCI corresponds to a quantity of physical resources included in a second uplink data channel and the first TBS, and the quantity of physical resources included in the second uplink data channel is used to determine a quantity of physical resources occupied by UCI on any one of the K uplink data channels.

In an embodiment, a quantity of physical resources occupied by the first UCI corresponds to a first equalization parameter, and the first equalization parameter is different from a second equalization parameter; and the second equalization parameter is an equalization parameter used to determine a quantity of physical resources occupied by the first UCI in a first case, and the first case is a case in which the uplink data channel set is the same as the first uplink data channel, or a case in which the quantity of time domain symbols included in the first uplink data channel is not less than the first threshold, or a case in which the quantity of physical resources included in the first uplink data channel is not less than the second threshold, or a case in which the code rate for carrying the first UCI on the first uplink data channel is not greater than (or less than) the third threshold; or the second equalization parameter is an equalization parameter used to determine a quantity of physical resources occupied by second UCI on a third uplink data channel, the third uplink data channel is one of the K uplink data channels, and the third uplink data channel is unequal to the first uplink data channel.

In an embodiment, the transceiver unit 1401 is further configured to send third control information to the terminal device, where the third control information includes a first field, and both the first equalization parameter and the second equalization parameter correspond to the first field, or both the first equalization parameter and the second equalization parameter correspond to a first index value notified by the first field.

In an embodiment, a quantity of physical resources occupied by the first UCI corresponds to the quantity of physical resources included in the first uplink data channel, the first TBS, and a first equalization parameter.

In an embodiment, the first equalization parameter is greater than the second equalization parameter.

In an embodiment, the physical resource occupied by the first UCI is a physical resource on the first uplink data channel.

In an embodiment, the physical resource occupied by the first UCI is a physical resource on a fourth uplink data channel, the fourth uplink data channel is one of the K uplink data channels, and the fourth uplink data channel is unequal to the first uplink data channel.

In an embodiment, the fourth uplink data channel does not overlap the first time domain resource in time domain.

In an embodiment, a quantity of physical resources included in the fourth uplink data channel is greater than the quantity of physical resources included in the first uplink data channel, or a quantity of time domain symbols included in the fourth uplink data channel is greater than or equal to (or greater than) the first threshold, or a quantity of physical resources included in the fourth uplink data channel is greater than or equal to (or greater than) the second threshold, or a code rate for carrying the first UCI on the fourth uplink data channel is less than or equal to (or less than) the third threshold.

In an embodiment, the physical resource occupied by the first UCI is a physical resource on an uplink control channel corresponding to the first time domain resource.

In an embodiment, an uplink data channel on which uplink information is received does not include the first uplink data channel, or a part of physical resources included in the first uplink data channel and overlapping the first time domain resource in time domain are not used to transmit uplink information.

For more detailed descriptions of the transceiver unit 1401 and the processing unit 1402, directly refer to related descriptions of the network device in the method embodiment shown in FIG. 6. Details are not described herein.

Figure 15:
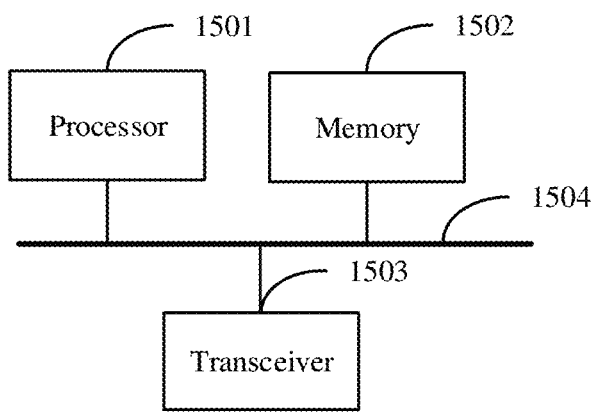
FIG. 15 is a schematic structural diagram of still another communications apparatus according to an embodiment of the present invention.

Based on the network architecture shown in FIG. 1, an embodiment of the present invention discloses still another communications apparatus. FIG. 15 is a schematic structural diagram of the communications apparatus. The communications apparatus may be applied to the communication method shown in FIG. 6 or FIG. 12. As shown in FIG. 15, the communications apparatus may include a processor 1501, a memory 1502, a transceiver 1503, and a bus 1504. The memory 1502 may exist independently, and the bus 1504 is connected to the processor 1501. Alternatively, the memory 1502 may be integrated with the processor 1501. The transceiver 1503 is configured to communicate with another device, a network element, or a communications network, such as an Ethernet, a radio access network (RAN), or a WLAN. The bus 1504 may include a channel for transferring information between the components. The memory 1502 stores a program instruction, and the processor 1501 is configured to execute the program instruction stored in the memory 1502.

In an embodiment, the communications apparatus may be a terminal device or a module (such as a chip) in a terminal device. The processor 1501 is configured to invoke the program instruction stored in the memory 1502 to perform an operation performed by the processing unit 1302 in the foregoing embodiment, and the transceiver 1503 is configured to perform an operation performed by the transceiver unit 1301 in the foregoing embodiment.

In another embodiment, the communications apparatus may be a network device or a module (such as a chip) in a network device. The processor 1501 is configured to invoke the program instruction stored in the memory 1502 to perform an operation performed by the processing unit 1402 in the foregoing embodiment, and the transceiver 1503 is configured to perform an operation performed by the transceiver unit 1401 in the foregoing embodiment.

An embodiment of the present invention further discloses a communications apparatus. The communications apparatus may be a terminal device or a chip in a terminal device, or may be a network device or a chip in a network device. The communications apparatus may be configured to perform an operation performed by the terminal device or the network device in the foregoing method embodiment.

Figure 16:
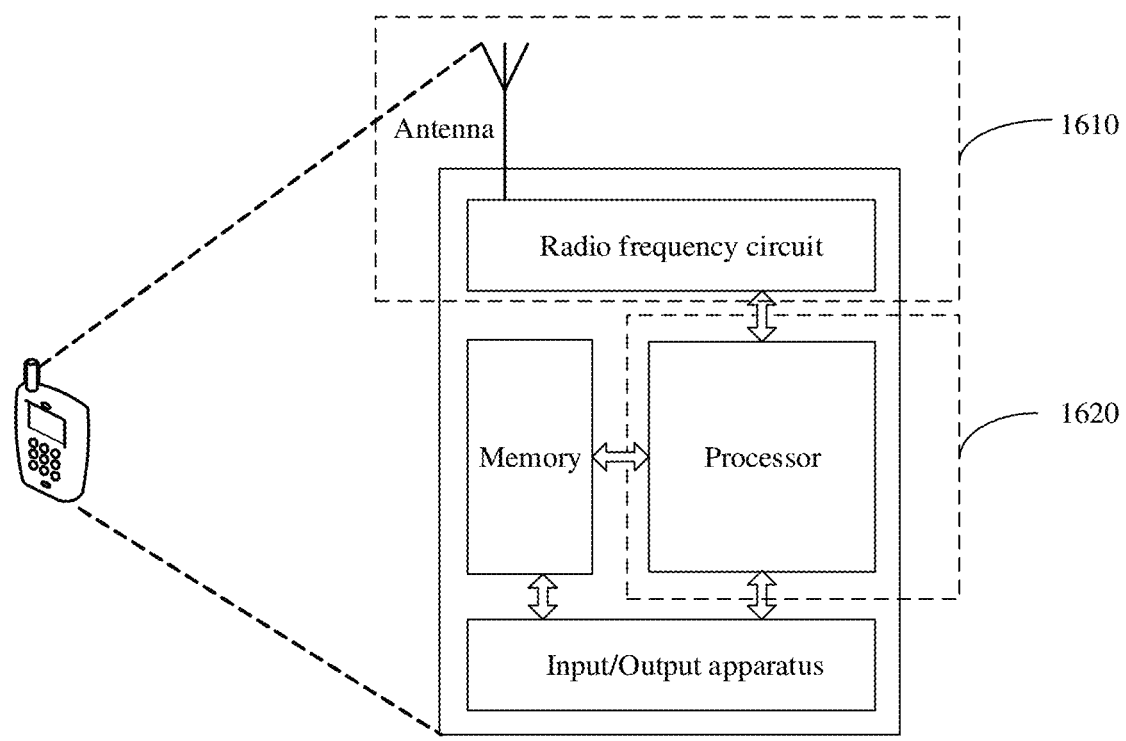
FIG. 16 is a schematic structural diagram of a terminal device according to an embodiment of the present invention.

When the communications apparatus is a terminal device, FIG. 16 is a schematic structural diagram of a terminal device according to an embodiment of the present invention. For ease of understanding and ease of illustration, in FIG. 16, a mobile phone is used as an example of the terminal device. As shown in FIG. 16, the terminal device may include a processor, a memory, a radio frequency circuit, an antenna, and an input/output apparatus. The processor is mainly configured to process a communication protocol and communication data, control the terminal device, execute a software program, process data of the software program, and the like. The memory is mainly configured to store the software program and data. The radio frequency circuit is mainly configured to convert a baseband signal and a radio frequency signal and process the radio frequency signal. The antenna is mainly configured to transmit and receive radio frequency signals in a form of electromagnetic waves. The input/output apparatus, such as a touchscreen, a display screen, or a keyboard, is mainly configured to receive data input by a user and output data to the user. It should be noted that some types of terminal devices may not have an input/output apparatus.

When data needs to be sent, after performing baseband processing on the to-be-sent data, the processor outputs a baseband signal to the radio frequency circuit. After performing radio frequency processing on the baseband signal, the radio frequency circuit sends a radio frequency signal to the outside in a form of an electromagnetic wave by using the antenna. When there is data to be sent to the terminal device, the radio frequency circuit receives a radio frequency signal by using the antenna, converts the radio frequency signal into a baseband signal, and outputs the baseband signal to the processor. The processor converts the baseband signal into data and processes the data. For ease of description, only one memory and one processor are shown in FIG. 16. In an actual terminal device product, there may be one or more processors and one or more memories. The memory may also be referred to as a storage medium, a storage device, or the like. The memory may be disposed independently of the processor, or may be integrated with the processor. This is not limited in this embodiment of the present invention.

In this embodiment of the present invention, the antenna and the radio frequency circuit that have sending and receiving functions may be considered as a transceiver unit of the terminal device, and the processor that has a processing function may be considered as a processing unit of the terminal device. As shown in FIG. 16, the terminal device includes a transceiver unit 1610 and a processing unit 1620. The transceiver unit may also be referred to as a transceiver, a transceiver apparatus, or the like. The processing unit may also be referred to as a processor, a processing board, a processing module, a processing apparatus, or the like. Optionally, in the transceiver unit 1610, a component configured to implement a receiving function may be considered as a receiving unit; and in the transceiver unit 1610, a component configured to implement a sending function may be considered as a sending unit. In other words, the transceiver unit 1610 includes a receiving unit and a sending unit. Sometimes the transceiver unit may also be referred to as a transceiver, a transceiver circuit, or the like. Sometimes the receiving unit may also be referred to as a receiver, a receiving circuit, or the like. Sometimes the sending unit may also be referred to as a transmitter, a transmission circuit, or the like.

It should be understood that the transceiver unit 1610 is configured to perform the sending operation and the receiving operation on the terminal device side in the foregoing method embodiment, and the processing unit 1620 is configured to perform other operations than the sending and receiving operations on the terminal device in the foregoing method embodiment.

For example, in an implementation, the transceiver unit 1610 is configured to perform the receiving operations in step 601 and step 602 on the terminal device side and perform step 605 in FIG. 6, and/or the transceiver unit 1610 is further configured to perform other sending and receiving steps on the terminal device side in the foregoing method embodiment. The processing unit 1620 is configured to perform step 603 in FIG. 6, and/or the processing unit 1620 is farther configured to perform other processing steps on the terminal device side in the foregoing method embodiment.

For example, in an implementation, the transceiver unit 1610 is configured to perform the receiving operations in step 1201 and step 1202 on the terminal device side and perform step 1205 in FIG. 12, and/or the transceiver unit 1610 is further configured to perform other sending and receiving steps on the terminal device side in the foregoing method embodiment. The processing unit 1620 is configured to perform step 1203 in FIG. 12, and/or the processing unit 1620 is further configured to perform other processing steps on the terminal device side in the foregoing method embodiment.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

Figure 17:
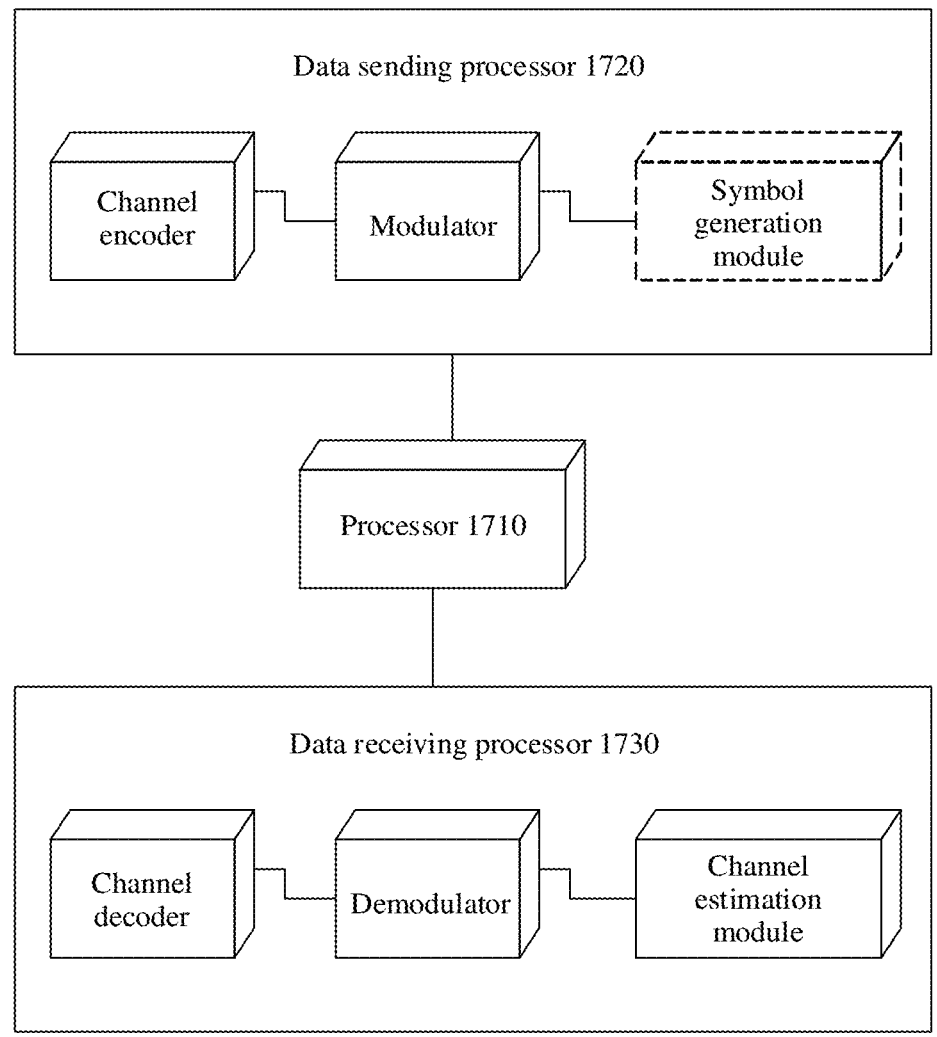
FIG. 17 is a schematic structural diagram of another terminal device according to an embodiment of the present invention.

When the communications apparatus in this embodiment is a terminal device, FIG. 17 is a schematic structural diagram of another terminal device according to an embodiment of the present invention. In an example, the terminal device may perform functions similar to those of the processor in FIG. 15. In FIG. 17, the terminal device includes a processor 1710, a data sending processor 1720, and a data receiving processor 1730. The processing unit 1302 in the foregoing embodiment may be the processor 1710 in FIG. 17, and implements a corresponding function. The transceiver unit 1301 in the foregoing embodiment may be the data sending processor 1720 and/or the data receiving processor 1730 in FIG. 17. Although a channel encoder and a channel decoder are shown in FIG. 17, it may be understood that these modules are not intended to constitute a limitative description of this embodiment and are merely examples.

Figure 18:
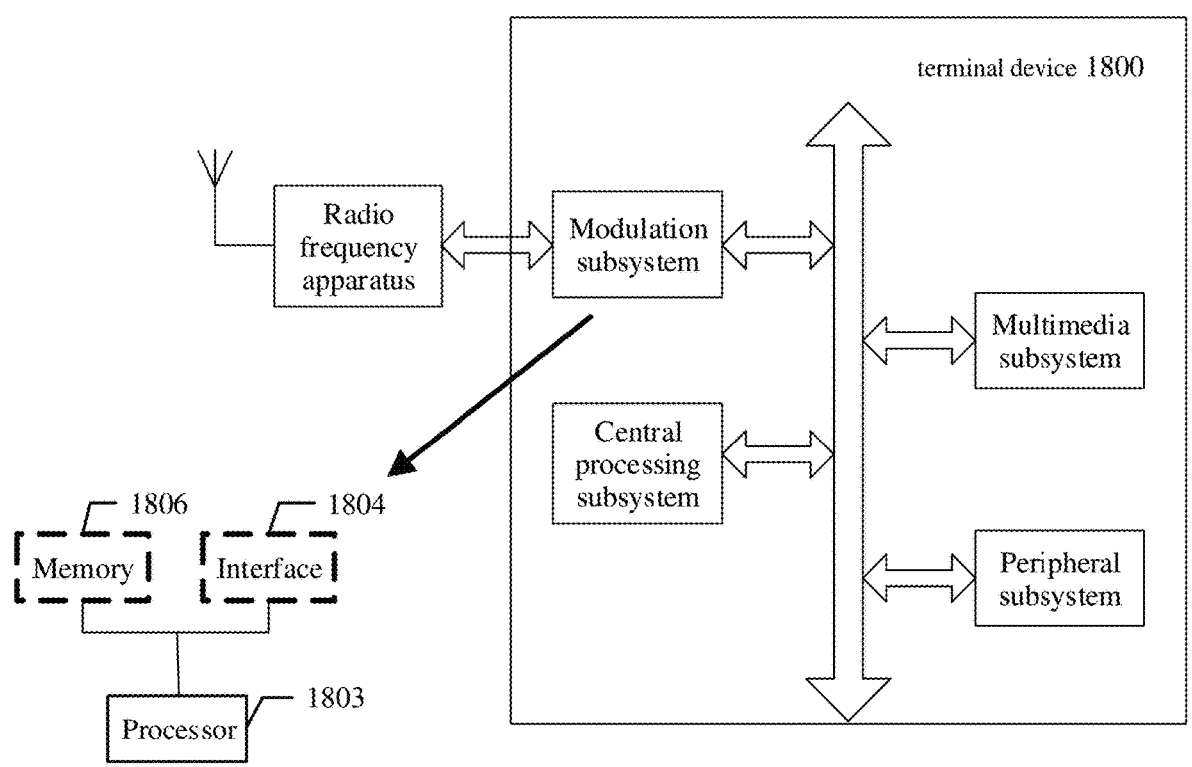
FIG. 18 is a schematic structural diagram of still another terminal device according to an embodiment of the present invention.

FIG. 18 is a schematic structural diagram of still another terminal device according to an embodiment of the present invention. The terminal device 1800 includes modules such as a modulation subsystem, a central processing subsystem, and a peripheral subsystem. The communications apparatus in this embodiment may be used as a modulation subsystem in the terminal device. Specifically, the modulation subsystem may include a processor 1803 and an interface 1804. The processor 1803 implements a function of the processing unit 1302, and the interface 1804 implements a function of the transceiver unit 1301. In another variation, the modulation subsystem includes a memory 1806, a processor 1803, and a program stored in the memory 1806 and capable of running on the processor. When executing the program, the processor 1803 implements the method on the terminal device side in the foregoing method embodiment. It should be noted that the memory 1806 may be non-volatile or volatile, and may be located inside the modulation subsystem, or may be located in the terminal device 1800, provided that the memory 1806 can be connected to the processor 1803.

In another form of this embodiment, a computer-readable storage medium is provided. An instruction is stored in the computer-readable storage medium. When the instruction is executed, the method on the terminal device side in the foregoing method embodiment is performed.

In another form of this embodiment, a computer program product including an instruction is provided. When the instruction is executed, the method on the terminal device side in the foregoing method embodiment is performed.

An embodiment of the present invention further discloses a storage medium. The storage medium stores a program. When the program runs, the communication methods shown in FIG. 6 and FIG. 12 are implemented.

It should be understood that the processor in the embodiments of this application may be a central processing unit (CPU), may be another general-purpose processor, a digital signal processor (DSP), an application-specific integrated circuit (ASIC), a field programmable gate array (FPGA), or another programmable logic device, a transistor logic device, a hardware component, or any combination thereof. The general-purpose processor may be a microprocessor or any conventional processor.

All or some of the foregoing methods in the embodiments of this application may be implemented by software, hardware, firmware, or any combination thereof. When software is used to implement the embodiments, all or some of the embodiments may be implemented in a form of a computer program product. The computer program product includes one or more computer programs or instructions. When the computer programs or instructions are loaded and executed on a computer, all or some of the procedure or functions according to the embodiments of this application are executed. The computer may be a general-purpose computer, a dedicated computer, a computer network, or another programmable apparatus. The computer programs or instructions may be stored in a computer-readable storage medium, or may be transmitted by using the computer-readable storage medium. The computer-readable storage medium may be any usable medium accessible by the computer, or may be a data storage device, such as a server, integrating one or more usable media. The usable medium may be a magnetic medium, for example, a floppy disk, a hard disk, or a magnetic tape, or may be an optical medium, for example, a compact disc read-only memory (CD-ROM) or a digital versatile disc (DVD), or may be a semiconductor medium, for example, a solid-state disk (SSD), a random access memory (RAM), a read-only memory (ROM), or a register.

For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a network device or a terminal device. Certainly, the processor and the storage medium may exist in a sending device or a receiving device as discrete components.

In the embodiments of this application, if there is no special description or logic conflict, terms and/or descriptions in different embodiments are consistent and may be mutually referenced. Technical features in different embodiments may be combined to form a new embodiment based on an internal logical relationship between the technical features.

In this application, the term "at least one" indicates one or more, and the term "a plurality of" indicates two or more. The term "and/or" describes an association relationship of associated objects, and indicates that there may be three relationships. For example, A and/or B may represent the following cases: only A exists, both A and B exist, and only B exists, where A and B may be singular or plural. The symbol "/" in the text description of this application generally represents an "or" relationship between associated objects. In a formula of this application, the symbol "/" indicates a "division" relationship between associated objects.

It may be understood that various numbers in the embodiments of this application are merely intended for distinguishing for ease of description and are not intended to limit the scope of the embodiments of this application. The sequence numbers of the foregoing processes do not mean an execution sequence, and the execution sequence of the processes should be determined according to functions and internal logic of the processes.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on technical solutions of this application shall fall within the protection scope of this application.

What is claimed is:

1. A communication method, comprising:
    receiving first control information from a network device, wherein the first control information comprises information about a first physical resource for transmitting a first data packet, the first physical resource corresponds to K uplink data channels, each of the K uplink data channels is used to transmit the first data packet once, and K is a positive integer;
    receiving second control information from the network device, wherein the second control information comprises information about a first time domain resource for transmitting first uplink control information (UCI), and the first time domain resource overlaps a first uplink data channel of the K uplink data channels in time domain, wherein the first uplink data channel is different from a reference uplink data channel for determining a first transport block size (TBS), and the first TBS is a TBS of the first data packet;
    determining a physical resource occupied by the first UCI; and
    sending the first UCI to the network device by using the physical resource occupied by the first UCI.

2. The method according to claim 1, wherein a quantity of physical resources comprised in the reference uplink data channel is greater than a quantity of physical resources comprised in the first uplink data channel.

3. The method according to claim 1, wherein the determining a physical resource occupied by the first UCI comprises:
   determining, based on a quantity of equivalent physical resources, a quantity of physical resources occupied by the first UCI, wherein the quantity of equivalent physical resources is a quantity of physical resources that are included in the reference uplink data channel and that can be used to carry UCI.

4. The method according to claim 1, wherein the determining a physical resource occupied by the first UCI comprises:
   determining, based on a quantity of equivalent physical resources and the first TBS, a quantity of physical resources occupied by the first UCI, wherein the quantity of equivalent physical resources is a quantity of physical resources comprised in the reference uplink data channel and that can be used to carry UCI.

5. The method according to claim 4, wherein the determining, based on a quantity of equivalent physical resources and the first TBS, a quantity of physical resources occupied by the first UCI comprises:
   when the first UCI is a hybrid automatic repeat request acknowledgment (HARQ-ACK), determining, based on $Q'_{ACK}$, the quantity of physical resources occupied by the first UCI, wherein $$Q'_{ACK} = \frac{(O_{ACK} + L_{ACK}) \cdot \beta_{offset}^{PUSCH} \cdot \sum_{l=0}^{\overline{N}_{symb,all}^{PUSCH}-1} \overline{M}_{sc}^{UCI}(l)}{\sum_{r=0}^{C_{UL-SCH}-1} K_r};$$

when the first UCI is a channel state information (CSI) part 1, determining, based on $Q'_{CSI-1}$, the quantity of physical resources occupied by the first UCI, wherein $$Q'_{CSI-1} = \frac{(O_{CSI-1} + L_{CSI-1}) \cdot \beta_{offset}^{PUSCH} \cdot \sum_{l=0}^{\overline{N}_{symb,all}^{PUSCH}-1} \overline{M}_{sc}^{UCI}(l)}{\sum_{r=0}^{C_{UL-SCH}-1} K_r};$$

or
   when the first UCI is a CSI part 2, determining, based on $Q'_{CSI-2}$, the quantity of physical resources occupied by the first UCI, wherein $$Q'_{CSI-2} = \frac{(O_{CSI-2} + L_{CSI-2}) \cdot \beta_{offset}^{PUSCH} \cdot \sum_{l=0}^{\overline{N}_{symb,all}^{PUSCH}-1} \overline{M}_{sc}^{UCI}(l)}{\sum_{r=0}^{C_{UL-SCH}-1} K_r}, \text{ wherein}$$

$\sum_{l=0}^{\overline{N}_{symb,all}^{PUSCH}-1} \overline{M}_{sc}^{UCI}(l)$ is the quantity of equivalent physical resources, $\overline{N}_{symb,all}^{PUSCH}$ is a quantity of time domain symbols in the reference uplink data channel, $\overline{M}_{sc}^{UCI}(l)$ is a quantity of physical resources that can be used to carry UCI on the $l^{th}$ symbol in the reference uplink data channel, $\sum_{r=0}^{C_{UL-SCH}-1} K_r$ is the first TBS, $\beta_{offset}^{PUSCH}$ is an equalization parameter, $O_{ACK}$, $O_{CSI-1}$, or $O_{CSI-2}$ is a payload size of the first UCI, and $L_{ACK}$, $L_{CSI-1}$, or $L_{CSI-2}$ is a quantity of cyclic redundancy check bits for the first UCI.

6. The method according to claim 1, wherein the physical resource occupied by the first UCI is a physical resource on the first uplink data channel.

7. The method according to claim 1, wherein K is greater than or equal to 2.

8. An apparatus, comprising:
   one or more processors; and
   a non-transitory computer readable medium storing instructions that, when executed by the one or more processors, cause the apparatus to:
   send first control information to a terminal device, wherein the first control information comprises information about a first physical resource for transmitting a first data packet, the first physical resource corresponds to K uplink data channels, each of the K uplink data channels is used to transmit the first data packet once, and K is a positive integer;
   send second control information to the terminal device, wherein the second control information comprises information about a first time domain resource for transmitting first uplink control information (UCI), and the first time domain resource overlaps a first uplink data channel of the K uplink data channels in time domain, wherein the first uplink data channel is different from a reference uplink data channel for determining a first transport block size (TBS), and the first TBS is a TBS of the first data packet;
   determine a physical resource occupied by the first UCI; and
   receive the first UCI from the terminal device by using the physical resource occupied by the first UCI.

9. The apparatus according to claim 8, wherein a quantity of physical resources comprised in the reference uplink data channel is greater than a quantity of physical resources comprised in the first uplink data channel.

10. The apparatus according to claim 8, wherein a quantity of physical resources occupied by the first UCI corresponds to a quantity of equivalent physical resources, and the quantity of equivalent physical resources is a quantity of physical resources that are included in the reference uplink data channel and that can be used to carry UCI.

11. The apparatus according to claim 8, wherein a quantity of physical resources occupied by the first UCI corresponds to a quantity of equivalent physical resources and the first TBS, and the quantity of equivalent physical resources is a quantity of physical resources comprised in the reference uplink data channel and that can be used to carry UCI.

12. The apparatus according to claim 11, wherein that a quantity of physical resources occupied by the first UCI corresponds to a quantity of equivalent physical resources and the first TBS comprises:
   when the first UCI is a hybrid automatic repeat request acknowledgment (HARQ-ACK), the quantity of physical resources occupied by the first UCI is obtained based on $Q'_{ACK}$, wherein $$Q'_{ACK} = \frac{(O_{ACK} + L_{ACK}) \cdot \beta_{offset}^{PUSCH} \cdot \sum_{l=0}^{\overline{N}_{symb,all}^{PUSCH}-1} \overline{M}_{sc}^{UCI}(l)}{\sum_{r=0}^{C_{UL-SCH}-1} K_r};$$

when the first UCI is a channel state information (CSI) part 1, the quantity of physical resources occupied by the first UCI is obtained based on $Q'_{CSI-1}$, wherein $$Q'_{CSI-1} = \frac{(O_{CSI-1} + L_{CSI-1}) \cdot \beta_{offset}^{PUSCH} \cdot \sum_{l=0}^{\overline{N}_{symb,all}^{PUSCH}-1} \overline{M}_{sc}^{UCI}(l)}{\sum_{r=0}^{C_{UL-SCH}-1} K_r};$$

or when the first UCI is a CSI part 2, the quantity of physical resources occupied by the first UCI is obtained based on $Q'_{CSI-2}$, wherein $$Q'_{CSI-2} = \frac{(O_{CSI-2} + L_{CSI-2}) \cdot \beta_{offset}^{PUSCH} \cdot \sum_{l=0}^{\overline{N}_{symb,all}^{PUSCH}-1} \overline{M}_{sc}^{UCI}(l)}{\sum_{r=0}^{C_{UL-SCH}-1} K_r},$$

wherein $\sum_{l=0}^{\overline{N}_{symb,all}^{PUSCH}-1} \overline{M}_{sc}^{UCI}(l)$ is the quantity of equivalent physical resources, $\overline{N}_{symb,all}^{PUSCH}$ is a quantity of time domain symbols in the reference uplink data channel, $\overline{M}_{sc}^{UCI}(l)$ is a quantity of physical resources that can be used to carry UCI on the $l^{th}$ symbol in the reference uplink data channel, $\sum_{r=0}^{C_{UL-SCH}-1} K_r$ is the first TBS, $\beta_{offset}^{PUSCH}$ is an equalization parameter, $O_{ACK}$, $O_{CSI-1}$, or $O_{CSI-2}$ is a payload size of the first UCI, $L_{ACK}$, $L_{CSI-1}$, or $L_{CSI-2}$ is a quantity of cyclic redundancy check bits for the first UCI.

13. The apparatus according to claim 8, wherein the physical resource occupied by the first UCI is a physical resource on the first uplink data channel.

14. The apparatus according to claim 8, wherein K is greater than or equal to 2.

15. An apparatus comprising:
one or more processors; and
a non-transitory computer readable medium storing instructions that, when executed by the one or more processors, cause the apparatus to:
receive first control information from a network device, wherein the first control information comprises information about a first physical resource for transmitting a first data packet, the first physical resource corresponds to K uplink data channels, each of the K uplink data channels is used to transmit the first data packet once, and K is a positive integer;
receive second control information from the network device, wherein the second control information comprises information about a first time domain resource for transmitting first uplink control information (UCI), and the first time domain resource overlaps a first uplink data channel of the K uplink data channels in time domain, wherein the first uplink data channel is different from a reference uplink data channel for determining a first transport block size (TBS), and the first TBS is a TBS of the first data packet;
determine a physical resource occupied by the first UCI; and
send the first UCI to the network device by using the physical resource occupied by the first UCI.

16. The apparatus according to claim 15, wherein a quantity of physical resources comprised in the reference uplink data channel is greater than a quantity of physical resources comprised in the first uplink data channel.

17. The apparatus according to claim 15, wherein the instructions further cause the apparatus to:
determine, based on a quantity of equivalent physical resources, a quantity of physical resources occupied by the first UCI, wherein the quantity of equivalent physical resources is a quantity of physical resources that are included in the reference uplink data channel and that can be used to carry UCI.

18. The apparatus according to claim 15, wherein the instructions further cause the apparatus to:
determine, based on a quantity of equivalent physical resources and the first TBS, a quantity of physical resources occupied by the first UCI, wherein the quantity of equivalent physical resources is a quantity of physical resources comprised in the reference uplink data channel and that can be used to carry UCI.

19. The apparatus according to claim 18,
when the first UCI is a hybrid automatic repeat request acknowledgment (HARQ-ACK), the instructions further cause the apparatus to determine, based on $Q'_{ACK}$, the quantity of physical resources occupied by the first UCI, wherein $$Q'_{ACK} = \frac{(O_{ACK} + L_{ACK}) \cdot \beta_{offset}^{PUSCH} \cdot \sum_{l=0}^{\overline{N}_{symb,all}^{PUSCH}-1} \overline{M}_{sc}^{UCI}(l)}{\sum_{r=0}^{C_{UL-SCH}-1} K_r};$$

when the first UCI is a channel state information (CSI) part 1, the instructions further cause the apparatus to determine, based on $Q'_{CSI-1}$, the quantity of physical resources occupied by the first UCI, wherein $$Q'_{CSI-1} = \frac{(O_{CSI-1} + L_{CSI-1}) \cdot \beta_{offset}^{PUSCH} \cdot \sum_{l=0}^{\overline{N}_{symb,all}^{PUSCH}-1} \overline{M}_{sc}^{UCI}(l)}{\sum_{r=0}^{C_{UL-SCH}-1} K_r};$$

or when the first UCI is a CSI part 2, the instructions further cause the apparatus to determine, based on $Q'_{CSI-2}$, the quantity of physical resources occupied by the first UCI, wherein $$Q'_{CSI-2} = \frac{(O_{CSI-2} + L_{CSI-2}) \cdot \beta_{offset}^{PUSCH} \cdot \sum_{l=0}^{\overline{N}_{symb,all}^{PUSCH}-1} \overline{M}_{sc}^{UCI}(l)}{\sum_{r=0}^{C_{UL-SCH}-1} K_r},$$

wherein $\sum_{l=0}^{\overline{N}_{symb,all}^{PUSCH}-1} \overline{M}_{sc}^{UCI}(l)$ is the quantity of equivalent physical resources, $\overline{N}_{symb,all}^{PUSCH}$ is a quantity of time domain symbols in the reference uplink data channel, $\overline{M}_{sc}^{UCI}(l)$ is a quantity of physical resources that can be used to carry UCI on the $l^{th}$ symbol in the reference uplink data channel, $\Sigma_{r=0}^{C_{UL-SCH}-1} K_r$ is the first TBS, $\beta_{offset}^{PUSCH}$ an equalization parameter, $O_{ACK}$, $O_{CSI-1}$, or $O_{CSI-2}$ is a payload size of the first UCI, and $L_{ACK}$, $L_{CSI-1}$, or $L_{CSI-2}$ is a quantity of cyclic redundancy check bits for the first UCI.

20. The apparatus according to claim 15, wherein the physical resource occupied by the first UCI is a physical resource on the first uplink data channel.

* * * * *

UNITED STATES PATENT AND TRADEMARK OFFICE
CERTIFICATE OF CORRECTION

PATENT NO. : 11,974,287 B2
APPLICATION NO. : 17/487908
DATED : April 30, 2024
INVENTOR(S) : Li et al.

It is certified that error appears in the above-identified patent and that said Letters Patent is hereby corrected as shown below:

In the Specification

In Column 14, Line 59, delete "$N_{symball}^{PUSCH}$" and insert -- $N_{symb,all}^{PUSCH}$ --.

In Column 14, Line 62, after "DMRS," insert -- $M_{sc}^{UCI}(l)$ --.

In Column 15, Line 24, delete "Quantity" and insert -- quantity --.

In Column 29, Line 2, delete "$M_{sc}^{UCI}(j)$" and insert -- $M_{sc}^{UCI}(l)$ --.

In Column 42, Line 65, after "where" delete "n" and insert -- $\Omega$ --.

In Column 49, Line 66, delete "$\beta offset,1^{PUSCH}$" and insert -- $\beta_{offset,1}^{PUSCH}$ --.

In Column 66, Line 23, delete "farther" and insert -- further --.

Signed and Sealed this
Fourth Day of June, 2024

Katherine Kelly Vidal
*Director of the United States Patent and Trademark Office*